US010390231B2

(12) United States Patent
Smith et al.

(10) Patent No.: US 10,390,231 B2
(45) Date of Patent: Aug. 20, 2019

(54) METHODS AND SYSTEMS FOR USING LOCATION BASED SERVICE INFORMATION TO ENABLE SELF-REALIZED LEASES

(71) Applicant: Rivada Networks, LLC, Colorado Springs, CO (US)

(72) Inventors: Clint Smith, Warwick, NY (US); Purnima Surampudi, Katy, TX (US)

(73) Assignee: Rivada Networks, LLC, Colorado Springs, CO (US)

( * ) Notice: Subject to any disclaimer, the term of this patent is extended or adjusted under 35 U.S.C. 154(b) by 7 days.

(21) Appl. No.: 15/465,567

(22) Filed: Mar. 21, 2017

(65) Prior Publication Data

US 2017/0195891 A1 Jul. 6, 2017

Related U.S. Application Data

(63) Continuation-in-part of application No. 15/138,461, filed on Apr. 26, 2016, now Pat. No. 9,813,924, (Continued)

(51) Int. Cl.
*H04W 16/14* (2009.01)
*H04W 64/00* (2009.01)
(Continued)

(52) U.S. Cl.
CPC ............ *H04W 16/14* (2013.01); *H04M 15/00* (2013.01); *H04M 15/60* (2013.01);
(Continued)

(58) Field of Classification Search
None
See application file for complete search history.

(56) References Cited

U.S. PATENT DOCUMENTS 6,434,128 B1 8/2002 Benz
6,988,272 B1 1/2006 Iwao et al.
(Continued)

FOREIGN PATENT DOCUMENTS

EP 2417786 B1 12/2012
JP 2012-029259 A 2/2012
(Continued)

OTHER PUBLICATIONS

Notification of Transmittal of the International Search Report and the Written Opinion of the International Searching Authority, or the Declaration, issued for International Application No. PCT/US201/023542 dated Jun. 29, 2017.
(Continued)

*Primary Examiner* — Bunjob Jaroenchonwanit
(74) *Attorney, Agent, or Firm* — The Marbury Law Group, PLLC

(57) ABSTRACT

A dynamic spectrum arbitrage (DSA) system includes a plurality of fixed wireless devices, a home eNodeB gateway (HGW) coupled to each of the plurality of fixed wireless devices, a dynamic spectrum controller (DSC) coupled to the HGW, and a dynamic spectrum policy controller (DPC) coupled to the DSC and a plurality of other DSCs. Each of the fixed wireless devices may be configured to use an enhanced location based service (eLBS) to dynamically determine its location (latitude, longitude and altitude) and the locations of other fixed wireless devices, and use the location information to determine whether the respective fixed wireless device may be included in a telecommunication resource lease. The fixed wireless devices may also monitor network conditions, generate congestion reports based on a result of the monitoring, and send the generated congestion reports to the HGW.

25 Claims, 44 Drawing Sheets

Related U.S. Application Data which is a continuation of application No. 14/287,111, filed on May 26, 2014, now Pat. No. 9,357,469.

(60) Provisional application No. 62/311,832, filed on Mar. 22, 2016, provisional application No. 61/920,368, filed on Dec. 23, 2013, provisional application No. 61/828,360, filed on May 29, 2013.

(51) Int. Cl.
    *H04M 15/00*       (2006.01)
    *H04W 24/02*       (2009.01)
    *H04W 36/00*       (2009.01)
    *H04W 36/32*       (2009.01)
    *H04W 4/24*        (2018.01)
    *H04W 24/00*       (2009.01)
    *H04W 4/90*        (2018.01)
    *H04L 12/24*       (2006.01)

(52) U.S. Cl.
    CPC ......... *H04M 15/8033* (2013.01); *H04W 4/24* (2013.01); *H04W 24/02* (2013.01); *H04W 36/0016* (2013.01); *H04W 36/32* (2013.01); *H04W 64/003* (2013.01); *H04L 41/5006* (2013.01); *H04W 4/90* (2018.02); *H04W 24/00* (2013.01)

(56) References Cited

U.S. PATENT DOCUMENTS

| | | | |
|---|---|---|---|
| 7,124,101 | B1 | 10/2006 | Mikurak |
| 7,236,791 | B2 | 6/2007 | Chambers et al. |
| 8,199,768 | B1* | 6/2012 | Gossett .................. G06Q 40/04 370/447 |
| 8,310,946 | B2 | 11/2012 | Somasundaram et al. |
| 8,447,332 | B2 | 5/2013 | Weinreich et al. |
| 8,868,119 | B1* | 10/2014 | Gauba .................. H04W 24/02 370/328 |
| 2002/0087674 | A1 | 7/2002 | Guilford et al. |
| 2004/0132465 | A1* | 7/2004 | Mattila .................. G11B 5/455 455/456.1 |
| 2006/0245404 | A1 | 11/2006 | Bajic |
| 2007/0099598 | A1* | 5/2007 | Voyer .................. H04L 63/0823 455/411 |
| 2007/0149187 | A1 | 6/2007 | Levy |
| 2007/0280177 | A1 | 12/2007 | Uusikartano et al. |
| 2008/0108365 | A1* | 5/2008 | Buddhikot ............ H04W 16/10 455/452.1 |
| 2008/0127232 | A1 | 5/2008 | Langen et al. |
| 2009/0059856 | A1 | 3/2009 | Kermoal et al. |
| 2009/0143046 | A1 | 6/2009 | Smith |
| 2009/0161614 | A1 | 6/2009 | Granblaise et al. |
| 2009/0232143 | A1 | 9/2009 | Li et al. |
| 2009/0275348 | A1* | 11/2009 | Weinreich ............ G01S 5/0036 455/456.3 |
| 2009/0298461 | A1 | 12/2009 | O'Reilly |
| 2010/0105400 | A1 | 4/2010 | Palmer |
| 2010/0142454 | A1* | 6/2010 | Chang .................. H04W 16/06 370/329 |
| 2010/0145862 | A1 | 6/2010 | Chang |
| 2010/0216404 | A1 | 8/2010 | Hershey et al. |
| 2011/0039516 | A1 | 2/2011 | Fuller |
| 2011/0059744 | A1* | 3/2011 | Won .................. H04W 8/26 455/450 |
| 2011/0125905 | A1 | 5/2011 | Baucke et al. |
| 2011/0158090 | A1 | 6/2011 | Riley |
| 2011/0228707 | A1 | 9/2011 | Multikainen et al. |
| 2011/0228750 | A1 | 9/2011 | Tomici et al. |
| 2011/0231302 | A1* | 9/2011 | Stanforth ............. G06Q 10/063 705/37 |
| 2011/0238552 | A1 | 9/2011 | Monogioudis |
| 2011/0269464 | A1 | 11/2011 | Xu et al. |
| 2012/0014332 | A1* | 1/2012 | Smith .................. H04W 16/14 370/329 |
| 2012/0134328 | A1 | 5/2012 | Gauvreau et al. |
| 2012/0165020 | A1 | 6/2012 | Iwamura et al. |
| 2012/0257597 | A1* | 10/2012 | Zhang ............. H04W 36/0055 370/331 |
| 2012/0264396 | A1 | 10/2012 | Smith et al. |
| 2012/0320741 | A1 | 12/2012 | Freda et al. |
| 2013/0045759 | A1 | 2/2013 | Smith |
| 2013/0072146 | A1 | 2/2013 | Smith |
| 2013/0089067 | A1* | 4/2013 | Ji .......................... H04W 56/00 370/330 |
| 2013/0095843 | A1 | 4/2013 | Smith et al. |
| 2013/0122908 | A1* | 5/2013 | Zhao .................... H04W 36/08 455/436 |
| 2013/0196677 | A1 | 8/2013 | Smith et al. |
| 2014/0307640 | A1 | 10/2014 | Agrawal et al. |
| 2014/0313969 | A1* | 10/2014 | Kalhan ............. H04W 36/0072 370/312 |
| 2016/0066214 | A1 | 3/2016 | Buddhikot et al. |

FOREIGN PATENT DOCUMENTS

| | | |
|---|---|---|
| KR | 10-2012-0126032 A | 11/2012 |
| KR | 10-2013-0015529 A | 2/2013 |
| KR | 10-2013-0048561 A | 5/2013 |
| WO | 2012009557 A2 | 1/2012 |
| WO | 2012-030190 A2 | 3/2012 |
| WO | 2010-049002 A1 | 5/2012 |
| WO | 2012-037236 A2 | 5/2012 |
| WO | 2012-064563 A1 | 5/2012 |

OTHER PUBLICATIONS

International Search Report and Written Opinion issued in International Application No. PCT/US2014/039592 dated Sep. 24, 2014.
International Search Report and Written Opinion issued in International Application No. PCT/US2014/039696 dated Sep. 23, 2014.
International Search Report and Written Opinion issued in International Application No. PCT/US2014/039757 dated Oct. 1, 2014.
International Search Report and Written Opinion issued in International Application No. PCT/US2014/039770 dated Sep. 29, 2014.
International Search Report and Written Opinion issued in International Application No. PCT/US2014/039785 dated Sep. 24, 2014.
International Search Report and Written Opinion issued in International Application No. PCT/US2014/039573 dated Oct. 14, 2014.

* cited by examiner

| Source | Target | Note |
|---|---|---|
| eNB or any HeNB | Open access HeNB | N/A |
| eNB or any HeNB | Hybrid Access HeNB | N/A |
| Hybrid Access HeNB or Closed Access HeNB | Closed Access HeNB | Applies for same CSG ID and PLMN, and when wireless device is a member of the CSG cell |
| Any HeNB | eNB | N/A |

FIG. 19

METHODS AND SYSTEMS FOR USING LOCATION BASED SERVICE INFORMATION TO ENABLE SELF-REALIZED LEASES

CROSS REFERENCE TO RELATED PATENT APPLICATIONS

This application claims the benefit of priority to each of U.S. Provisional Patent Application Ser. No. 62/311,832 entitled "Methods And Systems For Using Location Based Service Information To Enable Self-Realized Leases" filed on Mar. 22, 2016, and is a continuation in part of U.S. patent application Ser. No. 15/138,461 entitled "Methods and System for Performing Inter-network Handover Operations in Dynamic Spectrum Arbitrage System" filed on Apr. 26, 2016, which is a continuation of U.S. patent application Ser. No. 14/287,111 entitled "Methods and System for Dynamic Spectrum Arbitrage with Mobility Management" filed on May 26, 2014 and issued on May 31, 2016 as U.S. Pat. No. 9,357,469, which claims the benefit of priority to each of U.S. Provisional Application No. 61/828,360, entitled "Methods and System for Dynamic Spectrum Arbitrage with Mobility Management" filed June May 29, 2013 and U.S. Provisional Application No. 61/920,368, entitled "Methods and System for Dynamic Spectrum Arbitrage with Mobility Management" filed Dec. 23, 2013, the entire contents of all of which are hereby incorporated by reference for all purposes.

BACKGROUND

Over the past several years, internet-enabled smart phones, tablets and gaming consoles have become essential personal accessories, connecting users to friends, work, leisure activities and entertainment. Users now have more choices and expect to have access to content, data and communications at any time, in any place. As more users utilize these services, telecommunication networks must meet these increases in user demand, and support the array of new services and provide fast, reliable communications. Therefore, improved methods and solutions for dynamically allocating underutilized telecommunication resources (e.g., RF spectrum, etc.) of a first telecommunication network for access and use by wireless devices that subscribe to other networks will be beneficial to the telecommunication networks, service providers, and to the consumers of telecommunication services.

SUMMARY

The various aspects include a dynamic spectrum arbitrage (DSA) system that includes a plurality of fixed wireless devices in a first telecommunication network, a home eNodeB gateway (HGW) including a HGW processor coupled to each of the plurality of fixed wireless devices via first communication links, a dynamic spectrum controller (DSC) including DSC processor coupled to the HGW via a second communication link, and a dynamic spectrum policy controller (DPC) including a DPC processor coupled to the DSC via a third communication link. In an aspect, at least one of the fixed wireless devices includes a processor (device processor) that is configured with processor-executable instructions to perform operations that include using an enhanced location based service (eLBS) techniques to dynamically determine a location for the respective fixed wireless device (the location including latitude, longitude and altitude of the respective fixed wireless device), and determining whether the respective fixed wireless device may be included in a lease (e.g., telecommunication resource lease negotiated by the DSA system and/or via the performance of DSA operations) based on the location.

In a further aspect, the DPC processor is configured with processor executable instructions to perform operations that include receiving a notification message that identifies a successful bidder for a geographical area, generating a grid-map structure that includes a primary grid structure that identifies telecommunication cells in the geographical area, monitoring locations of wireless devices, and determining whether to initiate inter-network handover operations based on the locations of the wireless devices with respect to the telecommunication cells of the primary grid structure.

In further aspects, the processor in the fixed wireless device may be configured to use an eLBS technique that includes determining an approximate location of the fixed wireless device, generating an approximate location waypoint, forming a communication group with other from other wireless devices, receiving location information from other wireless devices in the group, determining a more precise location of the wireless device based on the approximate location and the location information received from the wireless device, and generating a more precise location waypoint. In an aspect, using the eLBS technique may include collecting or receiving location information (in the form of waypoints) from a plurality of other wireless devices. In an aspect, the wireless device may receive a first waypoint from a first external device, a second waypoint from a second external device, a third waypoint from a third external device, and a fourth waypoint from a forth external device, and use any combination of the received waypoints (e.g., first through fourth waypoints) in conjunction with stored and historical information (e.g., previously computed waypoints, movement information, etc.) to determine or compute the approximate location and/or more precise location with a high degree of accuracy (e.g., generate location values that have a confidence values that exceed an accuracy threshold value). In some aspects, the fixed wireless device may be configured apply the received waypoints to Kalman filter (e.g., for processing via a Kalman filter component, etc.) in order to generate the more accurate location information (or final location waypoint).

In a further aspect, the DPC processor may be configured with processor executable instructions to perform operations that include dynamically allocating a portion of available radio frequency (RF) spectrum resources of a first communication network for access and use by a second communication network, informing the second communication network that use of allocated RF spectrum resources may begin, recording a transaction in a transaction database identifying an amount of RF spectrum resources allocated for use by the second communication network, determining whether at least some of the allocated RF spectrum resources are required by one or more devices that subscribe to the first communication network, informing the second communication network that use of allocated RF spectrum resources should be terminated in response to determining that at least some of the allocated RF spectrum resources are required by the one or more devices that subscribe to the first network, and updating the transaction database to include information identifying a time when use of the allocated RF spectrum resources was terminated by the second communication network.

In some aspects, the fixed wireless device may be a small cell, a femto cell, a WiFi access node, or a beacon. In an aspect, determining the location for the fixed wireless device may include the processor generating a waypoint information structure that identifies the current location of the fixed wireless device, and storing the generated waypoint in memory. In a further aspect, determining whether the respective fixed wireless device may be included in the lease based on the location may include determining whether the respective fixed wireless device may be included in a lease information unit that identifies an amount of telecommunication resources (e.g., radio frequency resources) of a first network that is allocated for use by wireless devices in a second network and/or an amount of the telecommunication resources of the first network that is in use by wireless devices in the second network. In a further aspect, the fixed wireless device may be included in a first network, and determining whether the respective fixed wireless device may be included in the lease based on the location may include determining whether the fixed wireless device may allocate its available radio frequency resource for use by wireless devices that subscribe to a second network.

In a further aspect, the processor (device processor) may be configured to determine whether the respective fixed wireless device is in a global positioning system (GPS) stressed environment (e.g., whether the processor/device is able to acquire satellite signals and navigation data from a geospatial system, etc.), and use eLBS to dynamically determine the location of the respective fixed wireless device in response to determining that the respective fixed wireless device is in a GPS stressed environment. In a further aspect, determining whether the respective fixed wireless device may be included in a lease based on the location may include the processor in the fixed wireless device enabling a self-realize lease. In some aspects, the self-realized lease may be an information structure or information unit that may be used to by the fixed wireless device to determine its availability for inclusion in a lease (e.g., telecommunication resource lease, resource allocation agreement, etc.). For example, a self-realized lease may include location information (e.g., latitude, longitude and altitude) that allows a femtocell to determine that it should offer its functionality or resources (e.g., excess bandwidth, spectrum, etc.) for use by mobile devices that are in close proximity (e.g., for use as part of a DSA leasing agreement). A self-realized lease may also include information that allows the mobile device to determine that the resources of the femtocell are able for use (via a leasing agreement). A self-realized lease may also include information that allows a DSC (or an OAM that is receiving information from the DSC) to intelligently determine whether it should be included in, or excluded from, one or more leases.

In a further aspect, the DSA system may be configured to use eLBS (or the location information generated via performance of eLBS operations) to enable a self-organizing network (SON) and/or to allow the lease to configure, organize and optimize itself without manual intervention. In a further aspect, at least one of the plurality of fixed wireless devices may include a home eNodeB (HeNB) that includes a HeNB processor that may be configured with processor-executable instructions to perform operations that include monitoring network conditions, generating congestion reports based on a result of the monitoring, and sending the generated congestion reports to the HGW via the first communication links. In a further aspect, the HeNB processor may be configured with processor-executable instructions to perform operations such that monitoring the network conditions includes monitoring one of a network congestion, a resource usage, and a resource availability. In a further aspect, the HeNB processor may be configured with processor-executable instructions to perform operations further including determining that the HeNB has been moved, determining whether there is one or more suitable serving HGWs in the first telecommunication network, establishing a communication link to one of the one or more suitable serving HGWs, and terminating the one first communication link from the HeNB to the HGW.

Further aspects may include a computing device (fixed wireless computing device, fixed wireless device, etc.) having a processor that may be configured with processor-executable instructions to perform operations that include using eLBS to dynamically determine a location for the computing device (the location including latitude, longitude and altitude of the computing device), and using the location to dynamically determine whether the computing device should participate in a telecommunication resource lease negotiated by a dynamic spectrum arbitrage (DSA) system.

In an aspect, the processor may be configured with processor-executable instructions to perform operations such that using eLBS to dynamically determine the location for the computing device includes using eLBS to dynamically determine the location a small cell, a femto cell, a WiFi access node, or a beacon. In a further aspect, the processor may be configured with processor-executable instructions to perform operations further including determining whether the computing device is in a global positioning system (GPS) stressed environment. In a further aspect, the processor may be configured with processor-executable instructions to perform operations such that using eLBS to dynamically determine the location of the computing device includes using eLBS to dynamically determine the location of the computing device in response to determining that the computing device is in a GPS stressed environment.

In an aspect, the processor may be configured with processor-executable instructions to perform operations further comprising communicating with a dynamic spectrum policy controller (DPC) via a dynamic spectrum controller (DSC) to cause the DPC to perform operations that include dynamically allocating a portion of available radio frequency (RF) spectrum resources of a first communication network for access and use by a second communication network, informing the second communication network that use of allocated RF spectrum resources may begin, recording a transaction in a transaction database identifying an amount of RF spectrum resources allocated for use by the second communication network, determining whether at least some of the allocated RF spectrum resources are required by one or more devices that subscribe to the first communication network, informing the second communication network that use of allocated RF spectrum resources should be terminated in response to determining that at least some of the allocated RF spectrum resources are required by the one or more devices that subscribe to the first network, and updating the transaction database to include information identifying a time when use of the allocated RF spectrum resources was terminated by the second communication network.

In a further aspect, processor may be configured with processor-executable instructions to perform operations further including monitoring network conditions of a telecommunications network, generating congestion reports based on a result of the monitoring, and sending the generated congestion reports to a home eNodeB gateway (HGW) via a first communication link. In a further aspect, the processor may be configured with processor-executable instructions to perform operations further including determining whether the computing device has been moved, determining whether there is one or more suitable serving HGWs in the telecommunication network, establishing a second communication link to one of the one or more suitable serving HGWs, and terminating the first communication link to the HGW.

The various aspects may include methods of using an enhanced location based service (eLBS) to enable self-realized leases, which may include dynamically determining a location for the fixed wireless device (the location including latitude, longitude and altitude of the fixed wireless device), and using the location to dynamically determine whether the computing device should participate in a telecommunication resource lease negotiated by a dynamic spectrum arbitrage (DSA) system, in which the fixed wireless device is one of a plurality of fixed wireless devices in a first telecommunication network. In an aspect, the method may include receiving, in a dynamic spectrum policy controller (DPC) that includes a DPC processor, a notification message that identifies a successful bidder for a geographical area, generating a grid-map structure that includes a primary grid structure that identifies telecommunication cells in the geographical area, monitoring locations of wireless devices, and determining whether to initiate internetwork handover operations based on the locations of the wireless devices with respect to the telecommunication cells of the primary grid structure.

In an aspect, the method may include determining, by the processor of the fixed wireless device, that the fixed wireless device is in a global positioning system (GPS) stressed environment, in which using the eLBS to dynamically determine the location for the fixed wireless device includes using the eLBS to dynamically determine the location of the fixed wireless device in response to determining that the fixed wireless device is in a GPS stressed environment. In a further aspect, the method may include monitoring network conditions of a telecommunications network, generating congestion reports based on a result of the monitoring, and sending the generated congestion reports to a home eNodeB gateway (HGW) via a first communication link. In a further aspect, the method may include determining that the fixed wireless device has been moved, determining whether there is one or more suitable serving HGWs in the telecommunication network, establishing a second communication link to one of the one or more suitable serving HGWs, and terminating the first communication link to the HGW.

In a further aspect, the method may include dynamically allocating a portion of available radio frequency (RF) spectrum resources of a first communication network for access and use by a second communication network, informing the second communication network that use of allocated RF spectrum resources may begin, recording a transaction in a transaction database identifying an amount of RF spectrum resources allocated for use by the second communication network, determining whether at least some of the allocated RF spectrum resources are required by one or more devices that subscribe to the first communication network, informing the second communication network that use of allocated RF spectrum resources should be terminated in response to determining that at least some of the allocated RF spectrum resources are required by the one or more devices that subscribe to the first network, and updating the transaction database to include information identifying a time when use of the allocated RF spectrum resources was terminated by the second communication network.

Further aspects may include a non-transitory processor-readable storage medium having stored thereon processor-executable software instructions configured to cause a processor of a computing device to perform operations including using an enhanced location based service (eLBS) to dynamically determine a location for the computing device, the location including latitude, longitude and altitude of the computing device, and using the location to dynamically determine whether the computing device should participate in a telecommunication resource lease negotiated by a dynamic spectrum arbitrage (DSA) system. In an aspect, the processor-executable instructions further cause the processor to perform further operations including determining that the computing device is in a global positioning system (GPS) stressed environment, and using the eLBS to dynamically determine the location of the computing device in response to determining that the computing device is in a GPS stressed environment. In a further aspect, the processor-executable instructions further cause the processor to perform further operations including monitoring network conditions of a telecommunications network, generating congestion reports based on a result of the monitoring, sending the generated congestion reports to a home eNodeB gateway (HGW) via a first communication link, determining that the computing device has been moved, determining whether there is one or more suitable serving HGWs in the telecommunication network, establishing a second communication link to one of the one or more suitable serving HGWs, and terminating the first communication link to the HGW.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 19 is a table diagram illustrating the relationships between a source component and a target component for X2-based handover (HO) support in accordance with an embodiment.

DETAILED DESCRIPTION

Figure 1A:
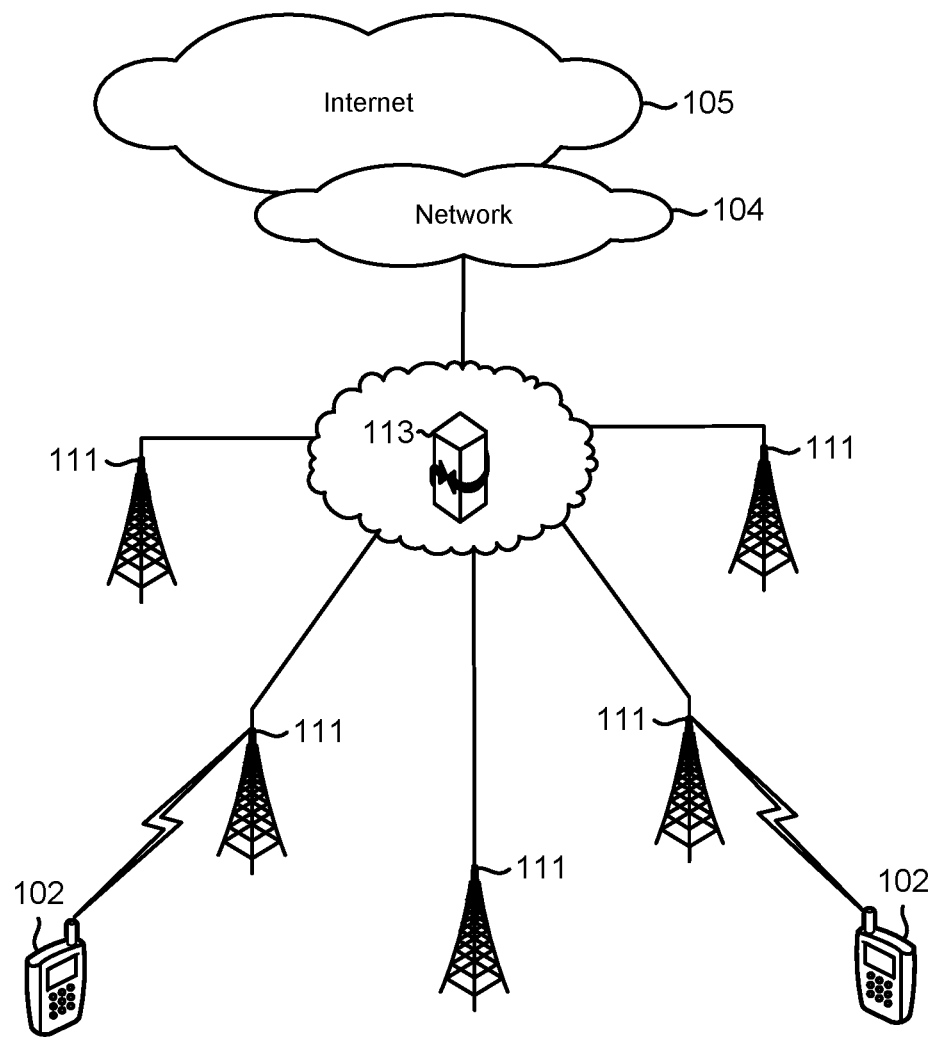
FIGS. 1A through 1F are system block diagrams illustrating various logical and functions components and communication links in communication systems that may be used to implement the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms 'mobile device,' 'wireless device' and 'user equipment (UE)' may be used interchangeably and refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A wireless device may include a programmable processor and memory. In a preferred embodiment, the wireless device is a cellular handheld device (e.g., a wireless device), which can communicate via a cellular telephone communications network.

As used in this application, the terms 'component,' 'module,' 'engine,' 'manager' are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), land mobile radio (LMR), and evolved universal terrestrial radio access network (E-UTRAN). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The various embodiments include a dynamic spectrum arbitrage (DSA) system configured to dynamically manage the availability, allocation, access, and use of telecommunication resources, such as radio frequency (RF) spectrum and RF spectrum resources, between two or more telecommunication networks. In the various embodiments, the DSA system may be configured to better support small cell architectures, such as femtocell architectures.

Generally, a femtocell is a small, low power, and/or portable device (e.g., a base station) that may be configured to provide telecommunication services to wireless devices in relatively small area (e.g., cell size of 1-50 meters). A telecommunication network may deploy many such femtocells to quickly reduce coverage gaps and/or to extend services to additional users or areas. Yet, a large number of femtocells are typically required or used to provide users with adequate service, and performing DSA operations often requires sending and receiving large amount of information to and from each femtocell. Further, a degree of executive control is required to manage and coordinate the communications and interactions between the DSA components and the different femtocells when allocating resources between networks. For these and other reasons, using existing femtocell solutions may have a significant negative impact on the performance of the DSA system. Therefore, existing femtocell solutions are not suitable for use in DSA systems.

To overcome the limitations of existing solutions, the various embodiments provide methods, and computing devices configured to implement the methods, of intelligently and efficiently communicating information between components in a dynamic spectrum arbitrage (DSA) system and femtocells. That is, the various embodiments include components configured to manage and coordinate the communications and interactions between femtocells and other DSA components to allow for the inclusion and use of femtocells as part of a comprehensive DSA solution.

An embodiment DSA system may include a dynamic spectrum policy controller (DPC) component and a dynamic spectrum controller (DSC) component. The DPC component may be configured to manage the DSA operations and interactions between two or more networks (e.g., between a lessor network and a lessee network) by communicating with a DSC component in each of the participating networks. Each of these DSC components may include a wired or wireless communication link to a home eNodeB gateway (HGW), to an eNodeB, and various other components. The home eNodeB gateway may be configured to facilitate the communications between many femtocells and the DSC component, so that the DSC communicates with these cells in the same manner as it would communicate with a single component (i.e., a single eNodeB). This allows the DSA system to efficiently communicate large volumes of information with many different femtocells without negatively impacting the operations or performance of the DSA system.

In an embodiment, the DSA system may include a femtocell in the form of a home eNodeB (HeNB). The HeNB may be configured to perform any of all of the operations performed by the embodiment eNodeBs discussed in this application. For example, a HeNB may be equipped with a DSC application protocol and congestion monitoring (DAPCM) module. The DAPCM module may be configured to monitor various network conditions (e.g., network congestion, resource usage, resource availability, etc.), generate reports based on the monitoring, and send the generated reports to a DSC component via the HGW. The DSC may be configured to receive and use such information to make better or more informed resource requests and/or to better identify the resources that could be made available for allocation.

In various embodiments, the operations, communications, and interactions between the DSA components may be facilitated or accomplished via a dynamic spectrum arbitrage application part (DSAAP) protocol or component.

The DSAAP component may be configured to allow, facilitate, support, or augment communications between various DSA components so as to improve the efficiency and speed of the DSA system and telecommunication networks.

The DSAAP component may be configured to allow many femtocells to communicate with a DSC component (e.g., via the Xe interface), with other eNodeBs (e.g., via an X2 interface), and with various other components (e.g., via the S1 interface). The DSAAP component may be configured to allow a DSC to communicate with many different femtocells as if they were a single eNodeB (e.g., via the Xe interface) and/or so as to improve the efficiency and speed of the DSA system.

In various embodiments, all or portions of the DSAAP component may be included in a DPC component, a DSC component, an eNodeB component, an MME component, a HGW component, in an independent DSA component, or any combination thereof. The DSAAP component may be implemented in hardware, software, or a combination of hardware and software.

In an embodiment, the DSAAP component may be configured to implement a DSAAP protocol, which may be defined over the Xe, Xd, and/or X2 reference points. In various embodiments, the Xe reference points between a HGW and DSC and/or between a DSC and eNodeB may use the DSAAP protocol, TR-069 protocol, and/or TR-192 data model extensions to support listing available resources at the eNodeB and notifying the eNodeB of bid/buy confirmations. The Xd reference point between DSC and DPC may use the DSAAP protocol for dynamic spectrum and resource arbitrage operations. The X2 interface/reference point between the eNodeBs may also use the DSAAP protocol to communicate information.

The DSAAP component(s) may allow the various DSA components (e.g., DSC, DPC, eNodeB, etc.) to communicate using the DSAAP protocol and to perform various DSA and DSAAP methods. In an embodiment, these methods may be performed in a DSA system that includes a first DSC server and a HGW server in a first telecommunication network (e.g., a lessee network), a second DSC server and HGW in a second telecommunication network (e.g., a lessor network), and a DPC server that is outside of the first and second telecommunication networks.

The first DSC may include first DSC processor that is coupled to the DPC via a first communication link (i.e., a wired or wireless link), and the second DSC may include a second DSC processor coupled to the DPC via a second communication link. In addition, the first and second DSCs may be coupled to the first and second HGWs via third and fourth communication links. The first and second communication links may be defined over the Xd interface, and the third and fourth communication links may be defined over the Xe interface. The HGWs may be configured to communicate with many different HeNB via the S1 interface.

The second HeNB may be configured to monitor network conditions (e.g., network congestion, resource usage, resource availability, etc.), generate reports based on a result of the monitoring, and send the generated reports to the second DSC via the second HGW. This may be accomplished by using the DSAAP protocol (i.e., by sending/receiving DSAAP communication messages and/or performing any of methods discussed in this application). The second DSC may be configured to receive and use this information to keep track of congestion states of the eNodeBs and HeNBs in its network, select target nodes for handovers, and/or manage traffic on the eNodeBs/HeNBs by offloading wireless devices. The HGW may be configured to present information from many different HeNBs to the second DSC as if they were from a single eNodeB. As such, the HGW may act as gateway between the DSC and the HeNBs, which allows the system to add or remove HeNBs without significant network planning and without further modifying the DSC or other components in the network.

The various embodiments may be implemented within a variety of communication systems, examples of which are illustrated in FIGS. 1A-1F. With reference to FIG. 1A, wireless devices 102 may be configured to transmit and receive voice, data, and control signals to and from a base station 111, which may be a base transceiver station (BTS), NodeB, eNodeB, etc. The base station 111 may communicate with an access gateway 113, which may include one or more of a controller, a gateway, a serving gateway (SGW), a packet data network gateway (PGW), an evolved packet data gateway (ePDG), a packet data serving node (PDSN), a serving GPRS support node (SGSN), or any similar component or combinations of the features/functions provided thereof. Since these structures are well known and/or discussed in detail further below, certain details have been omitted from FIG. 1A in order to focus the descriptions on the most relevant features.

The access gateway 113 may be any logical and/or functional component that serves as the primary point of entry and exit of wireless device traffic and/or connects the wireless devices 102 to their immediate service provider and/or packet data networks (PDNs). The access gateway 113 may forward the voice, data, and control signals to other network components as user data packets, provide connectivity to external packet data networks, manage and store contexts (e.g. network internal routing information, etc.), and act as an anchor between different technologies (e.g., 3GPP and non-3GPP systems). The access gateway 113 may coordinate the transmission and reception of data to and from the Internet 105, as well as the transmission and reception of voice, data and control information to and from an external service network 104, the Internet 105, other base stations 111, and to wireless devices 102.

In various embodiments, the base stations 111 and/or access gateway 113 may be coupled (e.g., via wired or wireless communication links) to a dynamic spectrum arbitrage (DSA) system configured to dynamically manage the availability, allocation, access, and use of various network resources (e.g., RF spectrum, RF spectrum resources, etc.). The DSA system is discussed in detail further below.

Figure 1B:
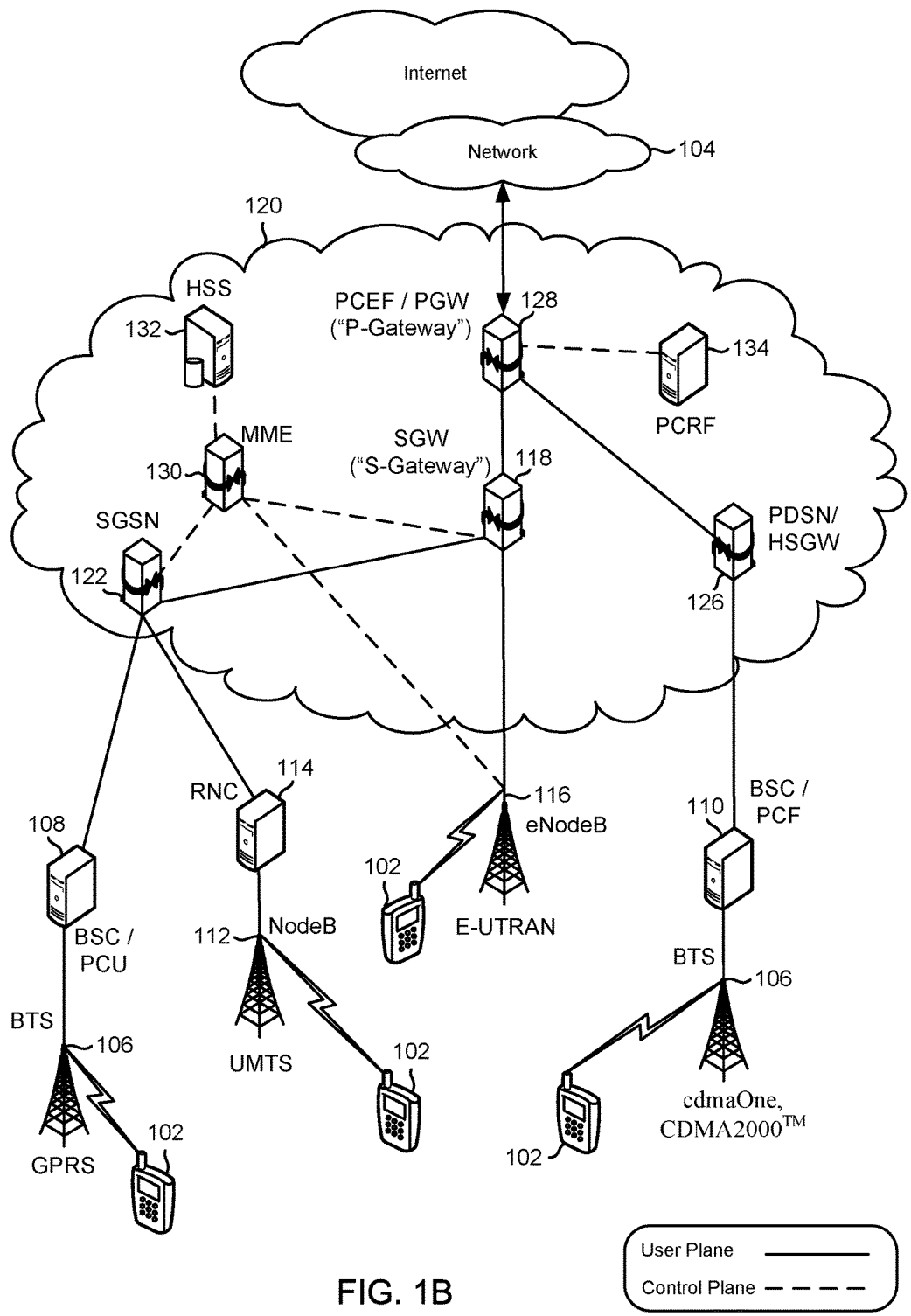

FIG. 1B illustrates that wireless devices 102 may be configured to send and receive voice, data and control signals to and from the service network 104 (and ultimately the Internet 105) using a variety of communication systems/technologies (e.g., GPRS, UMTS, LTE, cdmaOne, CDMA2000™), any or all of which may be supported by, or used to implement, the various embodiments.

In the example illustrated in FIG. 1B, long term evolution (LTE) and/or evolved universal terrestrial radio access network (E-UTRAN) data transmitted from a wireless device 102 is received by an eNodeB 116, and sent to a serving gateway (SGW) 118 located within the core network 120. The eNodeB 116 may send signaling/control information (e.g., information pertaining to call setup, security, authentication, etc.) to a mobility management entity (MME) 130. The MME 130 may request user/subscription information from a home subscriber server (HSS) 132, communicate with other MME components, perform various administrative tasks (e.g., user authentication, enforcement of roaming restrictions, etc.), select a SGW 118, and send authorization and administrative information to the eNodeB 116 and/or SGW 118. Upon receiving the authorization information from the MME 130 (e.g., an authentication complete indication, an identifier of a selected SGW 118, etc.), the eNodeB 116 may send data received from the wireless device 102 to a selected SGW 118. The SGW 118 may store information about the received data (e.g., parameters of the IP bearer service, network internal routing information, etc.) and forward user data packets to a policy control enforcement function (PCEF) and/or packet data network gateway (PGW) 128.

FIG. 1B further illustrates that general packet radio service (GPRS) data transmitted from the wireless devices 102 may be received by a base transceiver station (BTS) 106 and sent to a base station controller (BSC) and/or packet control unit (PCU) component (BSC/PCU) 108. Code division multiple access (CDMA) data transmitted from a wireless device 102 may be received by a base transceiver station 106 and sent to a base station controller (BSC) and/or packet control function (PCF) component (BSC/PCF) 110. Universal mobile telecommunications system (UMTS) data transmitted from a wireless device 102 may be received by a NodeB 112 and sent to a radio network controller (RNC) 114.

The BSC/PCU 108, BSC/PCF 110, and RNC 114 components may process the GPRS, CDMA, and UMTS data, respectively, and send the processed data to a component within the core network 120. More specifically, the BSC/PCU 108 and RNC 114 units may send the processed data to a serving GPRS support node (SGSN) 122, and the BSC/PCF 110 may send the processed data to a packet data serving node (PDSN) and/or high rate packet data serving gateway (HSGW) component (PDSN/HSGW) 126. The PDSN/HSGW 126 may act as a connection point between the radio access network and the IP based PCEF/PGW 128. The SGSN 122 may be responsible for routing the data within a particular geographical service area, and send signaling (control plane) information (e.g., information pertaining to call setup, security, authentication, etc.) to an MME 130. The MME 130 may request user and subscription information from a home subscriber server (HSS) 132, perform various administrative tasks (e.g., user authentication, enforcement of roaming restrictions, etc.), select a SGW 118, and send administrative and/or authorization information to the SGSN 122.

The SGSN 122 may send the GPRS/UMTS data to a selected SGW 118 in response to receiving authorization information from the MME 130. The SGW 118 may store information about the data (e.g., parameters of the IP bearer service, network internal routing information, etc.) and forward user data packets to the PCEF/PGW 128. The PCEF/PGW 128 may send signaling information (control plane) to a policy control rules function (PCRF) 134. The PCRF 134 may access subscriber databases, create a set of policy rules and performs other specialized functions (e.g., interacts with online/offline charging systems, application functions, etc.). The PCRF 134 may then send the policy rules to the PCEF/PGW 128 for enforcement. The PCEF/PGW 128 may implement the policy rules to control the bandwidth, the quality of service (QoS), the characteristics of the data, and the services being communicated between the service network 104 and the end users.

In the various embodiments, any or all of the components discussed above (e.g., components 102-134) may be coupled to, or included in, a DSA system configured to dynamically manage the availability, allocation, access, and use of telecommunication resources.

Figure 1C:
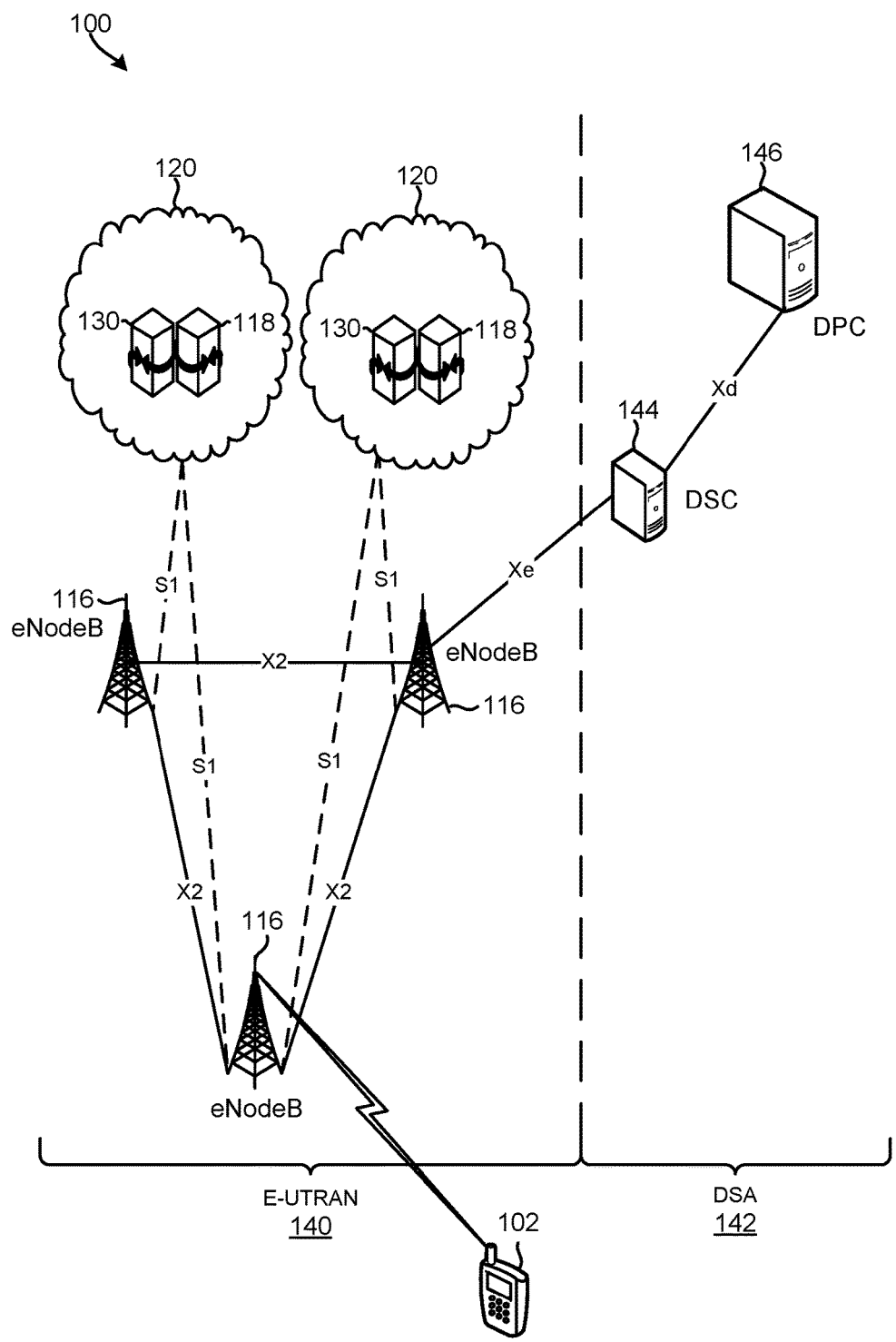

FIG. 1C illustrates various logical components and communication links in an embodiment system 100 that includes an DSA system 142 and a evolved universal terrestrial radio access network (E-UTRAN) 140. In the example illustrated in FIG. 1C, the DSA system 142 includes a dynamic spectrum controller (DSC) 144 component and a dynamic spectrum policy controller (DPC) 146 component. The E-UTRAN 140 includes a plurality of interconnected eNodeBs 116 coupled to the core network 120 (e.g., via a connection to an MME, SGW, etc.).

In various embodiments, the DSC 144 may be included in or coupled to the E-UTRAN 140, either as part of its core network 120 or outside of the core network 120. In an embodiment, the DSC 144 may be coupled directly (e.g., via wired or wireless communication links) to one or more eNodeBs 116.

The eNodeBs 116 may be configured to communicate with the DSC 144 via the Xe interface/reference point. In various embodiments, the Xe reference point between DSC and eNodeB 116 may use the DSAAP protocol, TR-069 protocol, and/or TR-192 data model extensions to support listing available resources at the eNodeB 116 and notifying the eNodeB 116 of bid/buy confirmations. The DSC 144 may be configured to communicate with the DPC 146 via the Xd interface/reference point. The Xd reference point between DSC and DPC may use the DSAAP protocol for dynamic spectrum and resource arbitrage operations. The eNodeBs 116 may be interconnected, and configured to communicate via an X2 interface/reference point, which may also use the DSAAP protocol to communicate information. The eNodeBs 116 may be configured to communicate with components in the core network 120 via the S1 interface. For example, the eNodeBs 116 may be connected to an MME 130 via the S1-MME interface and to a SGW 118 via the S1-U interface. The S1 interface may support a many-to-many relation between the MMEs 130, SGWs 118, and eNodeBs 116. In embodiment, the DPC and/or DSC component may also be configured to communicate with a HSS 132 component.

The eNodeBs 116 may be configured to provide user plane (e.g., PDCP, RLC, MAC, PHY) and control plane (RRC) protocol terminations towards the wireless device 102. That is, the eNodeBs 116 may act as a bridge (e.g., layer 2 bridge) between the wireless devices 102 and the core network 120 by serving as the termination point of all radio protocols towards the wireless devices 102, and relaying voice (e.g., VoIP, etc.), data, and control signals to network components in the core network 120. The eNodeBs 116 may also be configured to perform various radio resource management operations, such as controlling the usage of radio interfaces, allocating resources based on requests, prioritizing and scheduling traffic according to various quality of service (QoS) requirements, monitoring the usage of network resources, etc. In addition, the eNodeBs 116 may be configured to collect radio signal level measurements, analyze the collected radio signal level measurements, and handover wireless devices 102 (or connections to the mobile devices) to another base station (e.g., a second eNodeB) based on the results of the analysis.

The DSC 144 and DPC 146 may be functional components configured to manage the dynamic spectrum arbitrage process for sharing radio frequency and other network resources between different E-UTRANs 140. For example, the DPC 146 component may be configured to manage the DSA operations and interactions between multiple E-UTRAN networks by communicating with DSCs 144 in the E-UTRAN network.

Figure 1D:
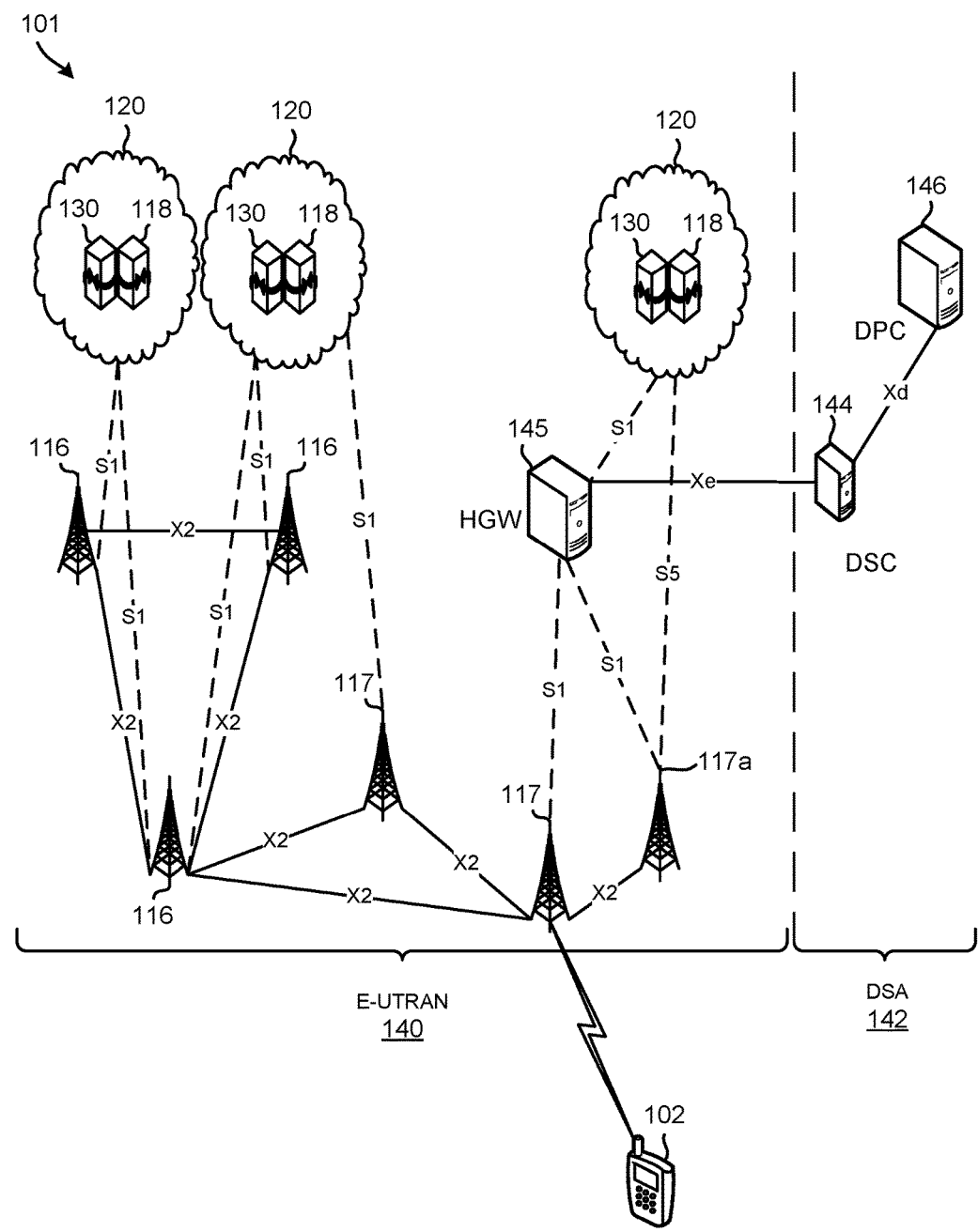

FIG. 1D illustrates various logical components and communication links in an embodiment system 101 configured to support smaller-cell architectures. In the example illustrated in FIG. 1D, the DSA system 142 and E-UTRAN 140 include all the components discussed above with reference to FIG. 1C. In addition, the E-UTRAN 140 is upgraded to include a femtocell home eNodeB (HeNB) gateway (HGW 145) 145 that is coupled to a plurality of interconnected HeNBs 117, to the core network 120 (e.g., via a connection to an MME, SGW, etc.), and to the DSC 144. The HeNBs 117 may be interconnected via the X2 interface, and coupled to the HGW 145 via the S1 interface. FIG. 1D also illustrates that a HeNB 117*a* operating in a local IP access (LIPA) mode may communicate with the core network 120 via the S5 interface.

The system 101 may be configured so that the S1 interface is used to communicate information between the HGW 145 and the core network 120, between the HeNB 117 and the HGW 145, between the HeNB 117 and the core network 120, and/or between the eNodeB 116 and the core network 120. The system 101 may be configured such that the S1-U interface from the HeNB 117 terminates at the HGW 145. The system 101 may also be configured so that there is a direct logical user plane connection or communication link between HeNB 177 and the SGW 118. The HGW 145 may be configured to serve as a concentrator for the control plane communications, such as via the S1-MME interface.

The HGW 145 may be configured to allow the system 101 to support any or all small-cell or femtocell architectures. This may be accomplished by using the S1 interface between the HeNBs 117 and the core network 120 to support a large number of HeNBs 117 in a scalable manner.

In an embodiment, the system 101 may be configured such that the HGW 145 appears as an eNodeB 116 to the MME 130. The system 101 may also be configured such that HGW 145 appears to the HeNB 117 as an MME 130. In an embodiment, the S1 interface between the HeNB 117 and the core network 120 may be the same regardless whether the HeNB 117 is connected to the core network 120 via the HGW 145.

In an embodiment, the HGW 145 may be configured to establish a connection to a component in the core network 120 so that inbound and outbound mobility to cells served by the HGW 145 do not necessarily require inter-MME handovers. In an embodiment, the system 101 may be configured so that one HeNB 117 serves one cell.

The DSC 144 may be configured to interface with HGW 145, as opposed to interfacing with large numbers/volumes of HeNB 117. The DSC 144 may also be configured to interface with the DPC 146 via the Xd interface, such as for bid management and inter-DSC communications.

The HeNB 117 may be configured to support the same functions as those supported by an eNodeB 116 and/or so that the operations between a HeNB 117 and the core network 120 are the same as those between the eNodeBs 116 and the components in the core network 120.

In an embodiment, the DSC 144 may be configured to receive congestion state information from eNodeBs 116 in its network, and send the congestion state information to the DPC 146 component. The DSC 144 may also be configured to receive congestion state information from HeNBs 117 in its network via the HGW 145 component, and send the congestion state information to the DPC 146 component. The congestion state information may identify a current congestion state (e.g., Normal, Minor, Major, Critical, etc.) of an eNodeB, a plurality of eNodeBs, and/or other network components. Each congestion state may be associated with a congestion level. For example, a "Normal" congestion state may indicate that a network component (e.g., eNodeB, etc.) is operating under normal load (e.g., user traffic is within the normal operating rages, etc.). A "Minor" congestion state may indicate that the network component is experiencing congestion and/or operating under an above-average load. A "Major" congestion state may indicate that the network component is experiencing significant congestion and/or operating under heavy load. A "Critical" congestion state may indicate that the network component is experiencing severe congestion, experiencing an emergency situation, or operating under an extremely heavy load.

In the various embodiments, the DSC 144 and/or DPC 146 components may be configured to use the congestion state information to intelligently allocate resources, manage user traffic of the eNodeBs, select target eNodeBs for handovers, determine the quality of service (QoS) levels that are to be given to wireless devices 102 attached to the eNodeBs 116 and/or HeNBs 117, and/or perform other similar operations to intelligently manage the allocation and use of resources by the various networks.

In an embodiment, a dynamic spectrum arbitrage (DSA) system may include a plurality of femtocells (e.g., HeNBs 117) in a first telecommunication network, a home eNodeB gateway (HGW) 145 that includes a HGW processor coupled to each of the plurality of femtocells via first communication links, a dynamic spectrum controller (DSC) 144 that includes a DSC processor coupled to the HGW 145 via a second communication link, and a dynamic spectrum policy controller (DPC) 146 that includes a DPC processor coupled to the DSC 144 via a third communication link. The first communication links may be defined over a S1 interface, the second communication link may be defined over a Xe interface, and the third communication link may be defined over a Xd interface.

The plurality of femtocells may include a home eNodeB (HeNB) 117, and an HeNB may be a femtocell (e.g., a small, portable, or low-power device). Each femtocell or HeNB may include a processor that is configured to monitor network conditions, generate congestion reports based on a result of the monitoring, and send the generated congestion reports to the HGW via the first communication links (via the S1 interface). The congestion reports may include congestion state information that identifies a current congestion state (e.g., Normal, Minor, Major, Critical, etc.) of a femtocell or HeNB 117.

In various embodiments, a femtocell or HeNB processor may be configured to determine whether the femtocell/HeNB has been moved, determine whether there is are suitable serving HGWs 145 in the first telecommunication network in response to determining that the femtocell or HeNB has been moved, establish a communication link to one of the identified serving HGWs 145, and terminate one of the first communication links to the HGW 145 (i.e., the communication link between the femtocell that moved and the old HGW 145). In an embodiment, the femtocell or HeNB processor may perform these operations so that it is connected to, communicates with, or sends congestion reports and information to one serving HGW 145 at a time.

The serving HGW 145 may include a HGW processor that is configured to receive the congestion reports from many femtocells/HeNBs 117 via the first communication links, analyze the information included in the congestion reports, compile the reports, generate congestion state information based on the received congestion reports, and send the generated congestion state information to the DSC 144 via the second communication link (e.g., via the Xe interface). The HGW processor may be configured to generate the congestion state information that the plurality of femtocells appear as a single eNodeB 116 to the DSC 144 component.

The DSC 144 may include a DSC processor configured to receive the congestion state information from the HGW 145 via the second communication link (and many other HGWs 145 and eNodeBs 116), and use the received congestion state information to determine whether there are excess network resources available in the first telecommunication network for allocation and use by a second telecommunication network. The DSC processor may also use the received congestion state information to determine whether to perform handover operations to transfer selected wireless devices 102 to a non-congested target eNodeB 116 or HGW 145. The DSC processor may communicate with the DPC 146 via the third communication link (e.g., via the Xd interface) to cause the DPC 144 to instruct a second DSC in a second telecommunication network to restrict further handovers to one or more of the plurality of femtocells (or to the HGW 145 managing the plurality of femtocells) in the first telecommunication network.

Each of the femtocells (e.g., HeNBs 117) may include a transmitter and a femtocell processor that is configured to monitor network conditions (e.g., network congestion, congestion state, resource usage, resource availability, etc.), generate congestion reports based on a result of the monitoring, and send the generated congestion reports to the HGW 145 via a communication link defined over a S1 interface. The femtocell processor may also be configured to determine that the femtocell has been moved, determine whether there is a suitable serving HGW available, establish a second communication link to an identified serving HGW in response to determining that there is a suitable serving HGW available, and terminate the communication link to the HGW in response to establishing the second communication link to the serving HGW.

In an embodiment, the HGW may include a HGW processor configured to establish communication links to a plurality of femtocells in a first telecommunication network (e.g., via the S1 interface), establish a second communication link to the DSC 144 in the first telecommunication network, receive the congestion reports from the plurality of femtocells, generate congestion state information based on the received congestion reports, and send the generated congestion state information to the DSC via the second communication link.

In embodiment, the HGW processor may be configured to perform load balancing operations to manage the user traffic, such as by intelligently transferring devices between the femtocells to balance the total load across a plurality of femtocells. In an embodiment, the HGW processor may be configured to degrade a local quality of service (QoS) of one or more wireless devices 102 in response to determining that the usage of network resources by a femtocell or in an area exceeds a usage threshold value. The HGW processor may degrade the local QoS of the wireless devices 102 based on priorities associated with tiers into which the wireless devices are grouped. The HGW processor may continue monitoring network resource usage by the femtocells to determine whether the usage of network resources at a femtocell exceeds a second threshold value, and hand off one or more wireless devices to a second femtocell (or to another HGW or eNodeB) when it is determined that the usage of network resources exceeds the second threshold.

Figure 1E:
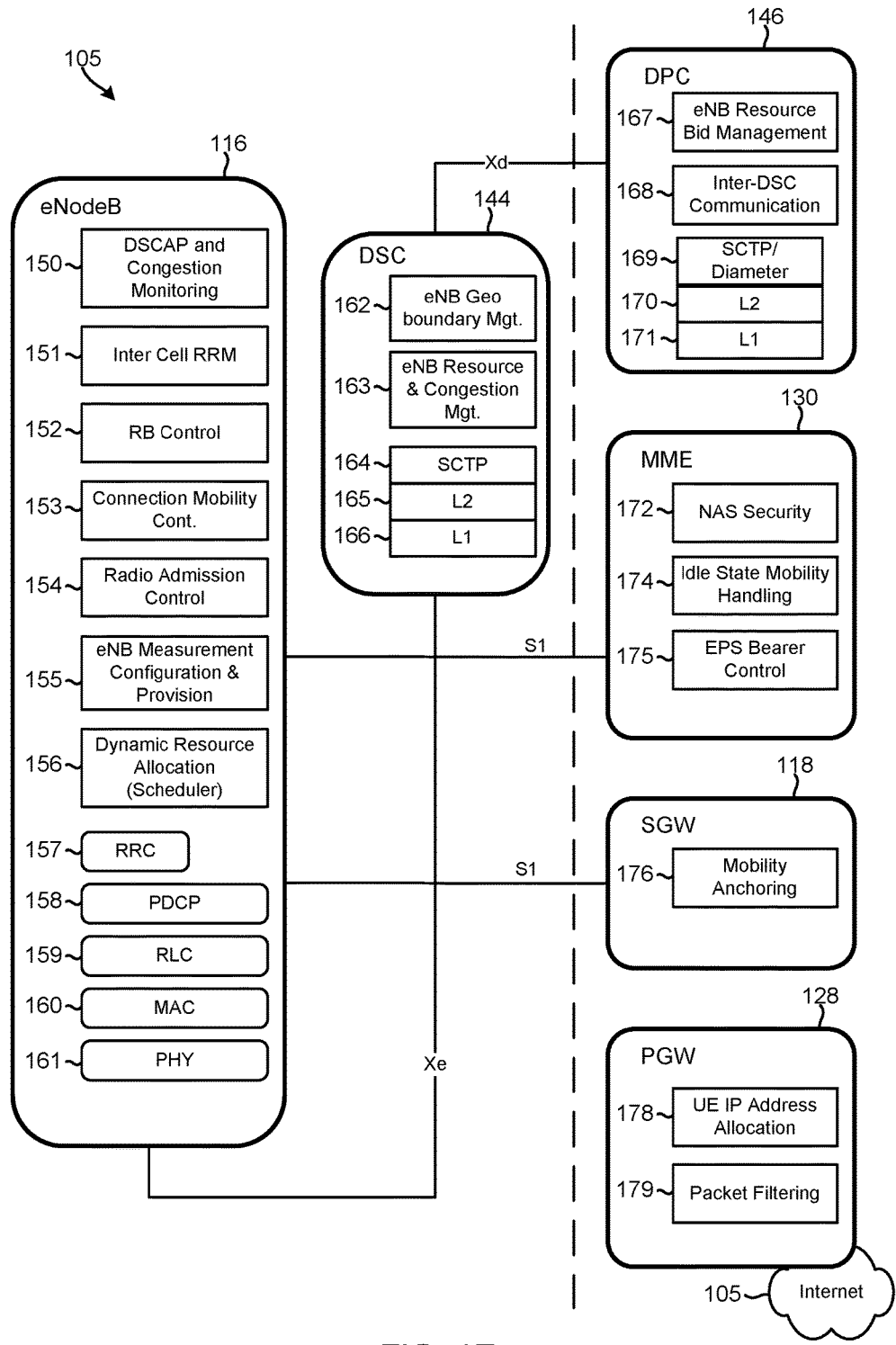

FIG. 1E illustrates various logical and functional components that may be included in a communication system 105 that suitable for use in performing DSA operations in accordance with various embodiments. In the example illustrated in FIG. 1E, the communication system 105 includes an eNodeB 116, a DSC 144, a DPC 146, an MME 130, a SGW 118, and a PGW 128.

The eNodeB 116 may include a DSC application protocol and congestion monitoring module 150, an inter-cell radio resource management (RRM) module 151, a radio bearer (RB) control module 152, a connection mobility control module 153, a radio admission control module 154, an eNodeB measurement configuration and provision module 155, and a dynamic resource allocation module 156. Each of these modules 150-156 may be implemented in hardware, in software, or in a combination of hardware and software.

In addition, the eNodeB 116 may include various protocol layers, including a radio resource control (RRC) layer 157, a packet data convergence protocol (PDCP) layer 158, a radio link control (RLC) layer 159, a medium access control (MAC) layer 160, and a physical (PHY) layer 161. In each of these protocol layers, various hardware and/or software components may implement functionality that is commensurate with responsibilities assigned to that layer. For example, data streams may be received in the physical layer 161, which may include a radio receiver, buffers, and processing components that perform the operations of demodulating, recognizing symbols within the radio frequency (RF) signal, and performing other operations for extracting raw data from the received RF signal.

The DSC 144 may include an eNodeB geographic boundary management module 162, an eNodeB resource and congestion management module 163, a stream control transmission protocol (SCTP) module 164, a Layer-2 (L2) buffer module 165, and a Layer-1 (L1) buffer module 166. The DPC 146 may include an eNodeB resource bid management module 167, an inter-DSC communication module 168, SCTP/DIAMETER module 169, an L2 buffer module 170, and a L1 buffer module 171. The MME 130 may include a non-access stratum (NAS) security module 172, and idle state mobility handling module 173, and an evolved packet system (EPS) bearer control module 174. The SGW 118 may include a mobility anchoring module 176. The PGW 128 may include a UE IP address allocation module 178 and a packet filtering module 179. Each of these modules 162-179 may be implemented in hardware, in software, or in a combination of hardware and software.

The eNodeB 116 may be configured to communicate with the SGW 118 and/or MME 130 via the S1 interface/protocol. The eNodeB 116 may also be configured to communicate with the DSC 144 via the Xe interface/protocol. The DSC 144 may be configured to communicate with the DPC 146 via the Xd interface/protocol.

The eNodeB 116 may be configured to perform various operations (e.g., via modules/layers 150-161) to provide various functions, including functions for radio resource management, such as radio bearer control, radio admission control, connection mobility control, dynamic allocation of resources to wireless devices 102 in both uplink and downlink (scheduling), etc. These functions may also include IP header compression and encryption of user data stream, selection of an MME at UE (or wireless device) attachment when no routing to an MME 130 can be determined from the information provided by the UE, routing of user plane data towards SGW 118, scheduling and transmission of paging messages (originated from the MME), scheduling and transmission of broadcast information (originated from the MME), measurement and measurement reporting configuration for mobility and scheduling, scheduling and transmission of public warning system (e.g., earthquake and tsunami warning system, commercial mobile alert service, etc.) messages (originated from the MME), closed subscriber group (CSG) handling, and transport level packet marking in the uplink. In an embodiment, the eNodeB 116 may be a donor eNodeB (DeNB) that is configured to perform various operations to provide additional functions, such as an S1/X2 proxy functionality, S11 termination, and/or SGW/PGW functionality for supporting relay nodes (RNs).

The MME 130 may be configured to perform various operations (e.g., via modules 172-175) to provide various functions, including non-access stratum (NAS) signaling, NAS signaling security, access stratum (AS) security control, inter-CN node signaling for mobility between 3GPP access networks, idle mode UE reach-ability (including control and execution of paging retransmission), tracking area list management (e.g., for a wireless device in idle and active mode), PGW and SGW selection, MME selection for handovers with MME change, SGSN selection for handovers to 2G or 3G 3GPP access networks, roaming, authentication, bearer management functions including dedicated bearer establishment, support for public warning system (e.g., earthquake and tsunami warning system, commercial mobile alert service, etc.) message transmission, and performing paging optimization. The MME module may also communicate various device state and attach/detach status information to the DSC. In an embodiment, the MME 130 may be configured to not filter paging massages based on the CSG IDs towards macro eNodeBs.

The SGW 118 may be configured to perform various operations (e.g., via module 176) to provide various functions, including mobility anchoring (e.g., for inter-3GPP mobility), serving as a local mobility anchor point for inter-eNodeB handovers, E-UTRAN idle mode downlink packet buffering, initiation of network triggered service request procedures, lawful interception, packet routing and forwarding, transport level packet marking in the uplink (UL) and the downlink (DL), accounting on user and QoS class identifier (QCI) granularity for inter-operator charging, uplink (UL) and the downlink (DL) charging (e.g., per device, PDN, and/or QCI), etc.

The PGW 128 may be configured to perform various operations (e.g., via modules 178-179) to provide various functions, including per-user based packet filtering (by e.g. deep packet inspection), lawful interception, UE IP address allocation, transport level packet marking in the uplink and the downlink, UL and DL service level charging, gating and rate enforcement, DL rate enforcement based on APN-aggregate maximum bit rate (AMBR), etc.

The DSC 144 may be configured to perform various operations (e.g., via modules 162-166) to provide various functions, including managing resource arbitration operations within a network (e.g., PLMN), tracking network resource listings, tracking current bids in progress, tracking executed bids, and tracking bid specific closed subscriber group (CSG) identifiers (CSG-IDs) for mobility management of lessee wireless devices 102 in lessor networks. The DSC 144 may be configured to handover wireless devices 102 from lessee network to lessor network (i.e., perform handins), and handover wireless devices 102 from lessor network back to lessee network (i.e., perform backoff).

The DSC 144 may also be configured to track congestion states of eNodeBs, select target eNodeBs for handovers, and manage traffic on lessor eNodeBs. The DSC 144 may be configured to offload users based on configured policies (e.g. offload lower priority users, offload higher priority users, offload users with specific QoS, etc.) from lessee networks to other less loaded eNodeBs 116 within a lessor network. The DSC 144 may also perform backoff operations to handover a wireless device 102 from lessor network back to the lessee network. The DSC 144 may also be configured to monitor, manage, and/or maintain historic congestion information that is collected or received from one or more eNodeBs in the system.

The DPC 146 may be configured to perform various operations (e.g., via modules 167-171) to provide various functions, including functioning as a resource arbitrage broker between the DSCs 144 of lessor and lessee networks (e.g., PLMNs), listing resources from various lessor networks for auction, and managing the auction process. The DPC 146 may be configured to send notifications of outbid, bid win, bid cancel and bid withdrawal and bid expiry to DSCs 144, install bid specific charging rules in the online and/or offline charging systems of lessee and lessor networks, and coordinate resource usage between DSCs 144 by acting as gateway between lessee and lessor DSCs 144.

Figure 1F:
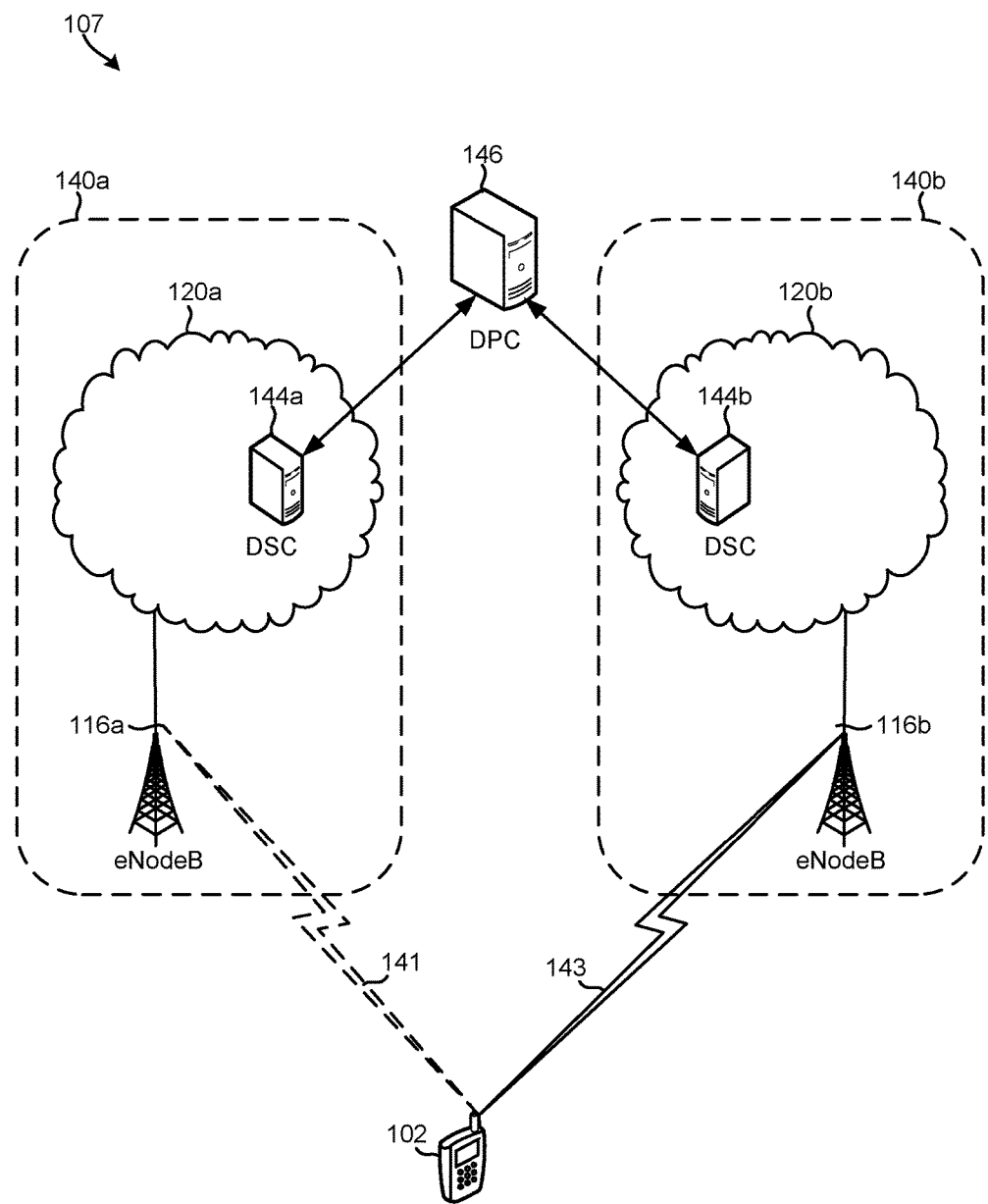

FIG. 1F illustrates network components and information flows in an example communication system 107 that includes two E-UTRANs 140a, 140b interconnected by a DPC 146 configured to manage DSA operations and interactions. In the example illustrated in FIG. 1F, each E-UTRAN 140a, 140b includes an eNodeB 116a, 116b that is outside of its core network 120a, 120b, and a DSC 144a, 144b that is inside of the core network 120a, 120b.

The DSCs 144a, 144b may be configured to communicate with the DPC 146 via Xd interface. The DSCs 144a, 144b may also be connected, directly or indirectly, to various network components in their respective core networks 120a, 120b, such as a PCRF 134, HSS 132 and a PCEF/PGW 128 (not illustrated in FIG. 1F). In an embodiment, one or more of the DSCs 144a, 144b may be connected directly to one or more of the eNodeBs 116a, 116b.

In addition to the above-mentioned connections and communication links, the system 107 may include additional connections/links to accommodate data flows and communications between components in different E-UTRANs (e.g., E-UTRANS 140a and 140b). For example, the system 107 may include a connection/communication link between an eNodeB 116b in the second E-UTRAN 140b to an SGW 118 in the first E-UTRAN 140a. As another example, the system 107 may include a connection/communication link between a SGW 118 in the second E-UTRAN 140b to a PGW 128 in the first E-UTRAN 140a. To focus the discussion of the relevant embodiments, these additional components, connections, and communication links are not illustrated in FIG. 1F.

As is discussed in detail further below, the DSCs 144a, 144b may be configured to send information regarding the availability of spectrum resources (e.g., information received from an eNodeB, PCRF, PCEF, PGW, etc.) to the DPC 146. This information may include data relating to current and expected future usage and/or capacity of each network or sub-network. The DPC 146 may be configured to receive and use such information to intelligently allocate, transfer, manage, coordinate, or lease the available resources of the first E-UTRAN 140a to the second E-UTRAN 140b, and vice versa.

For example, the DPC 146 may be configured to coordinate the allocation of spectrum resources to the second E-UTRAN 140b (i.e., lessee network) from the E-UTRAN 140a (i.e., lessor network) as part of the dynamic spectrum arbitrage operations. Such operations may allow a wireless device 102 that is wirelessly connected to the eNodeB 116b in the second E-UTRAN 140b via a communication link 143 to be handed off to an eNodeB 116a in the first E-UTRAN 140a so that it may use the allocated spectrum resources of the first E-UTRAN 140a. As part of this handoff procedure, the wireless device 102 may establish a new connection 141 to the eNodeB 116a in the first E-UTRAN 140a, terminate the wireless connection 143 to the original eNodeB 116b, and use the allocated resources of the first E-UTRAN 140a as if they are included in the second E-UTRAN 140b. The DSA operations may be performed so that the first DSC 144a is a lessor DSC for a first resource/period of time, and a lessee DSC for a second resource or another period of time.

In an embodiment, the DSA and/or handoff operations may be performed so that the wireless device 102 maintains a data connection to (or a data connection that is managed by) the original network after it is handed off. For example, DSA and/or handoff operations may be performed so that the wireless device 102 maintains a dataflow connection to a PGW 128 in the second E-UTRAN 140b after being handed off to the eNodeB 116a in the first E-UTRAN 140a.

Figure 2A:
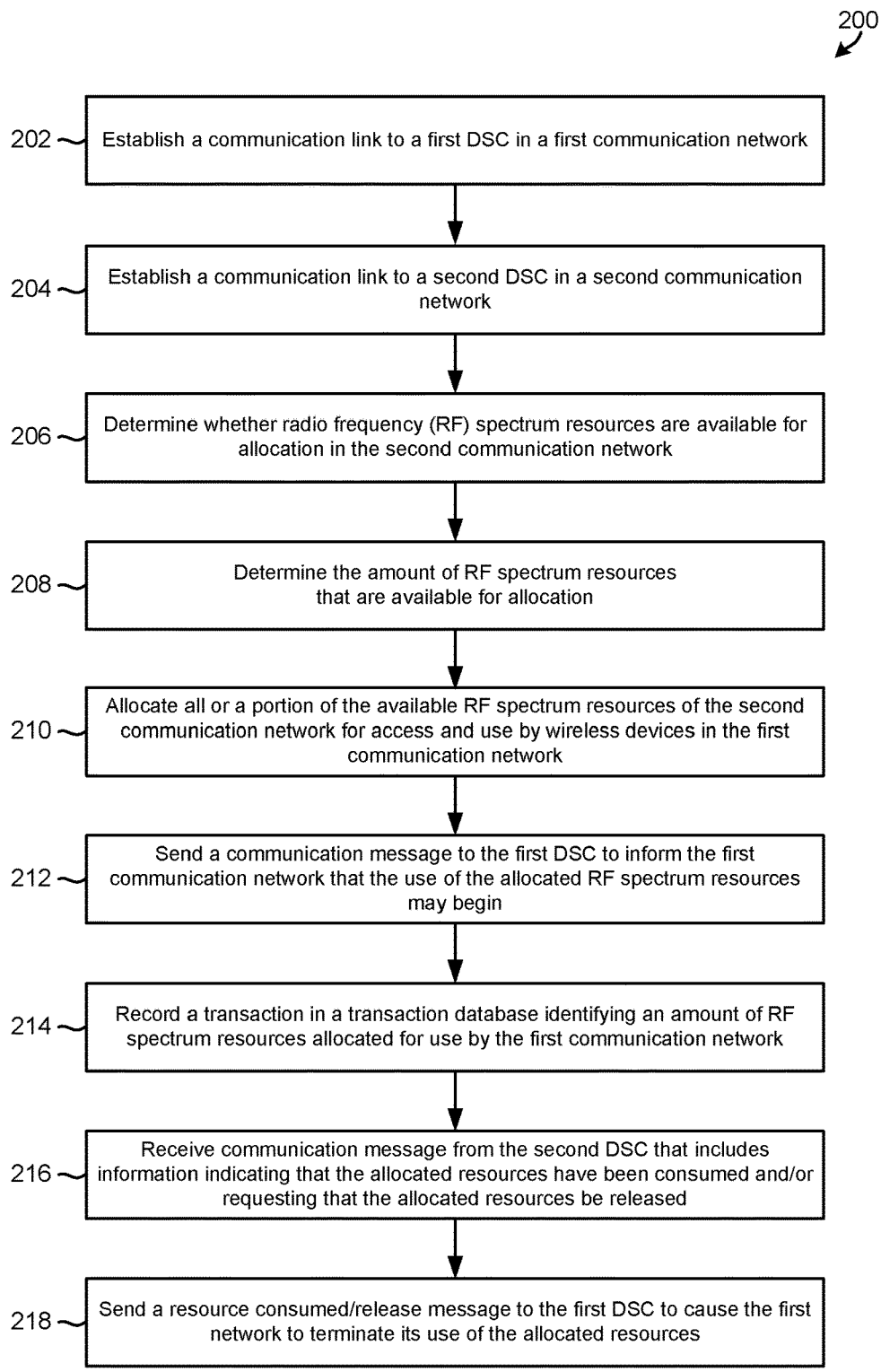
FIG. 2A is a process flow diagram illustrating a dynamic spectrum arbitrage (DSA) method of allocating resources from the perspective of a dynamic spectrum policy controller (DPC) in accordance with an embodiment.

FIG. 2A illustrates an example DSA method 200 of allocating resources in accordance with an embodiment. Method 200 may be performed by a processing core in a DPC 146 component (e.g., server computing device, etc.).

In block 202, the DPC 146 may establish a first communication link to a first DSC 144a in a first communication network (e.g., E-UTRAN, etc.). In block 204, the DPC 146 may establish a second communication link to a second DSC 144b in a second communication network. In block 206, the DPC 146 may determine whether radio frequency (RF) spectrum resources are available for allocation within the second communication network. This may be accomplished by using the DSAAP protocol to communicate with a DSC 144 in the second communication network via the second communication link, which may be a wired or wireless communication link. In block 208, the DPC 146 may determine the amount of RF spectrum resources that are available for allocation. In block 210, the DPC 146 may perform various operations to allocate all or a portion of the available RF resources of the second communication network for access and use by wireless devices 102 in the first communication network.

In block 212, the DPC 146 may send a communication message to the first DSC 144a (e.g., by using the DSAAP protocol) to inform the first communication network that the use of the allocated RF spectrum resources may begin. In block 214, the DPC 146 may record a transaction in a transaction database identifying an amount of RF spectrum resources allocated for use by the first communication network.

In block 216, the DPC 146 may receive a communication message from the second DSC 144b that includes information indicating that the allocated resources have been consumed and/or requesting that the allocated resources be released. In block 218, the DPC 146 may send a resource consumed/release message to the first DSC 144a to cause the first network to terminate its use of the allocated resources.

Figure 2B:
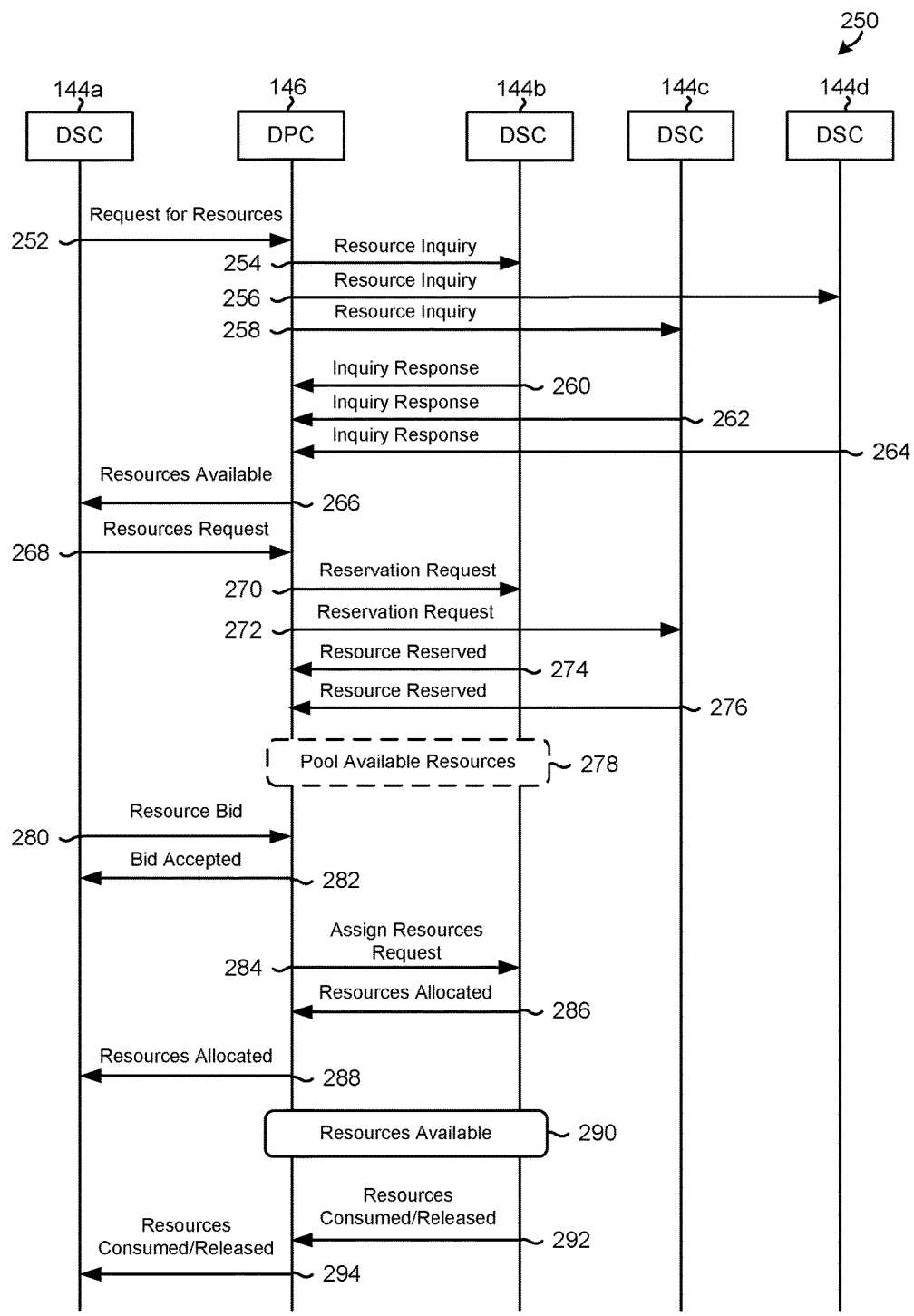
FIG. 2B is a message flow diagram illustrating message communications between components of a DSA communication system when allocating resources in accordance with an embodiment.

FIG. 2B illustrates example information flows between a DPC 146 and a plurality of DSCs 144a-d when performing another embodiment DSA method 250 to allocate resources. In the description below, the DSA method 250 is discussed from the perspective of the DPC 146 component, and may be performed by a processing core in the DPC 146. However, it should be understood that the DSA method 250 may be performed by processing cores in a DPC 146 component, processing cores in DSC 144a-d components, or a combination thereof. In addition, it should be understood that all the interactions and communications between the DPC 146 and the other components may be accomplished by DSAAP components and/or using the DSAAP protocol. As such, all such interactions and communications may be included in the DSAAP protocol.

In operation 252, a processing core in a DPC 146 component may receive a "request for resources" communication message from a first DSC 144a component in a first network (e.g., E-UTRAN, etc.). It should be understood that the "request for resources" communication message and all other communication messages discussed in this application may be DSAAP messages.

The "request for resources" communication message may include information suitable for informing the DPC 146 that the first network is interested in purchasing, leasing, accessing, and/or using resources from other networks. The "request for resources" communication message may also include information suitable for identifying the types and/or amounts of resources (e.g., RF spectrum resources, etc.) that are requested by the first network, the types and capabilities of the wireless devices 102 to which the requested resources will be allocated, and other similar information.

In operations 254, 256, and 258 the DPC 146 may generate and send a "resource inquiry" communication message to each of a second DSC 144b component in a second network, a third DSC 144c component in a third network, and a fourth DSC 144d component in a fourth network, respectively. The DPC 146 may be configured to generate the "resource inquiry" communication messages to include various component, device, and resource requirements, criteria, and information. For example, the DPC 146 may generate a "resource inquiry" communication message to include information identifying the types, capabilities, and geographic criteria of user wireless devices 102 in the first network (and other networks) to which resources are to be allocated. The geographic criteria may include a geographic location, a geographic polygon, and/or license area for a user wireless device 102 to which resources will be allocated.

In operations 260 and 262, the DPC 146 may receive "resource inquiry response" communication messages from the second and third DSCs 144b, 144c. These "resource inquiry response" communication messages may include information identifying the availability of excess resources that comply with the requirements/criteria included in the resource inquiry messages. In operation 264, the DPC 146 may receive another "resource inquiry response" communication message from the fourth DSC 144d. This "resource inquiry response" communication messages may include information indicating that the fourth network does not include resources that meet the requested requirements/criteria.

In an embodiment, as part of operations 260-264, the DPC 146 may update a database record to identify the second and third networks as having resources available for allocation and/or to identify the fourth network as not including such resources.

In operation 266, the DPC 146 may generate and send a "resource availability" communication message to a plurality of DSCs in a plurality of networks, including the first DSC 144a in the first network. The DPC 146 may be configured to generate the "resource availability" communication message to include information that is suitable for informing the networks that resources are available for allocation. In an embodiment, the DPC 146 may be configured to inform the networks that resources are available for allocation by broadcasting a communication signal that includes information suitable for informing the networks that resources are available for allocation via auction and/or an auction start time for the auction.

In operation 268, the DPC 146 may receive a "resource reservation request" communication message from the first DSC 144a. The received "resource reservation request" communication message may include information suitable for informing the DPC 146 that the first network intends to participate in the auction and/or bid on at least a portion of the available resources.

In operations 270 and 272, the DPC 146 may send the "resource reservation request" communication message to the second and third DSCs 144b, 144c, respectively. The "resource reservation request" communication message may include information suitable for causing the second and third DSCs 144b, 144c to reserve all or a portion of their available resources for allocation and use by other networks.

In operations 274 and 276, the DPC 146 may receive a "resource reservation response" communication message from each of the second and third DSCs 144b, 144c. The "resource reservation response" messages may include information suitable for informing the DPC 146 that the requested resources that have been reserved and/or information suitable for identifying the reserved resources.

Optionally, in operation block 278, the DPC 146 may pool the reserved resources for allocation and use by wireless devices 102 in other networks (e.g., the first network). For example, the DPC 146 may combine a block of spectrum reserved in the second network with a block of spectrum reserved in the third network. As another example, the DPC 146 may pool the resources available in the first and fourth channels of a block of spectrum reserved in the second network.

In operation 280, the DPC 146 may receive "resource bid" communication messages from a plurality of networks, including from the first DSC 144a in the first network. Each "resource bid" communication message may include a bid or offer for accessing, using, leasing, and/or purchasing a resource, as well as other related bid information (e.g., price, requested allocation/access methods, etc.). As part of operation 280, the DPC 146 may determine whether the received resource bids comply with the policies and rules of the DSA system and/or with requirements set forth by the networks offering the resources for allocation (e.g., meet the minimum asking price, etc.).

In operation 282, the DPC 146 may accept the bid/offer from the first network in response to determining that the resource bid received from the first network complies with the policies/rules of the DSA system and with requirements set forth by the resource offering network (e.g., offers a monetary amount for the use of all or a portion of the resources in the pool of available resources that is greater than or equal to a minimum amount specified by the second network). Also in operation 282, the DPC 146 may generate and send a "bid acceptance" communication message to the first DSC 144a.

In operation 284, the DPC 146 may allocate the resources of the second network for access and used by wireless devices 102 in the first network by sending an "assign resources request" communication message to the second DSC 144b. That is, in operation 284, the DPC may determine that the portion of the resources (e.g., in the pool of available resources) won by the first DSC 144a are fully available via the second network, and in response, only send the assign resources request message to the second network.

In operation 286, the DPC 146 may receive a "resources allocated" communication message from the second DSC 144b. In operation 288, the DPC 146 may send the "resources allocated" communication message to the first DSC 144a to inform the first network that the resources have been allocated for access and used by its wireless devices 102 and/or that the use of the allocated resources may begin. In operation block 290, the DPC 146 may record a transaction in a transaction database identifying these resources as being allocated for access and use by the first network.

In operation 292, the DPC 146 may receive a "release resources" communication message from the second DSC 144b that includes information indicating that the allocated resources have been consumed and/or information suitable for requesting that the allocated resources be released. In operation 294, the DPC 146 may send a resource consumed/release message to the first DSC 144a to cause the first network to terminate its use of the allocated resources.

FIGS. 3-7 illustrate an embodiment DSA method 300 for allocating and accessing resources in a communication system that includes a DPC 146 component, two DSC 144a, 144b components, and wireless devices 102. All or portions of DSA method 300 may be performed by processing cores in a DPC 146, DSCs 144a-b, and/or wireless device 102. In the various embodiments, any of all of the interactions and communications between the components 146, 144a, 144b, and 102 may be accomplished or facilitated by DSAAP components and/or using the DSAAP protocol. As such, all such interactions and communications may be included in the DSAAP protocol.

Figure 3:
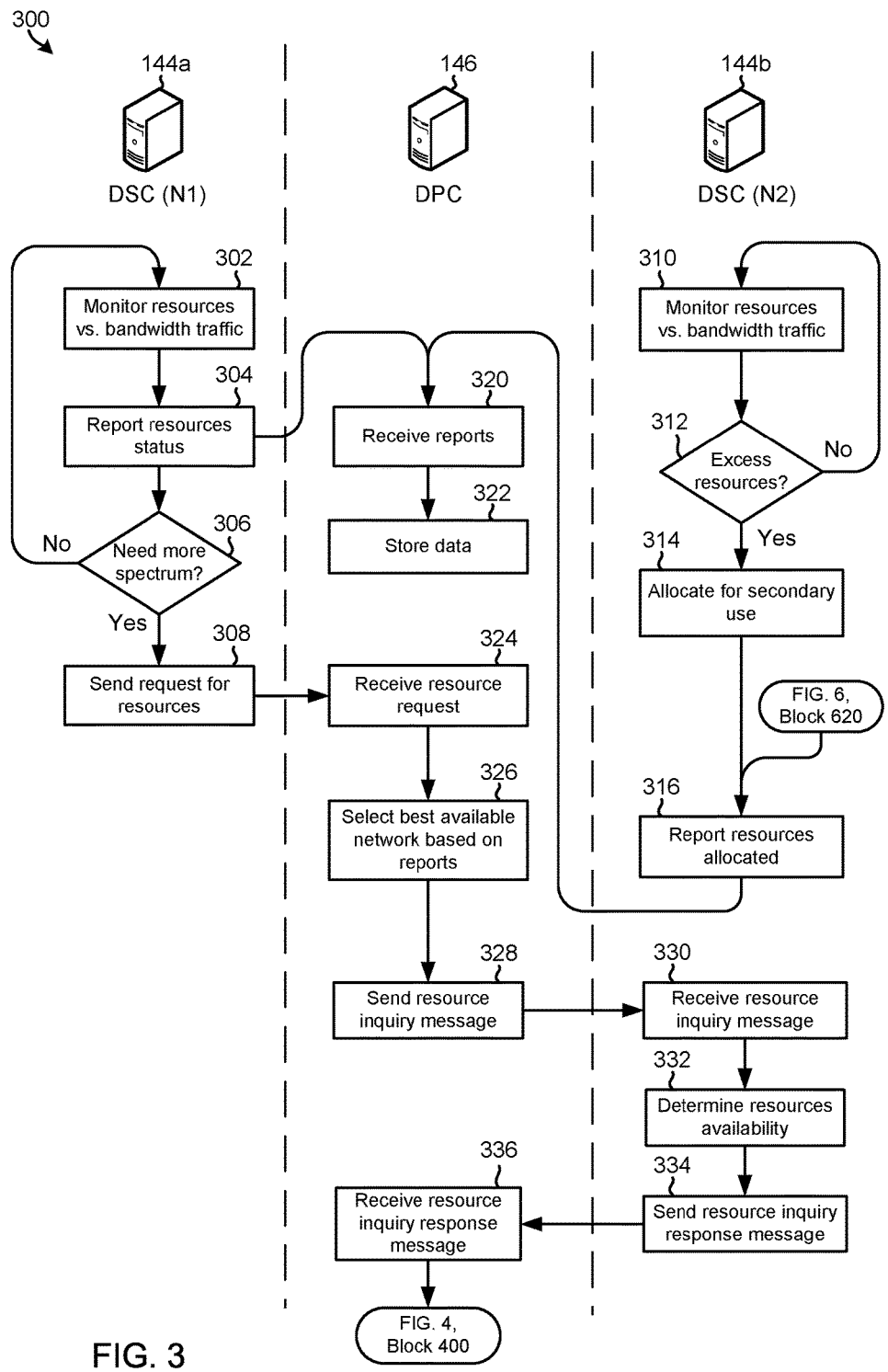
FIGS. 3 through 7 are process flow diagrams illustrating an embodiment DSA method of allocating and accessing resources in a communication system that includes a DPC, two dynamic spectrum controllers (DSCs), and a wireless device.

With reference to FIG. 3, in block 302, a first DSC 144a in a first network may monitor user traffic (e.g., call and data traffic, etc.) as compared to the total spectrum resources available to the first network. In block 304, the first DSC 144a may generate a resource status report based on a result of its monitoring, record/store the resource status report in memory, and send a resource status report to the DPC 146 via a resources status report communication message. In determination block 306, the first DSC 144a may determine, based on the received resource status reports, whether additional resources are required (and/or whether there is a high probability that additional resources will be required in the near future) to provide adequate service to the existing wireless devices 102 in the first network. In response to determining that additional resources are required (i.e., determination block 306="Yes"), in block 308, the first DSC 144a may send a "request for resources" communication message to the DPC 146. In response to determining that additional resources are not required (i.e., determination block 306="No"), the first DSC 144a may continue monitoring user traffic and/or perform other DSC operations in block 302.

In block 310, a second DSC 144b in a second network may monitor user traffic as compared to the total spectrum resources available to the second network, generate resource status reports, and/or perform any or all of the DSC operations discussed in this application. In determination block 312, the second DSC 144b may determine whether there is an excess amount of resources available in the second network. In response to determining that there are no excess resources available in the second network (i.e., determination block 312="No"), in block 310, the second DSC 144b may continue monitoring user traffic and/or performing other DSC operations.

In response to determining that there is an excess amount of resources available in the second network (i.e., determination block 312="Yes"), in block 314, the second DSC 144b may mark, designate, or allocate all or portions of its excess resources for access and use by other networks (e.g., the first network, etc.). In block 316, the second DSC 144b may generate a resource allocation report, and send the generated resource allocation report to the DPC 146 (e.g., via a resource communication message). The DSC 144b may be configured to generate the resource allocation report to include information identifying the resources (or portions or amounts of resources) that are available for allocation and/or that have been marked, designated, or allocated by the second network.

In block 320, the DPC 146 may receive various resource status and allocation reports from DSCs 144 in many different networks, including the first and second DSCs 144a, 144b in the first and second networks. These reports may include information identifying various characteristics, criteria, requirements, and conditions of the networks and their components, such as the ratio of the detected user traffic to the total available spectrum resources, the amount of resources that are required by a network, the amount of resources that are available for allocation in a network, the types and capabilities of the wireless devices 102 that will use the allocated resources, system requirements that must be met before the wireless devices 102 access the allocated resources, network rules and policies with respect to access and use of resources, and other similar information.

In block 322, the DPC 146 may store the received reports (e.g., resource status reports, resource allocation reports, etc.) in memory (e.g., a non-volatile memory). In block 324, the DPC 146 may receive a request for resources from DSCs 144 in different networks, including the first DSC 144a in the first network. In block 326, the DPC 146 may use the received/stored information (e.g., information received in requests for resources, resource allocation reports, resource status reports, etc.) to identify and select the most suitable/best available network from which the first network may lease or purchase additional resources. In the example illustrated in FIG. 3, the DPC 146 identifies and selects the second network as the most suitable network to provide resources to the first network.

In block 328, the DPC 146 may send a resource inquiry communication message to the second DSC 1144b. In block 330, the second DSC 1144b may receive the resource inquiry communication message. In block 332, the second DSC 1144b may determine the availability, amounts, and/or quantity of the excess resources that are marked, designated, or allocated by the second network. In block 334, the second DSC 1144b may generate and send a "resource inquiry response" communication message to the DPC 146. The second DSC 1144b may generate resource inquiry response to include information suitable for use in identifying the availability and quantity of the resources that are marked, designated, or allocated for access and use by other networks (e.g., the first network). In block 336, the DPC 146 may receive the "resources inquiry response" communication message from the second DSC 1144b, and in response, perform the operations of determination block 400 illustrated in FIG. 4.

Figure 4:
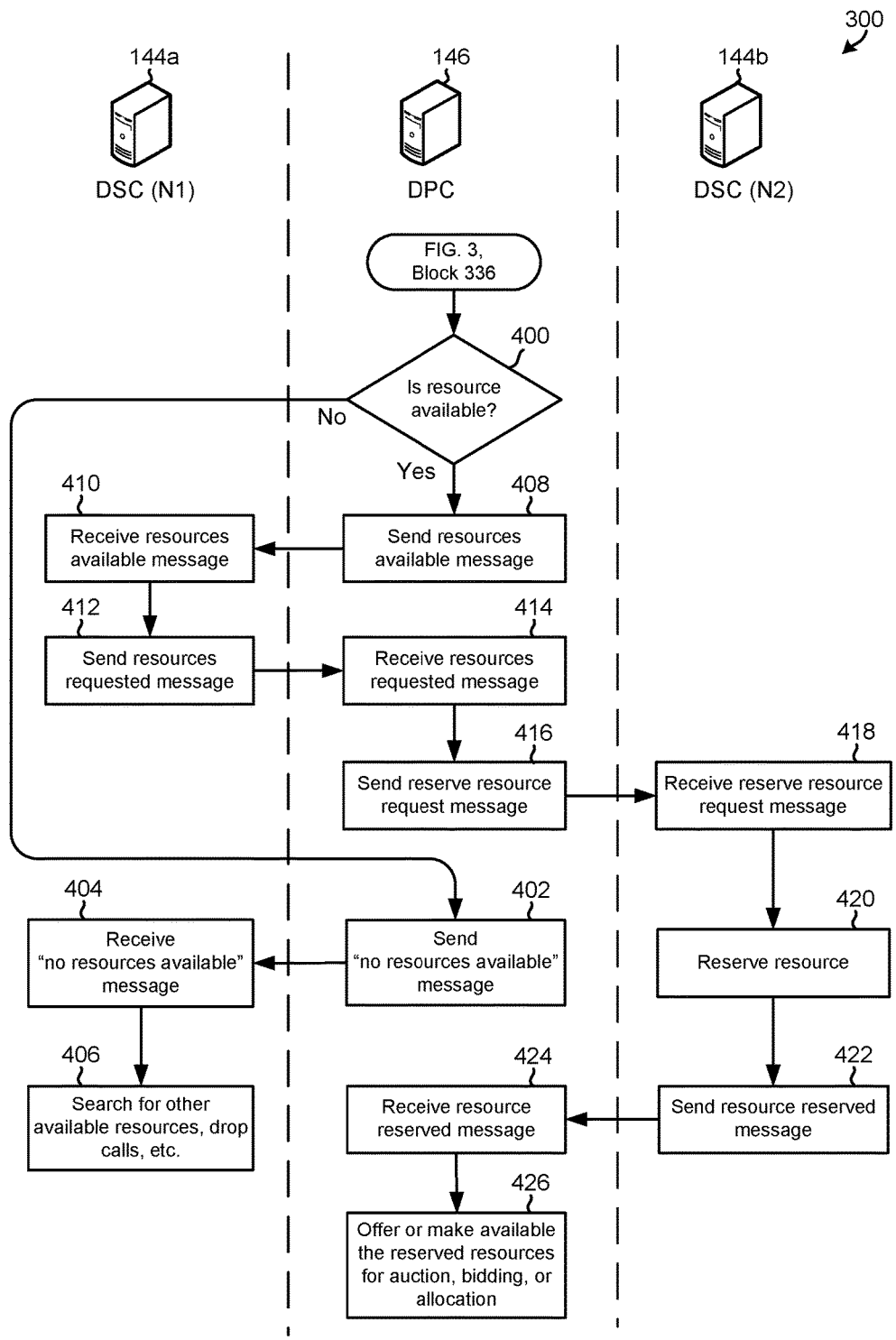

With reference to FIG. 4, in determination block 400, the DPC 146 may determine whether resources are available based on the data (e.g., resources inquiry response message) received from the second DSC 144b in the second network. For example, the DPC 146 may determine that the identified resources are not available in response to determining that all or a portion of the resources were purchased or won by other bidders before they were reserved.

In response to determining that the resources are not available (i.e., determination block 400="No"), in block 402, the DPC 146 may send a "no resources available" communication message to the first DSC 144a in the first network. In block 404, the first DSC 144a may receive the "no resources available" communication message. In block 406, the first DSC 144a may search (e.g., via the DPC 146) for other available resources, request resources from a different network, request different resources, terminate connections or communication sessions with users to free-up resources, or perform other similar operations to manage network traffic and congestion in the first network.

In response to determining that the resources are available (i.e., determination block 400="Yes"), in block 408, the DPC 146 may send a "resources available" communication message to the first DSC 144a. The resources available message may include information that may be used by the first DSC 144a to determine the quality and quantity of resources in the second network that may be used by wireless devices 102 in the first network.

In block 410, the first DSC 144a may receive the resources available communication message sent from the DPC 146. In block 412, the first DSC 144a may determine the amount/quantity of resources that the first network requires and/or will attempt to acquire, and send this and other resource information to the DPC 146 in a "request resources" communication message.

In block 414, the DPC 146 may receive the "request resources" message from the first DSC 144a. In block 416, the DPC 146 may use information included in received message to generate and send a "reserve resources request" communication message to the second DSC 144b in the second network.

In block 418, the second DSC 144b may receive the "reserve resource request" message from the DPC 146. In block 420, the second DSC 144b may use the information included in the received "reserve resources request" message to reserve the requested quantity of allocated resources for access and use by components in other networks. In block 422, the second DSC 144b may send a "resource reserved" communication message to the DPC 146 to confirm that the requested quantity of resources has been reserved and/or to identify the reserved resources.

In block 424, the DPC 146 may receive the "resource reserved" communication message from the second DSC 144b. In block 426, the DPC 146 may offer the reserved resources for auction and/or begin accepting resource bids on the reserved resources.

Figure 5:
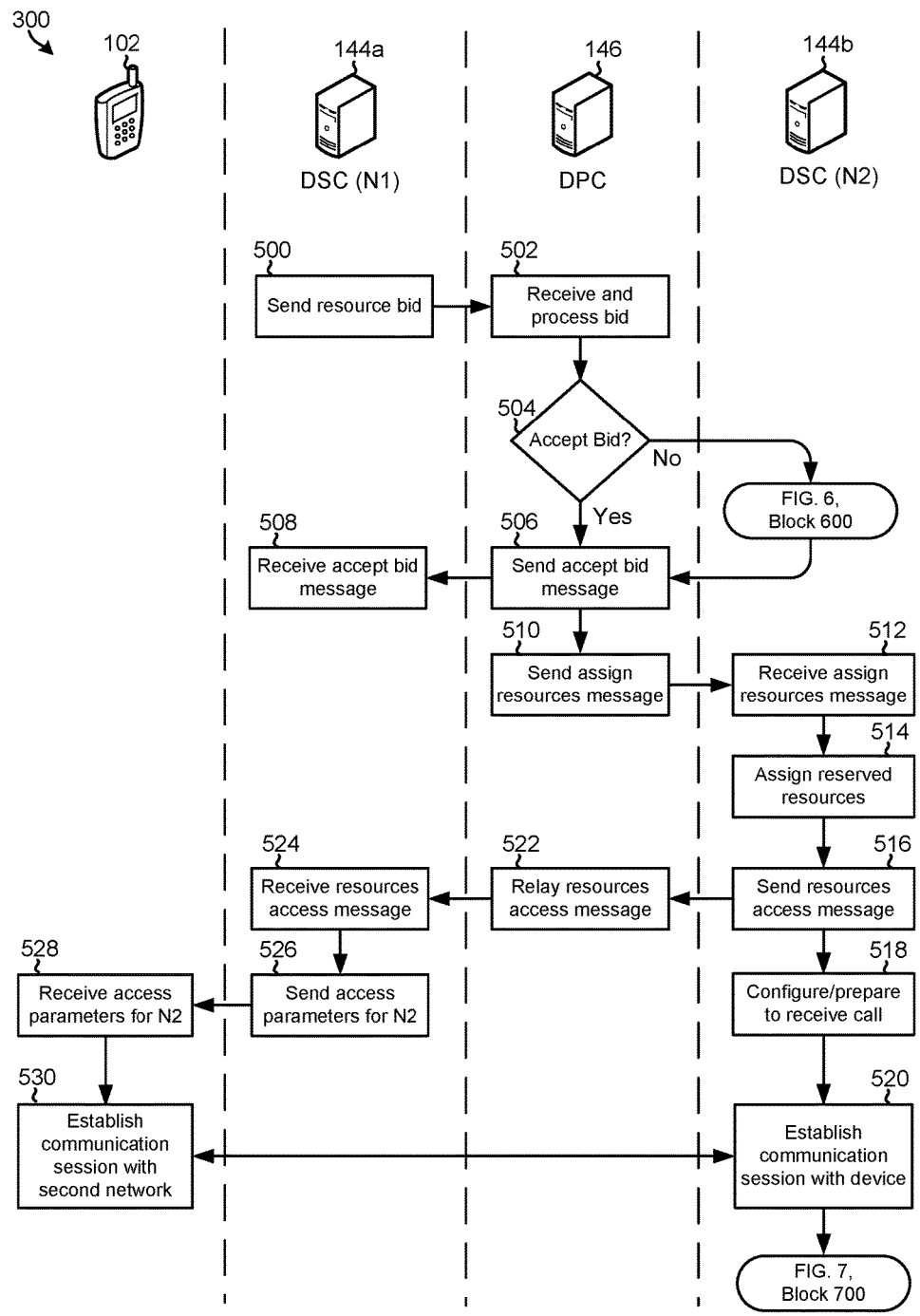

FIG. 5 illustrates a bidding procedure of the DSA method 300 that may be performed after the DPC 146 offers the reserved resources for auction and/or begins accepting resource bids on the reserved resources (e.g., after performing the operations of block 426 illustrated in FIG. 4).

With reference to FIG. 5, in block 500, the first DSC 144a in the first network may negotiate access to the reserved resources of second network by sending a resource bid (e.g., via a communication message) to the DPC 146. In block 502, the DPC 146 may receive the resource bid from the first DSC 144a.

In determination block 504, the DPC 146 may determine whether the received resource bid is to be accepted, which may be accomplished by determining whether the resource bid complies with the policies and rules of the DSA system and the requirements of the second network (e.g., is greater than a minimum amount, etc.). In response to determining that the resource bid received from the first DSC 144a is to be accepted (i.e., determination block 504="Yes"), in block 506, the DPC 146 may send an "accept bid" communication message to the first DSC 144a. In block 508, the first DSC 144a may receive the "accept bid" message and wait to receive resource access instructions. In block 510, the DPC 146 may send an "assign resources" communication message to the second DSC 144b in the second network.

In block 512, the second DSC 144b may receive the "assign resources" communication message from the DPC 146. In block 514, the second DSC 144b may use the information included in the received "assign resources" message to assign all or portions of its reserved resources for access and use by components in the first network. In block 516, the second DSC 144b may generate a "resources access" communication message that includes information (e.g., access parameters, etc.) that may be used by a wireless device 102 (i.e., in the first network) to access the assigned resources, and the send the "resources access" message to the DPC 146. In block 518, the second DSC 144b may perform various operations to prepare for establishing a communication session/link to wireless device 102 in the first network, such as by configuring or preparing to receive a voice or data call.

In block 522, the DPC 146 may receive the "resources access" communication message from the second DSC 144b, and relay the resources access message to the first DSC 144a. In block 524, the first DSC 144a may receive the "resources access" message from the DPC 146. The received "resource access" message may include access parameters that may be used by the wireless devices 102 to access the allocated resources of the second network. In block 526, the first DSC 144a may send access parameters to wireless devices 102 that have communication sessions with the first network and/or to the wireless devices 102 that the first network has designated/marked for migration to other networks.

In block 528, the wireless devices 102 may receive the access parameters of second network from the first DSC 144a. In blocks 530 and 520, the wireless devices 102 and/or second DSC 142b may perform various operations to establish a communication session/link between the wireless devices 102 and the second network. The second DSC 144b may then perform the operations of block 700 illustrated in FIG. 7 and discussed further below.

As mentioned above, in determination block 504, the DPC 146 may determine whether the resource bid received from the first DSC 144a is to be accepted. In response to determining that the resource bid received from the first DSC 144a is not to be accepted (i.e., determination block 504="No"), the DPC 146 may perform the operations of block 600 illustrated in FIG. 6.

Figure 6:
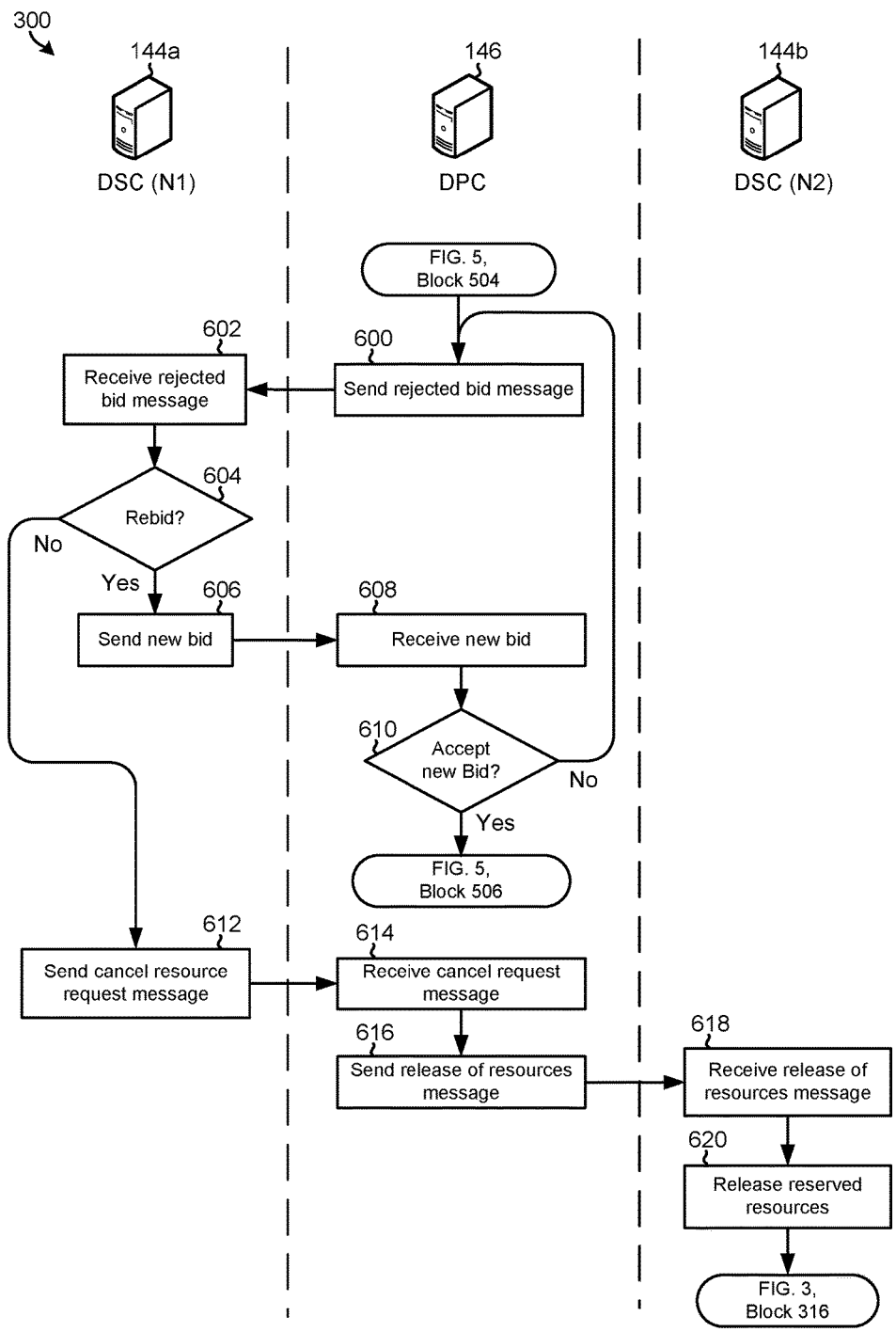

With reference to FIG. 6, in block 600, the DPC 146 may send a "rejected bid" communication message to the first DSC 144a. In block 602, the first DSC 144a may receive the "rejected bid" message from the DPC 146. In determination block 604, the first DSC 144a may determine whether the first network will/should rebid for the resources. In response to determining that the first network will/should rebid for the resources (i.e., determination block 604="Yes"), in block 606, the first DSC 144a may send a new resource bid (e.g., in a resource bid communication message) to the DPC 146.

In block 608, the DPC 146 may receive the new resource bid (or rebid) from the first DSC 144a. In determination block 610, the DPC 146 may determine whether to accept the new resource bid, such as by determining whether the new resource bid complies with the policies and rules of the DSA system and the requirements of the second network. In response to determining that the new resource bid is to be accepted (i.e., determination block 610="Yes"), the DPC 146 may perform the operations of block 506 illustrated in FIG. 5. In response to determining that the new resource bid is to not be accepted (i.e., determination block 610="No"), the DPC 146 may perform the operations of block 600.

In response to determining that the first network should rebid for the resources (i.e., determination block 604="No"), in block 612, the first DSC 144*a* may send a "cancel resource request" communication message to the DPC 146. In block 614, the DPC 146 may receive the "cancel resource request" message from the first DSC 144*a*. In block 616, the DPC 146 may send a "release of resources" communication message to the second DSC 144*b*.

In block 618, the second DSC 144*b* may receive the "release of resources" message from the DPC 146. In block 620, the second DSC 144*b* may release the reserved resources so that they may be used by other networks. The second DSC 144*b* may then report the status of the allocated resources to DPC 146, which may be accomplished by performing the operations of block 316, which is illustrated in FIG. 3 and discussed above.

Figure 7:
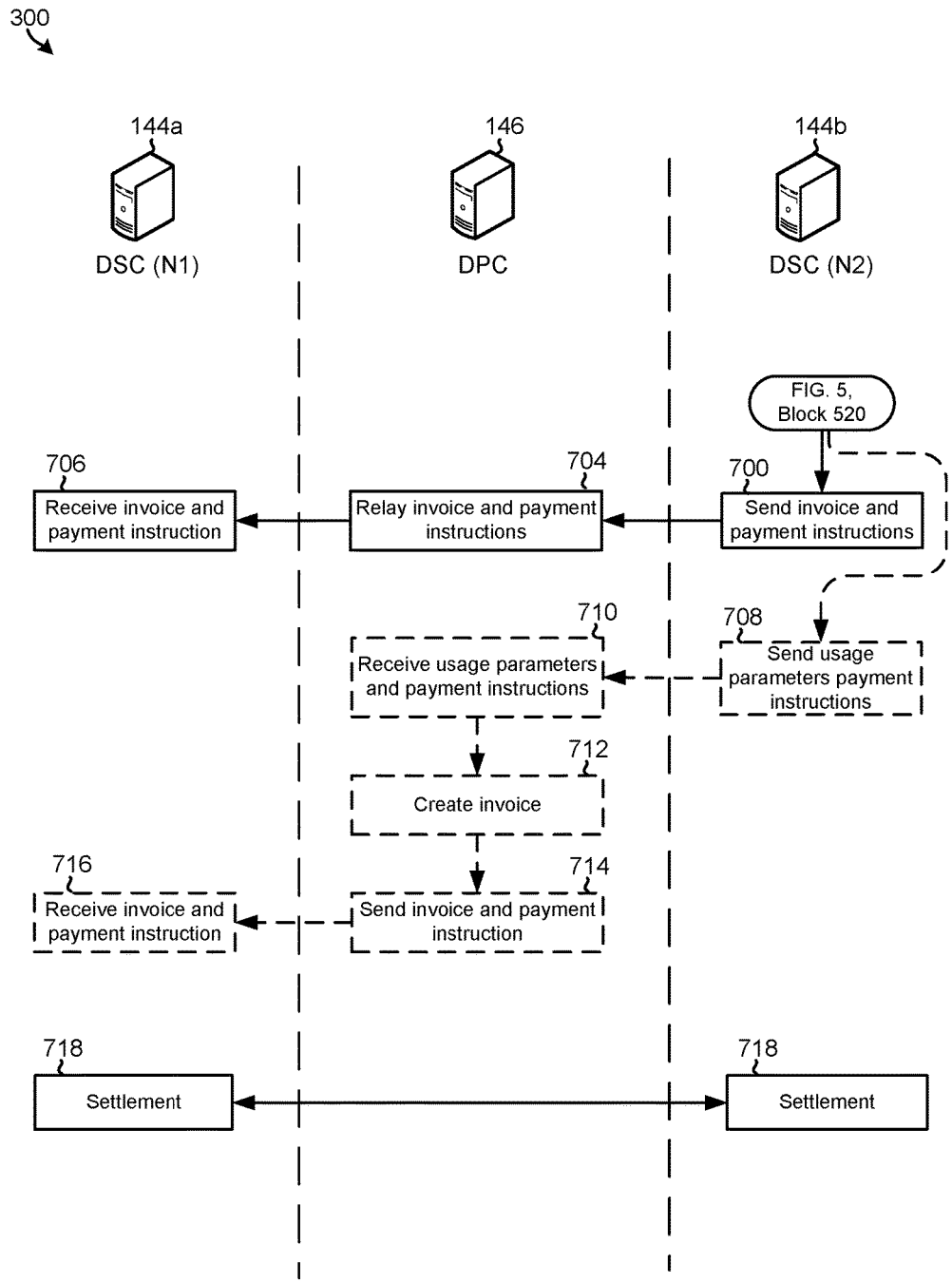

FIG. 7 illustrates settlement procedure of the DSA method 300 that may be performed after second network provides access to the secondary user wireless devices 102 in the first network (i.e., after performing the operations of block 520 illustrated in FIG. 5).

In block 700, the second DSC 144*b* may send invoices and payment instructions relating to the use of allocated resources by the first network to the DPC 146. In block 704, the DPC 146 may relay the received invoice and payment instructions to the first DSC 144*a*. In block 706, the first DSC 144*a* may receive the invoices and payment instructions, and settle the charges with the second network in block 718.

Optionally or alternatively, in block 708, the second DSC 144*b* may send usage parameters and payment instructions to the DPC 146. In block 710, the DPC 146 may receive the usage parameters and payment instructions from the second DSC 144*b*. In block 712, the DPC 146 may create an invoice for the access and use of the resources. In block 714, the DPC 146 may send the invoice to the first DSC 144*a* in the first network. In block 716, the first DSC 144*a* may receive the invoice and payment instructions, and perform various operations to settle the charges with second network in block 718.

In the various embodiments, the DPC 146 and DSC 144 components may be configured to communicate via an interface, which may be implemented in, or provided via, a dynamic spectrum arbitrage application part (DSAAP) protocol/module/component that is defined over the Xe and/or Xd reference points. The DSAAP may allow, facilitate, support, or augment communications between the DPC 146 and DSC 144 so as to improve the efficiency and speed of the DSA system and telecommunication network. In various embodiments, all or portions of the DSAAP module/component may be included in a DPC 146 component, a DSC 144 component, in a component that is independent of the DPC 146 and DSC 144 components, or any combination thereof. The DSAAP module/component may allow these and other DSA components to communicate information using the DSAAP protocol.

For example, the DSAAP may allow the DPC 146 and DSC 144 components to communicate specific information and/or perform operations that together provide various functions, including a DSC registration function, resource availability advertisement function, bidding and allocation of resources functions, handing off lessee users to lessor network function, backoff from lessor networks function, error handling function (e.g., reporting of general error situations for which function specific error messages are not defined, etc.), DSC de-registration function, error indication function, DSC bidding success and failure indication functions, and DSC resource allocation withdrawal function. In various embodiments, these functions may be provided, implemented, or accomplished by configuring the DPC 146 and/or DSC 144 components to perform one or a combination of the DSAAP methods discussed below with reference to FIGS. 8A-17B. Using the DSAAP protocol and performing the DSAAP methods may include communicating via one or more DSAAP messages.

In various embodiments, the DSAAP messages used to communicate information between the DSC 144 and DPC 146 may include a DSC REGISTER REQUEST message, DSC REGISTER ACCEPT message, DSC REGISTER REJECT message, DSC DE-REGISTER message, DSC RESOURCE REGISTER REQUEST message, DSC RESOURCE REGISTER ACCEPT message, DSC RESOURCE REGISTER REJECT message, AVAILABLE BIDS REQUEST message, AVAILABLE BIDS RESPONSE message, AVAILABLE BIDS REJECT message, DSC BID REQUEST message, DSC BID ACCEPT message, DSC BID REJECT message, DSC BID OUTBID message, DSC BID WON message, DSC BID LOST message, DSC BID CANCELLED message, DSC BUY REQUEST message, DSC BUY ACCEPT message, DSC BUY REJECT message, DSC RESOURCES ALLOCATED message, DSC RESOURCES WITHDRAWN message, and/or DSC BACKOFF COMMAND message. Each of these messages may include, or may be associated with, criticality information, presence information, range information, and assigned criticality information. These messages and their contents are discussed in detail further below.

In various embodiments, the DSAAP methods may be performed in a DSA system that includes a first DSC server in a first telecommunication network (e.g., a lessee network), a second DSC server in second telecommunication network (e.g., a lessor network), and a DPC server that is outside of the first and second telecommunication networks. The first DSC may include first DSC processor coupled to the DPC via a first communication link, and the second DSC may include a second DSC processor coupled to the DPC via a second communication link. The second DSC may be coupled to an eNodeB in the second telecommunication network via third communication link. The first and second communication links may be defined over the Xd interface, and the third communication link is defined over the Xe interface.

Figure 8A:
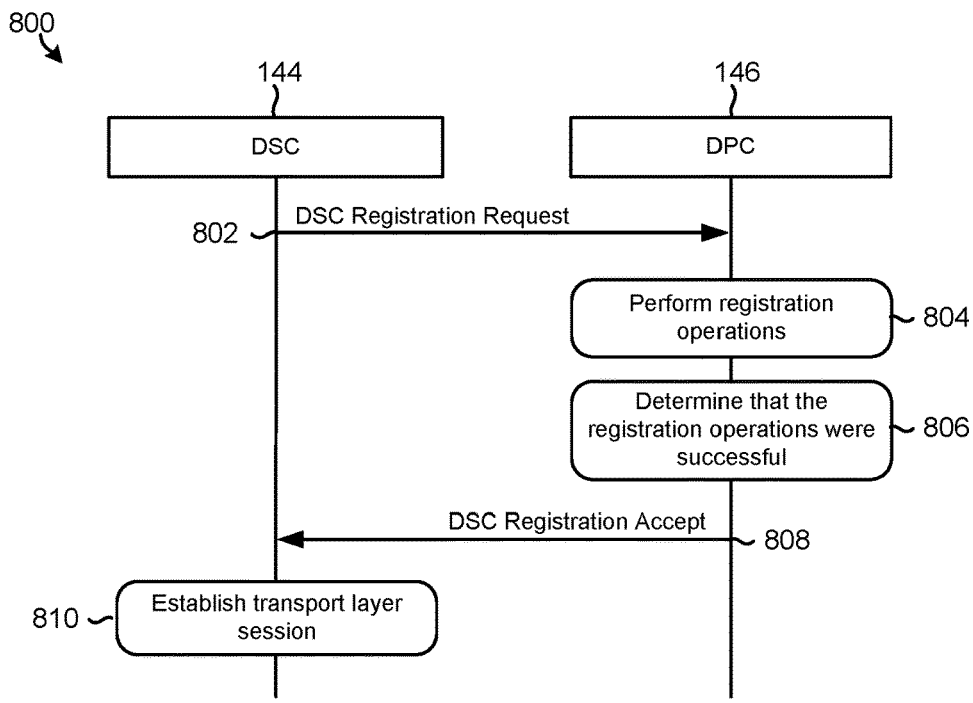
FIGS. 8A through 8C are message flow diagrams illustrating an embodiment dynamic spectrum arbitrage application part (DSAAP) registration method.
Figure 8B:
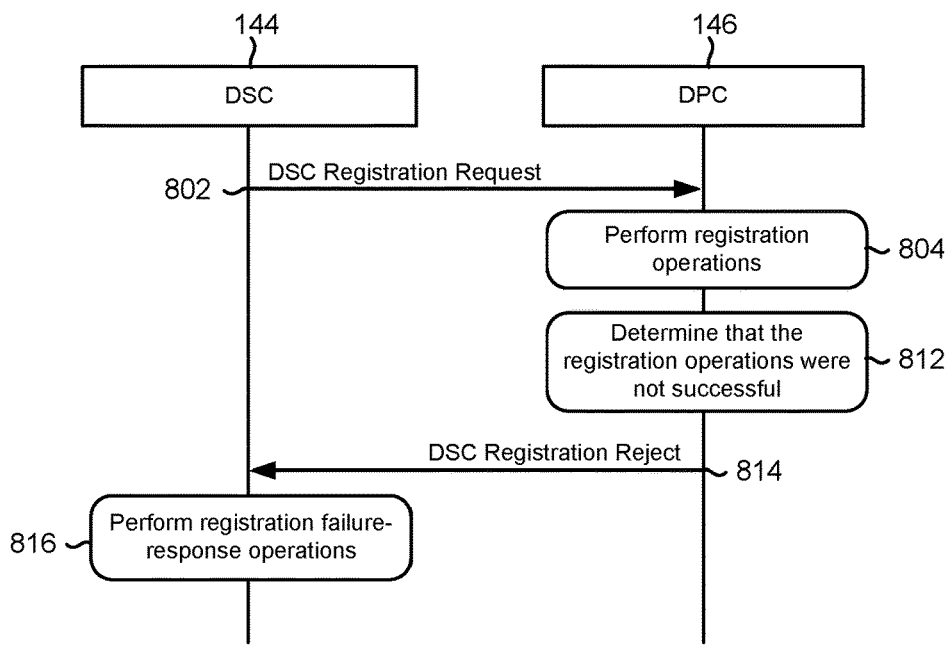
Figure 8C:
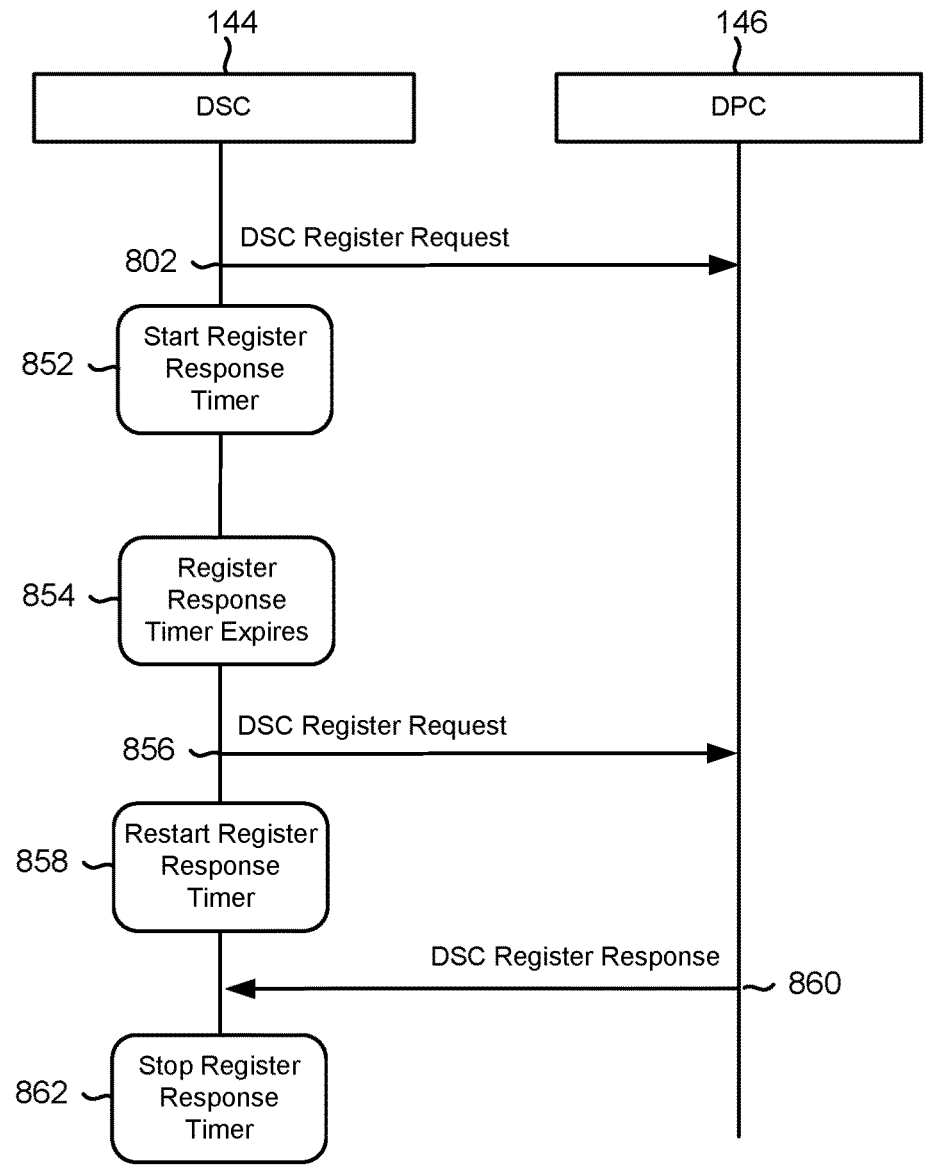

FIGS. 8A through 8C illustrate an embodiment DSAAP registration method 800 for registering a DSC 144 component with a DPC 146 so as to allow the DPC 146 to provide various services to the DSC 144 (e.g., advertizing a lessor DSC's 144 resources for bidding, allowing a lessee DSC 144 to bid for resources provided by other networks, etc.). In the examples illustrated in FIGS. 8A through 8C, the DSAAP registration method 800 is performed by processing cores in a DPC 146 component and a DSC 144 component, each of which may include all or portions of a DSAAP module/component. The operations DSAAP registration method 800 may be performed after, or in response to the DSC 144 or DPC 146 detecting that, an XE signaling transport or communication link has been established.

In operation 802 illustrated in FIGS. 8A through 8C, the DSC 144 may initiate DSAAP registration method 800 by generating and sending a DSC REGISTER REQUEST message to the DPC 146. In an embodiment, the DSC 144 may be configured to generate and/or send the DSC REGISTER REQUEST message in response to determining that it requires services from the DPC 146. For example, the DSC 144 may be configured to generate the DSC REGISTER REQUEST message in response to determining that its corresponding network (i.e., the network represented by the DSC) includes excess resources that may be allocated to other networks. As another example, the DSC 144 may be configured to generate the DSC REGISTER REQUEST message in response to determining that its network requires additional resources to provide adequate service to its existing wireless devices 102 in view of the current or expected future user traffic, network congestion, etc.

In various embodiments, the DSC 144 may be configured to generate the DSC REGISTER REQUEST message to include any or all of a message type information element (IE), a message ID IE, a DSC identity IE, a DSC Internet protocol (IP) address IE, a DSC type IE, a DSC PLMN-ID IE, PLMN type IE, and DSC resource update timer IE. The DSC PLMN-ID IE may include a PLMN ID that is suitable for use in identifying the network (e.g., E-UTRAN) that is associated with, or represented by, the DSC 144. The PLMN type IE may include information that is suitable for use in determining the type of network (e.g., public safety, commercial, etc.) that is represented by the DSC 144. The DSC IP address IE may include the IP address of a DSC 144 that is responsible for managing, maintaining, or providing the XE interface of the DSAAP.

In operation block 804 illustrated in FIGS. 8A and 8B, the DPC 146 may perform various registration operations (i.e., authenticating the DSC, storing DSC identifier information in memory, etc.) to register the DSC 144 with the DPC 146. In an embodiment, as part of these registration operations, the DPC 146 may overwrite/override an existing registration with a new registration, such as in response to receiving a duplicate DSC REGISTER REQUEST message (i.e. for an already registered DSC identified by the same unique DSC identity).

In operation block 806 illustrated in FIG. 8A, the DPC 146 may determine that the registration operations were successful. In operation 808, the DPC 146 may generate and send a DSC REGISTER ACCEPT message to the DSC 144 to indicate the acceptance and registration of the DSC 144. In various embodiments, the DPC 146 may generate the DSC REGISTER ACCEPT message to include any or all of a message type information element (IE), a message ID IE, a DPC ID IE, a XEh signaling transport network layer (TNL) address IE, and a tunneling information IE. The XEh signaling TNL address IE may include an address value that is suitable for use in establishing to transport layer session. The tunneling information IE may include information that may used to encapsulate a different payload protocol, establish a secured communication through an untrusted or unverified network, carry a payload over an incompatible delivery-network, and/or to perform other similar tunneling operations.

To support XEh connectivity via/to the DPC 146, in operation block 810, the DSC 144 may use the address value included in the XEh signaling TNL address IE of the DSC REGISTER ACCEPT message establish a transport layer session. In an embodiment, the DSC 144 may be configured to establish the transport layer session in response to determining that the DSC REGISTER ACCEPT message includes an address value in the XEh signaling TNL address information element. In an embodiment, the DSC 144 may be configured to determine that the XEh connectivity via/to the DPC 146 is not supported or not required in response to determining that the XEh signaling TNL address information element is not present, null, empty, or not valid.

With reference to FIG. 8B, in operation block 812, the DPC 146 may determine that the registration operations performed as part of operation 804 failed. The DPC 146 may determine that registration failed in response to detecting any of a variety of conditions/events, including the failure to authenticate or authorize the DSC, network or component overload, DSC parameter mismatch, etc. In operation 814, the DPC 146 may generate and send a DSC REGISTER REJECT message to the DSC 144 to inform the DSC 144 that the registration failed and/or that the DPC 146 cannot register the DSC 144. In various embodiments, the DPC 146 may generate the DSC REGISTER REJECT message to include any or all of a message type information element (IE), a message ID IE, a cause IE, a criticality diagnostics IE, and a backoff timer IE. The cause IE may include information suitable for identifying a specific reason for the failure (e.g., overloaded, etc.) or for indicating that the reason for the failure is not known or is unspecified.

In operation block 816, the DSC 144 may perform various registration failure-response operations based on the information included in the received REGISTER REJECT message. For example, the DSC 144 may wait for a duration indicated in the backoff timer IE of the received REGISTER REJECT message before reattempting registration with that same DPC 146 in response to determining that the value of the cause IE in the received REGISTER REJECT message is set to "overload."

With reference to FIG. 8C, in operation block 852, the DSC 144 may start a register response timer in response to sending a DSC REGISTER REQUEST message to the DPC 146 (e.g., as part of operation 802). In operation block 854, the DSC 144 may determine that the register response timer expired before the DSC 144 received a DSC REGISTER RESPONSE message. In operation 856, the DSC 144 may resend the DSC REGISTER REQUEST message to the DPC 146 in response to determining that the timer expired before it received a corresponding DSC REGISTER RESPONSE message. In operation block 858, the DSC 144 may restart or reset the register response timer. In operation 860, the DPC may send a DSC REGISTER RESPONSE message to the DSC 144. In operation block 862, the DSC 144 may stop the register response timer in response to receiving the DSC REGISTER RESPONSE message.

Figure 9A:
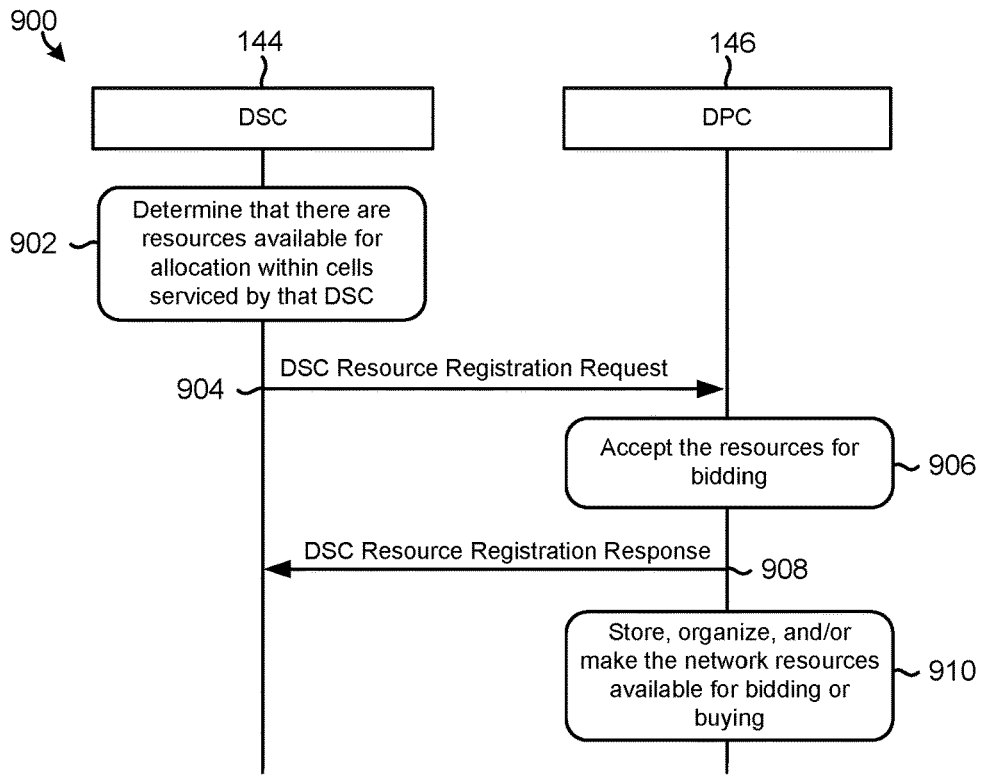
FIGS. 9A and 9B are message flow diagrams illustrating an embodiment advertizing method.
Figure 9B:
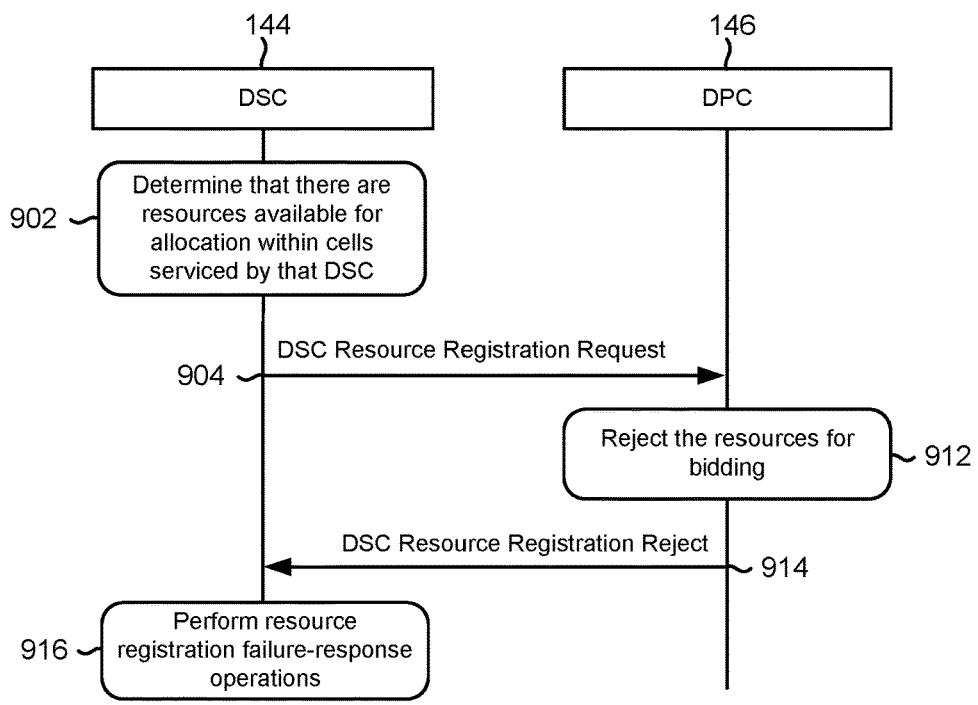

FIGS. 9A and 9B illustrate a DSAAP advertizing method 900 for advertising resources that are available for bidding/buying so as to allow the DPC 146 to store, organize, and/or make those resources available for bidding/allocation via a financial brokerage platform. In the examples illustrated in FIGS. 9A and 9B, the DSAAP advertizing method 900 is performed by processing cores in a DPC 146 component and a DSC 144 component, each of which may include all or portions of a DSAAP module/component.

In operation block 902 illustrated in FIGS. 9A and 9B, the DSC 144 may determine that there are resources available for allocation within cells serviced by that DSC 144. In operation block 904, the DSC 144 may generate and send a DSC RESOURCE REGISTER REQUEST message to the DPC 146. In various embodiments, the DSC 144 may generate the DSC RESOURCE REGISTER REQUEST message to include any or all of a message type information element (IE), a message ID IE, a DSC identity IE, a DSC type IE, a PLMN-ID list IE, resource availability IE, resource availability start time IE, a data bandwidth IE, a list of grids IE, a bid or buy IE, a minimum bid amount IE, resource availability end time IE, a time of the day IE, a time duration IE, megabits per second (MBPS) IE, and a cell identity IE.

The DSC identity IE may include information that may be used by the DPC 146 to determine the identity of DSC 144. For example, the DSC identity IE may include a DSC pool ID, DSC instance information, and a PLMN ID of the network that the DSC is managing or representing. The DSC pool ID may be a unique identifier of a pool of available resources and/or may be the same as or similar to MME pool IDs and MME IDs in 3GPP EPC architecture.

The message ID IE may include a message identifier for the specific DSC RESOURCE REGISTER REQUEST message sent from the DSC 144. The DSC 144 and DPC 146 may be configured to use the message ID IE as a sequence number to identify and correlate DSC RESOURCE REGISTER REQUEST, DSC RESOURCE REGISTER ACCEPT and/or DSC RESOURCE REGISTER REJECT messages.

The resource availability IE may include information suitable for use by the DPC 146 in determining the PLMN ID of the network that is advertising resources for allocation and use by other networks. The DPC 146 may be configured to receive, store, and/or maintain resource availability IEs for multiple DSCs and/or for multiple different networks (i.e. different PLMN IDs). As such, each resource availability IE may include information suitable for identifying one or more of the networks that are advertising resources.

The time of the day IE may include information suitable for use by the DPC 146 in determining the time of the day that the DSC 144 transmitted the DSC RESOURCE REGISTER REQUEST message. The time duration IE may include information that is suitable for use in determining a time period during which the resources are to be made available for bidding or buying.

The data bandwidth IE may include information suitable for use in determining the available bandwidth (e.g., in MBPS) for the time duration specified in the optional time duration IE. The DPC 146 may determine that the bandwidth specified in the MBPS IE is to be made available until that bandwidth is consumed by the winning bidder or buyer in response to determining that the time duration IE is not included in the received DSC RESOURCE REGISTER REQUEST message (or in response to determining that the time duration IE does not include a valid value).

The list of grids IE may include information suitable for use in determining grid identifiers for the locations of the network bandwidth that is to be made available for bidding or buying. The cell identity IE may include information suitable for use in determining the individual cells within each grid (identified by grid ID and cell ID) that have available resources offered for bidding or buying as part of the offer in the DSC RESOURCE REGISTER REQUEST message. The minimum bid amount IE may include a monetary amount in a denomination or currency, such as in United States Dollars (USD).

In operation block 906 illustrated in FIG. 9A, the DPC 146 may accept the DSC's 144 resources for bidding. In operation 908, the DPC 146 may generate and send a DSC RESOURCE REGISTER RESPONSE or DSC RESOURCE REGISTER ACCEPT message to the DSC 144 to acknowledge that the resources were accepted. In various embodiments, the DPC 146 may generate the DSC RESOURCE REGISTER message to include any or all of a message type information element (IE), a bid ID IE, and a message ID IE. The message ID IE may include the same message identifier value that is included in the received DSC RESOURCE REGISTER REQUEST message. The DPC 146 and/or DSC may be configured to use the value of the message ID IE to identify and correlate the DSC RESOURCE REGISTER REQUEST and DSC RESOURCE REGISTER ACCEPT messages. In operation block 910, the DPC 146 may store, organize, and/or make the network resources available for bidding or buying via the financial brokerage platform.

In operation 912 illustrated in FIG. 9B, the DPC 146 may reject the DSC RESOURCE REGISTER REQUEST message and/or reject for bidding the resources identified in the received DSC RESOURCE REGISTER REQUEST message. The DPC 146 may reject the message/resources for a variety of reasons and/or in response to detecting any of a variety of events or conditions. For example, the DPC 146 may reject the resources in response to determining that the DPC 146 is not accepting resources from any operator, is not accepting resources for the specific operator identified in the received message, is not accepting the resources identified in the message, that the DPC is overloaded, that there is insufficient memory to store and service the resources available for bidding, etc. The DPC 146 may also reject the resource available message in response to determining that an administrator of the DPC 146 has disabled further bidding from the specific PLMN ID included in the DSC RESOURCE REGISTER REQUEST message, from all the networks (e.g., all the PLMN IDs), etc.

In operation 914 illustrated in FIG. 9B, the DPC 146 may generate and send a DSC RESOURCE REGISTER REJECT message to the DSC 144. In various embodiments, the DPC 146 may generate the DSC RESOURCE REGISTER REJECT message to include any or all of a message type information element (IE), a message ID IE, a cause IE, and a criticality diagnostics IE. The DPC 146 may also generate the DSC RESOURCE REGISTER REJECT message to include a message ID IE that includes a value that is the same as the message identifier included in the DSC RESOURCE REGISTER REQUEST message received from DSC 144. The DPC 146 and/or DSC 144 may be configured to use the value of the message ID IE to identify and correlate the DSC RESOURCE REGISTER REQUEST and DSC RESOURCE REGISTER REJECT messages.

In operation block 916, the DSC 144 may perform various resource registration failure response operations based on information included in the received DSC RESOURCE REGISTER REJECT message. For example, the DSC 144 may use the information included in the DSC RESOURCE REGISTER REJECT message to determine whether to reattempt resource registration with the DPC 146, attempt to register the resources with another DPC, reattempt the registration with different resources, or perform any of the other DSC operations discussed in this application.

Figure 10A:
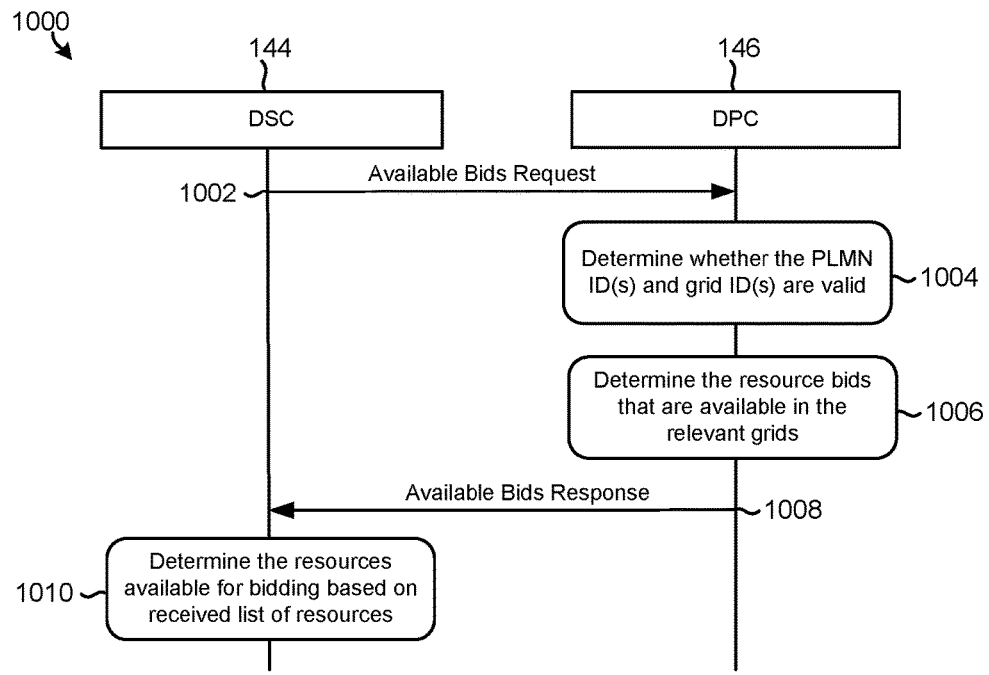
FIGS. 10A and 10B are message flow diagrams illustrating an embodiment method for communicating a list of available resources.
Figure 10B:
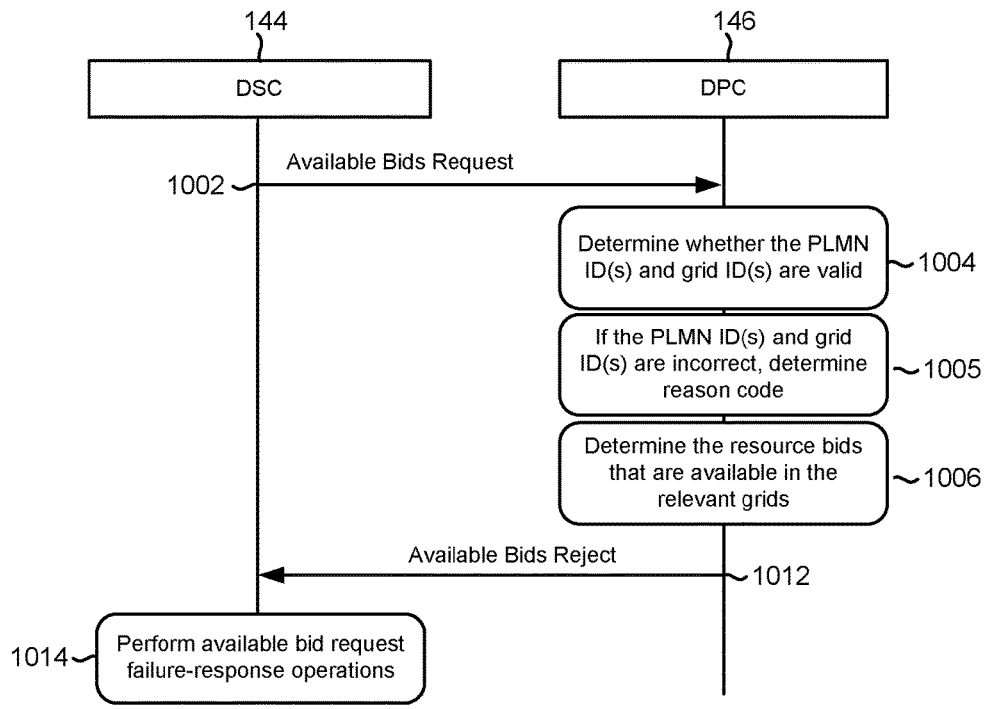

FIGS. 10A and 10B illustrate a DSAAP method 1000 for communicating a list of available resources in accordance with an embodiment. DSAAP method 1000 may be performed to inform lessee networks of the resource bids or resources that are available for bidding/buying. In the examples illustrated in FIGS. 10A and 10B, the DSAAP method 1000 is performed by processing cores in a DPC 146 component and a DSC 144 component, each of which may include all or portions of a DSAAP module/component. In an embodiment, a lessee DSC 144 may be configured to perform DSAAP method 1000 to retrieve/receive a list of available resources prior to that DSC 144 bidding on, or requesting to lease or purchase, resources from the DPC 146.

In operation 1002 illustrated in FIGS. 10A and 10B, a lessee DSC 144 may generate and send an AVAILABLE BIDS REQUEST message to the DPC 146 to request information on the resource bids that are available for allocation from lessor network(s) for bidding or buying. In various embodiments, the lessee DSC 144 may generate the AVAILABLE BIDS REQUEST message to include any or all of a sequence number information element (IE), a message type IE, a PLMN list IE that includes one or more PLMN ID IEs, a grid ID list IE that includes one or more Grid ID IEs.

In an embodiment, the lessee DSC 144 may be configured to request specific resources from a specific network by generating the AVAILABLE BIDS REQUEST message to include the PLMN ID of the desired network, which may be included in the PLMN ID IE of the PLMN list IE in the AVAILABLE BIDS REQUEST message.

In an embodiment, the lessee DSC 144 may be configured to request resources from any available network by not populating the PLMN list IE in the generated AVAILABLE BIDS REQUEST message and/or by generating the AVAILABLE BIDS REQUEST message to not include a PLMN list IE and/or PLMN ID value.

In an embodiment, the lessee DSC 144 may be configured to request resources from a specific grid within a lessor network by generating the AVAILABLE BIDS REQUEST message to include the grid IDs of the desired grids, which may be included in the grid ID IE of the grid ID list IE in the AVAILABLE BIDS REQUEST message.

In an embodiment, the lessee DSC 144 may be configured to request resources from any or all grids within a specified PLMN ID in PLMN ID IE grid by not populating the grid ID list IE in the generated AVAILABLE BIDS REQUEST message and/or by generating the AVAILABLE BIDS REQUEST message to not include a grid ID.

In operation block 1004 illustrated in FIGS. 10A and 10B, the DPC 146 may determine whether the PLMN ID(s) and grid ID(s) included in the received AVAILABLE BIDS REQUEST message are valid. If the PLMN ID(s) and grid ID(s) are incorrect, in operation block 1005, the DPC 146 may determine a reason code for the error/incorrect values. In operation block 1006, the DPC 146 may determine whether there are resources/bids available for each grid identified in the received AVAILABLE BIDS REQUEST message or for all the available grids (e.g., when the grid ID list IE in the received AVAILABLE BIDS REQUEST message not include valid values).

In operation 1008 illustrated in FIG. 10A, the DPC 146 may generate and send an AVAILABLE BIDS RESPONSE message to the DSC 144. The DPC 146 may be configured to generate the AVAILABLE BIDS RESPONSE message to include any or all of a message type information element (IE), a message ID IE, a DSC identity IE, a PLMN-ID grid cell bid info list IE, a sequence number IE, a PLMN list IE that includes one or more PLMN ID IEs, and a grid list IE. In an embodiment, the PLMN list IE and grid list IE may be included in the PLMN-ID grid cell bid info list IE. In an embodiment, the grid list IE may include one or more cell ID list IEs that include one or more cell ID IEs.

In various embodiments, the DPC 146 may generate the AVAILABLE BIDS RESPONSE message to also include any or all of an absolute radio-frequency channel number (ARFCN) IE, a channel bandwidth IE, a megabit or megabyte IE for identifying total available bandwidth, a MBPS IE for identifying the peak data rate for the resource, a resource available time IE, a resource expiration time IE, a bid/buy IE, a bid/buy expiry time IE, a minimum bid amount IE, and a buy price IE. The DPC 146 may generate the AVAILABLE BIDS RESPONSE message to include such information for each PMLN, each resource, each grid, and/or each cell identified in the message.

In an embodiment, the DPC 146 may be configured to generate the AVAILABLE BIDS RESPONSE message to include the list of PLMN ID, lists of grid ID(s) within each PLMN, and the available resources/bids within each grid in response to determining that there are bids for resources available for auction.

In an embodiment, the DPC 146 may be configured to generate the AVAILABLE BIDS RESPONSE message to include the message type and sequence number IEs (or valid values for these IEs) in response to determining that there no resources/bids for resources available for auction by that DPC 146 for the relevant networks/PLMN IDs. In an embodiment, the DPC 146 may be configured to generate the AVAILABLE BIDS RESPONSE message to include a sequence number IE having the same value as in the sequence number IE included in the received AVAILABLE BIDS REQUEST message. In an embodiment, the DSC 144 may be configured to use the sequence number IEs in these request and response messages to correlate the messages.

In an embodiment, the DPC 146 may be configured to generate the AVAILABLE BIDS RESPONSE message to include a PLMN list IE that includes a PLMN ID and grid ID list IE. The grid ID list IE may include a list of cells available for auction within the grid. The cell ID list IE may include a cell ID, and for each cell, the ARFCN, channel bandwidth, total available bandwidth, peak data rate allowed, the time of day (e.g., in UTC) when the resources are available and when they expire/end, whether it's a bid or buy type auction, minimum bid amount or buy price, bid expiry time (e.g., in UTC), and other similar information.

In operation block 1010, the DSC 144 may use the information included in the AVAILABLE BIDS RESPONSE message to identify the resources that are available for bidding, determine whether the DSC 144 will submit a bid for the available resources, determine the resources for which the DSC 144 will submit bids, and/or perform other similar operations.

With reference to FIG. 10B, in operation 1012, the DPC 146 may reject the AVAILABLE BIDS REQUEST message received from lessee DSC 144 by generating and sending a AVAILABLE BIDS REJECT message to the DSC 144. The DPC 146 may be configured to reject the AVAILABLE BIDS REQUEST message in response to determining (e.g., as part of operation 1004 or 1006) that one or more of the PLMN IDs supplied in the request message is not from any of the known networks, that one or more of the Grid IDs supplied in the request message is not valid with respect to the supplied PLMN ID, and/or that there are no resources/bids available in the relevant grids.

In an embodiment, the DPC 146 may be configured to generate the AVAILABLE BIDS REJECT message to include a message type information element (IE), a message ID IE, a cause IE, a criticality diagnostics IE, and a sequence number IE. The cause IE may include a reason code (e.g., Invalid PLMN ID, Invalid Grid ID, etc.) for the rejection of the available bids request, which may be determined in operation block 1005. The sequence number IE may include the same sequence number value that was included in the AVAILABLE BIDS REQUEST message received from lessee DSC 144. As such, the DPC 146 and/or DSC 144 may be configured to use sequence number IEs in the request and response messages to correlate those messages.

In operation block 1014, the DSC 144 may use the information included in the received AVAILABLE BIDS REJECT message to perform various failure-response operations. For example, the DSC 144 may determine whether to send another AVAILABLE BIDS REQUEST message to the DPC 146, determine whether to send another AVAILABLE BIDS REQUEST message to a different DPC, etc.

Figure 11A:
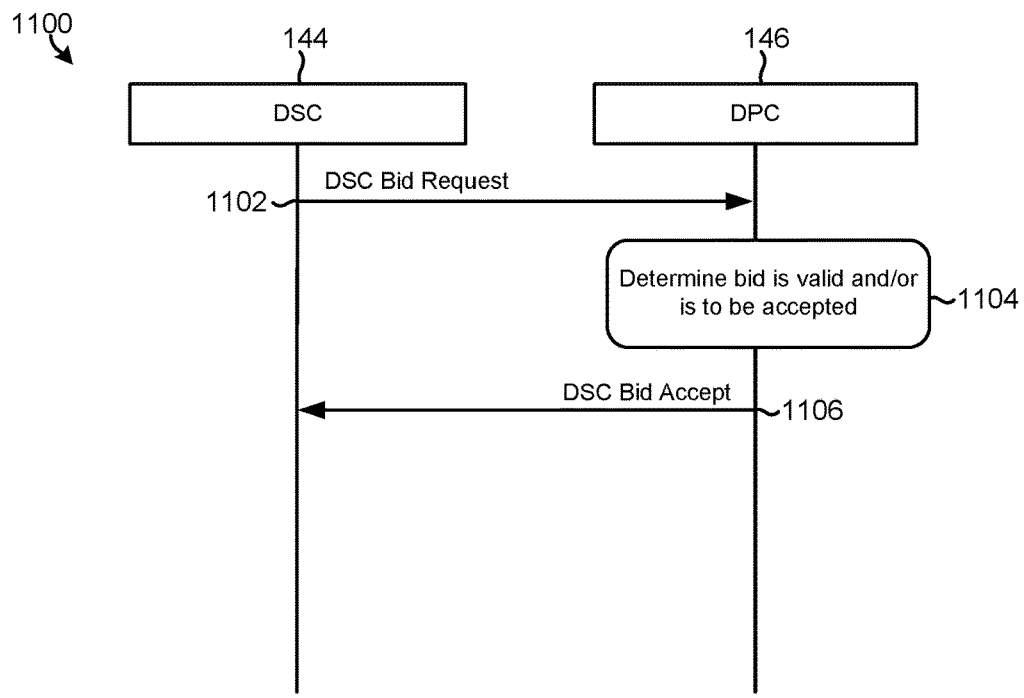
FIGS. 11A and 11B are message flow diagrams illustrating an embodiment bidding method.
Figure 11B:
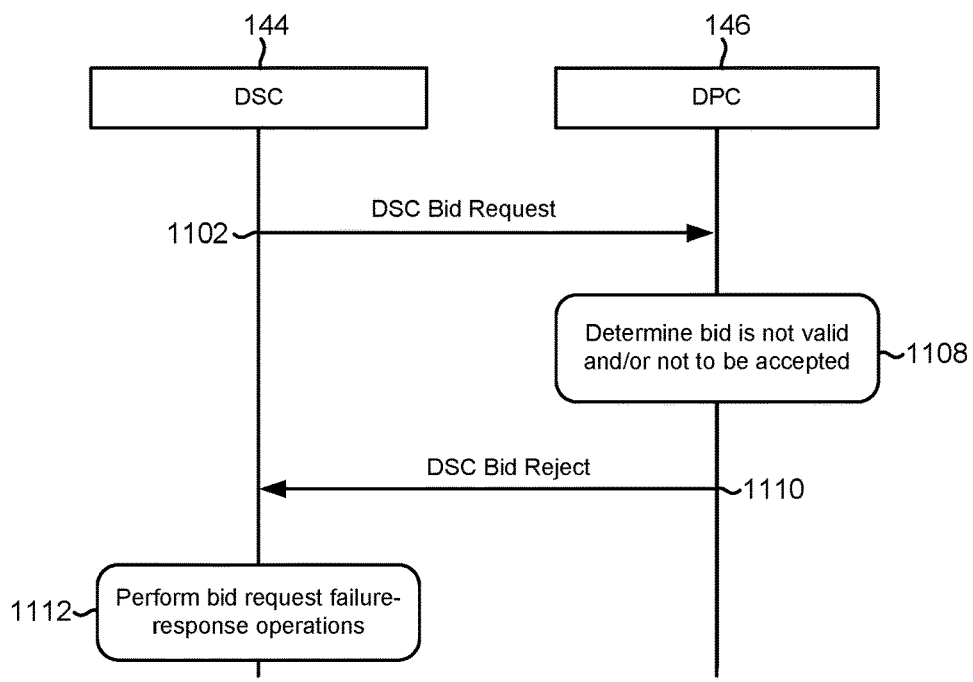

FIGS. 11A and 11B illustrate a DSAAP bidding method 1100 of bidding for DSC resources, which allows different lessee networks to bid for resources that are available from lessor networks. In the examples illustrated in FIGS. 11A and 11B, the DSAAP method 1100 is performed by processing cores in a DPC 146 component and a DSC 144 component, each of which may include all or portions of a DSAAP module/component.

In an embodiment, the DSC 144 and/or DPC 146 may be configured to perform DSAAP method 1100 after the DSC 144 retrieves the list of resources that are available for bidding (e.g., after performing DSAAP method 1000). In various embodiments, the DSC 144 and/or DPC 146 may be configured to perform DSAAP method 1100 continuously or repeatedly until the expiration of a bidding time. In an embodiment, the DPC 146 may be configured to select a winning bid (i.e., bid highest bid value) at the expiry of a bidding time.

In operation 1102 of method 1100 illustrated in FIGS. 11A and 11B, the lessee DSC 144 may generate and send a DSC BID REQUEST message to the DPC 146 to bid for one or more of the resource that are determined to be available from a lessor network, (i.e., one or more of resources included the list of resources obtained via the performance of method 1000). The lessee DSC 144 may be configured to generate the DSC BID REQUEST message to include any or all of a message type information element (IE), a message ID IE, a DSC identity IE, a DSC type IE, bid ID IE, a PLMN ID IE, and a bid amount IE. The bid ID IE may include information suitable for identifying a specific resource for which the lessee DSC 144 places a bid. The PLMN ID IE may include information suitable for use in identifying the PLMN ID of the network associated with the resources identified in the bid ID IE. The bid amount IE may include a monetary amount in a currency (e.g., USD), or the bid value.

In an embodiment, the lessee DSC 144 may be configured to generate the DSC BID REQUEST message to include a bid amount IE value that is greater than a minimum bid amount specified in a bid listing for the specific resource/bid ID. In an embodiment, the lessee DSC 144 may be configured to obtain the minimum bid amount and/or bid listing from the received AVAILABLE BIDS RESPONSE message (e.g., the message sent as part of operation 1008 illustrated in FIG. 10A).

In operation block 1104 illustrated in FIG. 11A, the DPC 146 may use the information included in the received DSC BID REQUEST message to determine whether the bid (resource bid) is valid and is to be accepted, such as by determining whether the bid complies with the policies and rules of the DSA system and the requirements of the lessor network. In operation 1106, the DPC 146 may generate and send DSC BID ACCEPT message to the DSC in response to determining that the bid is valid and/or is to be accepted. The DPC 146 may be configured to generate the DSC BID ACCEPT message to include any or all of a message type information element (IE), a message ID IE, a bid ID IE, and other information suitable for informing the DSC 144 that the bid has been determined to be valid and/or has been accepted.

It should be noted that, in the example discussed above, the DSC BID ACCEPT message informs the DSC 144 that the bid is valid/accepted, not that lessee DSC 144 has won the bid. The winning lessee DSC may be informed via DSC BID WON message when the DPC 146 determines that the bid time has expired and that lessee DSC is the highest bidder at the time of bid expiry. Similarly, the DPC 146 may inform lessee DSC(s) who participated in the bidding process but submitted losing bids that they did not submit a winning bid via a DSC BID LOST message. The DSC BID WON message and DSC BID LOST message are discussed in more detail further below.

With reference to FIG. 11B, in operation block 1108, the DPC 146 may use the information included in the received DSC BID REQUEST message to determine that the bid is not valid and is not to be accepted. For example, the DPC 146 may use the received information to determine that the bid does not comply with the policies/rules of the DSA system and/or does not comply with the requirements of the lessor network (e.g., does not meet the minimum asking price, etc.). As further examples, the DPC 146 may be configured to determine that the bid is not valid or is not to be accepted in response to determining that the bid amount specific in bid amount IE in the BID REQUEST message is not higher than the minimum bid, that the bid amount is not the highest among currently offered bids, that the bid id included in the bid ID IE is invalid, or that the bid/resource is no longer available for bidding (e.g., due to expiry, end of auction, bid withdrawn or invalid bid id).

In operation 1110, the DPC 146 may generate and send a DSC BID REJECT message to the DSC 144. The DPC 146 may be configured to generate the DSC BID REJECT message to include any or all of a message type information element (IE), a message ID IE, a bid ID IE, a cause IE, and a criticality diagnostics IE. The bid ID IE in the DSC BID REJECT message may include the same value as the bid identifier included in the received DSC BID REQUEST message. The cause IE may include a reason code identifying a reason for the rejection of the bid (e.g., minimum bid not met, outbid, bid not found, etc.). In operation block 1112, the DSC 144 may use information included in the received DSC BID REJECT message to perform various bid request failure-response operations, such as operations to determine whether to rebid for the resources, to generate a new DSC BID REQUEST message that includes a valid bid ID, etc.

FIGS. 12A through 12D illustrate a DSAAP notification method 1200 of informing participating networks of the results of the bidding operations. That is, DSAAP notification method 1200 may be performed to inform DSCs 144 of a result of an auction (e.g., that they submitted a winning bid, that they have been outbid, that they submitted a losing bid, that the auction was cancelled, etc.). In the examples illustrated in FIGS. 12A-12D, the DSAAP notification method 1200 is performed by processing cores in a DPC 146 component and a DSC 144 component, each of which may include all or portions of a DSAAP module/component.

DSAAP notification method 1200 may be performed after the DPC 146 notifies the DSC 144 that the bid has been accepted (e.g., after operation 1106 illustrated in FIG. 11). The DSAAP notification method 1200 also may be performed after the expiry of a bidding time and/or in response to the DPC 146 detecting an event or condition (e.g., new bid received, outbid, etc.).

Figure 12A:
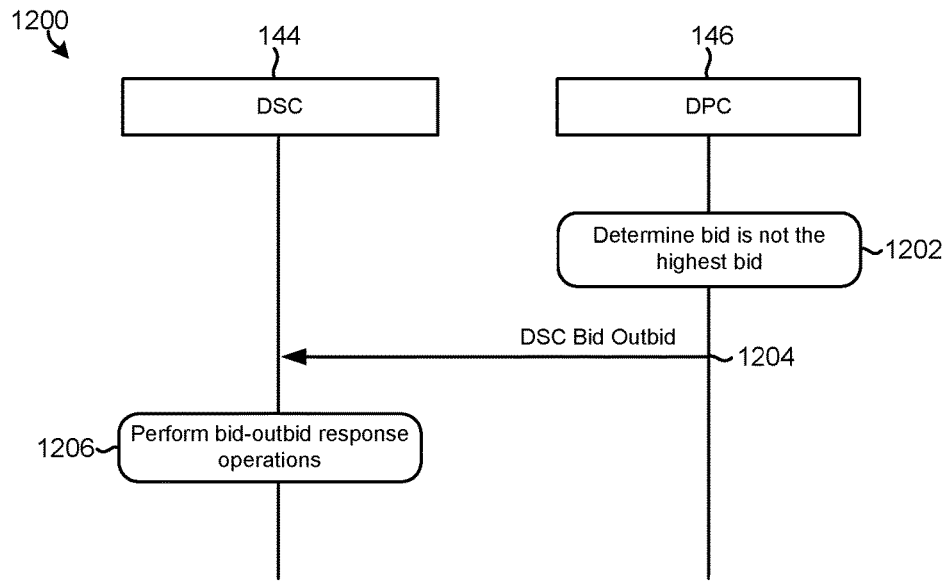
FIGS. 12A through 12D are message flow diagrams illustrating an embodiment notification method for informing participating networks of the results of the bidding operations.

In operation block 1202 illustrated in FIG. 12A, the DPC 146 may determine that the bid amount specific in bid amount IE in the last, latest, or most current BID REQUEST message accepted from the DSC 144 is not the highest among the current bids. In operation 1204, the DPC 146 may generate and send a DSC BID OUTBID message to the DSC 144 to inform the lessee DSC 144 that its earlier bid was outbid by a higher bid from another lessee DSC and/or that their earlier bid is no longer valid. In various embodiments, the DPC 146 may generate the DSC BID OUTBID message to include any or all of a message type information element (IE), a message ID IE, a cause IE, a bid info IE, a criticality diagnostics IE, a DSC ID IE and a BID ID IE.

The DSC ID IE may include information that is suitable for use in identifying the specific lessee DSC 144. The BID ID IE may include a bid ID suitable for use in identifying the submitted bid that has been outbid. In operation block 1206, the lessee DSC 144 may perform various bid-outbid failure-response operations, such as by determining whether to submit a higher bid for the resources to that DPC 146, to submit a bid to a different DPC 146, to drop existing calls to free bandwidth, etc.

Figure 12B:
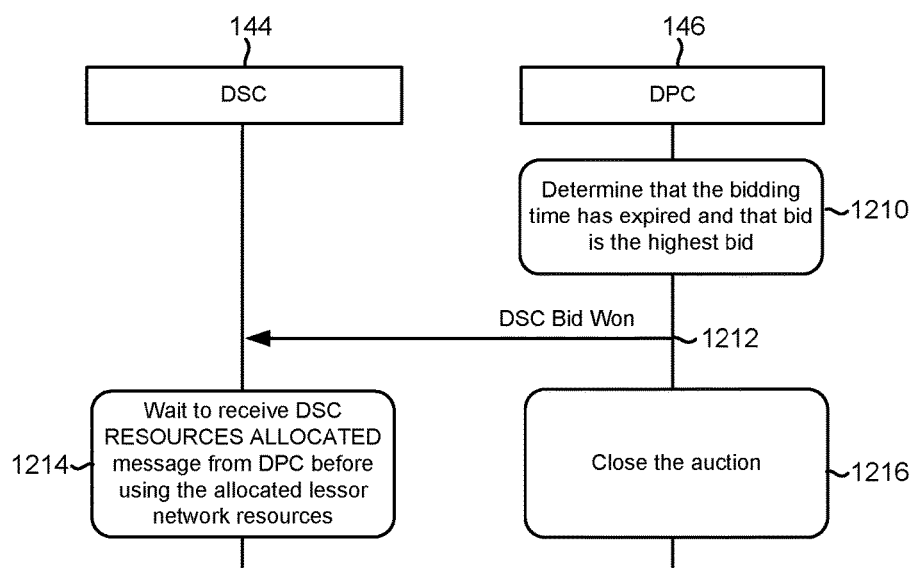

With reference to FIG. 12B, in operation block 1210, the DPC 146 may determine that the bidding time has expired and that the bid amount specific in bid amount IE in the last, latest, or most current BID REQUEST message accepted from the DSC 144 is the highest among the current bids. In operation 1212, the DPC 146 may generate and send a DSC BID WON message to the DSC 144 to inform the lessee DSC 144 that their earlier bid is the winning bid. In various embodiments, the DPC 146 may generate the DSC BID WON message to include any or all of a message type information element (IE), a message ID IE, a bid ID IE, a bid info IE, a DSC ID IE, and original bid details such as bandwidth, MBPS, duration and the winning bid amount, etc. The DSC ID IE may include information that is suitable for use in identifying the specific lessee DSC 144. The bid ID IE may include a bid identifier suitable for identifying the bid that won the resource auction/bidding operations.

In operation block 1214, the winning lessee DSC 144 may wait to receive DSC RESOURCES ALLOCATED message from the DPC 146 before scheduling its network equipment and device (e.g., wireless devices) to start using the resources and/or for the resources to be made available for use (i.e. scheduling for the time of day when the resources will be ready for use by the winning lessee network). In operation block 1216, the DPC 146 may close the auction, such as by rejecting further bids from other networks for the resources won by the bid submitted by lessee DSC 144.

Figure 12C:
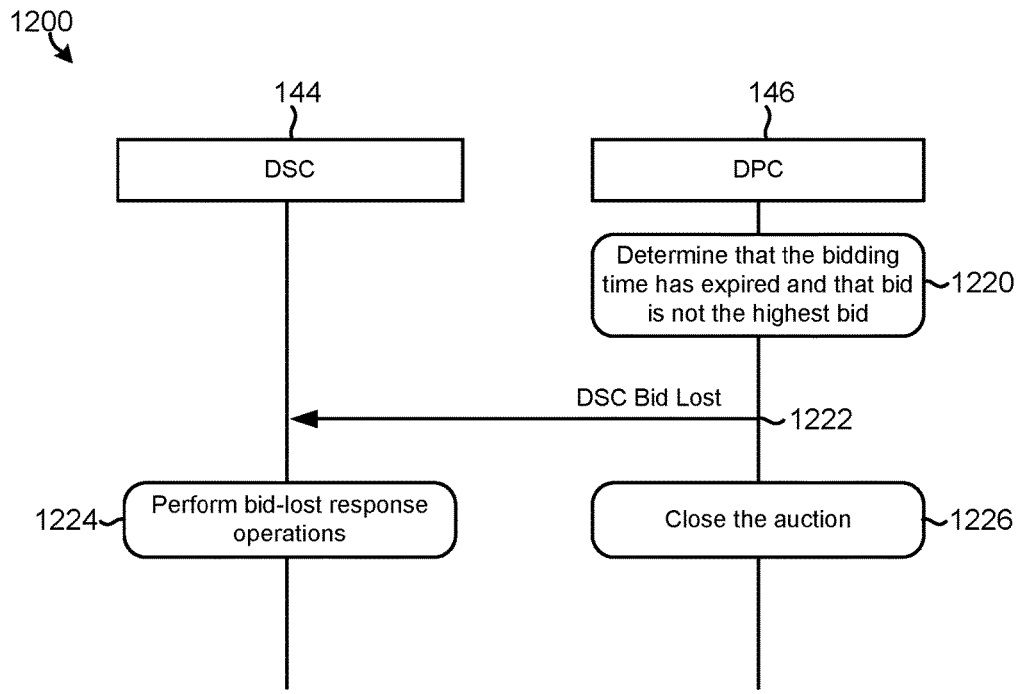

With reference to FIG. 12C, in operation block 1220, the DPC 146 may determine that the bidding time has expired and that the bid amount specific in bid amount IE in the last, latest, or most current BID REQUEST message accepted from the DSC 144 is not the highest among the current bids. In operation 1222, the DPC 146 may generate and send a DSC BID LOST message to the DSC 144 to inform the lessee DSC 144 that its earlier bid has not won the bid and the auction/bid is closed due to another lessee DSC winning the auction. In various embodiments, the DPC 146 may generate the DSC BID LOST message to include any or all of a message type information element (IE), a message ID IE, a bid ID IE, and a DSC ID IE. The DSC ID IE may include information that is suitable for use in identifying the specific lessee DSC 144 that submitted the losing bid and/or to which the DSC BID LOST message is sent. The bid ID IE may include a bid identifier suitable for use in identifying the submitted bid.

In operation block 1224, the lessee DSC 144 may perform various failure response operations, such as determining whether to submit a bid to for other available resources, whether to drop existing calls to free up resources, etc. In operation block 1226, the DPC 146 may close the auction and/or allow the losing lessee DSCs to bid for other available resources.

Figure 12D:
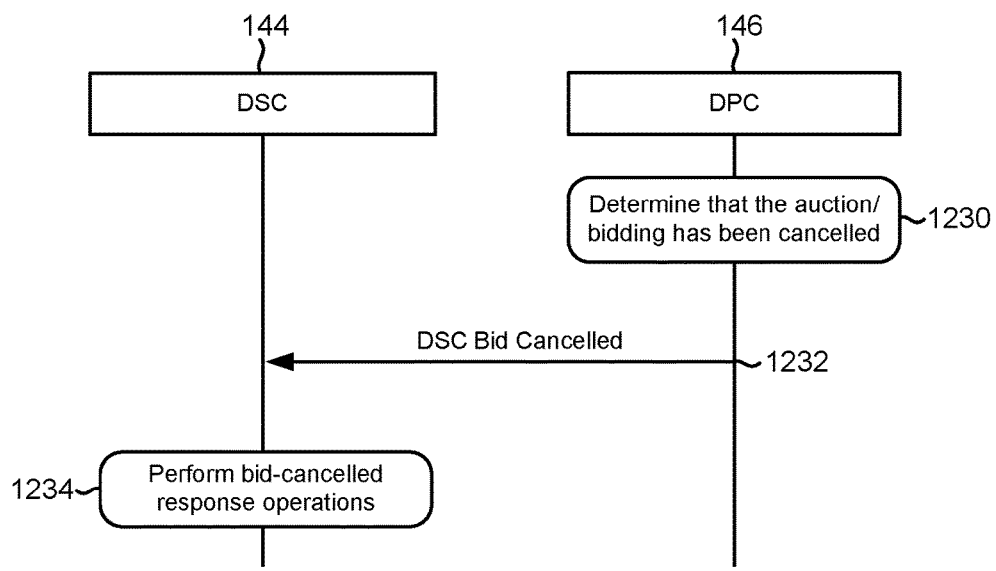

With reference to FIG. 12D, in operation block 1230, the DPC 146 may determine that the auction for a network resource that the DSC 144 previously submitted a bid has been cancelled. For example, the DPC 146 may determine that the auction has been withdrawn by lessor network operator or that the auction has been cancelled by DPC operator for administrative reasons. In operation 1232, the DPC 146 may generate and send a DSC BID CANCELLED message to the DSC 144 to inform the lessee DSC 144 that the auction has been cancelled. In various embodiments, the DPC 146 may generate the DSC BID CANCELLED message to include any or all of a message type information element (IE), a message ID IE, a bid ID IE, a DSC ID IE, and a cause IE. The DSC ID IE may include information that is suitable for use in identifying the specific lessee DSC 144. The bid ID IE may include a bid identifier suitable for use in identifying the resource/bid for which the auction has been cancelled. The cause IE may include a reason code for the bid's cancellation (e.g., auction withdrawn, auction cancelled, etc.). In operation block 1234, the lessee DSC 144 may perform various failure-response operations, such as by determining whether to submit a bid to a different DPC 146, to drop calls, etc.

Figure 13A:
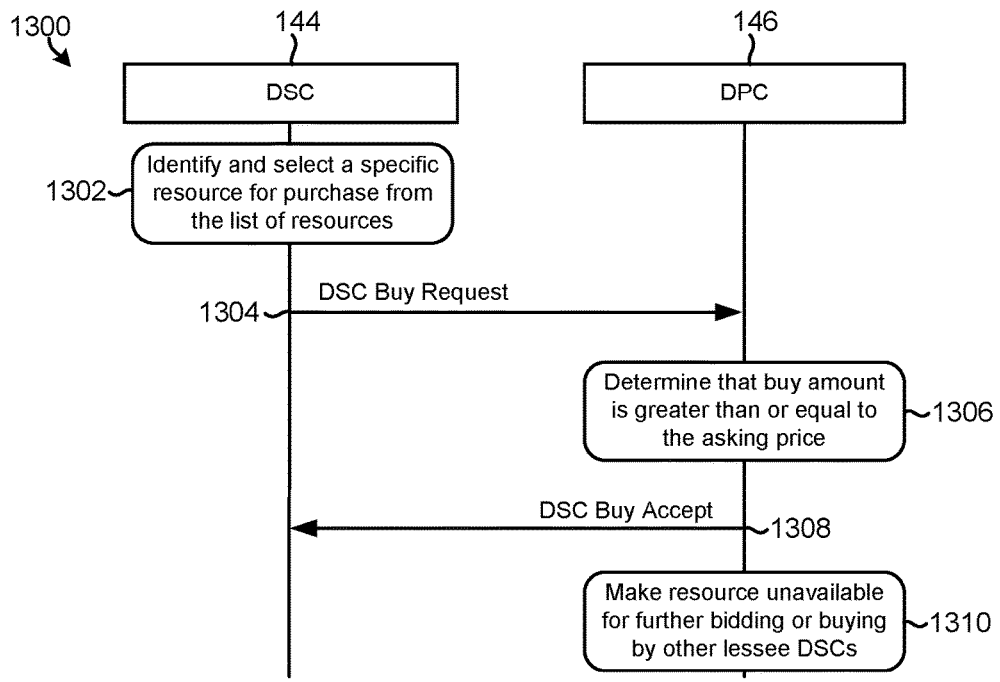
FIGS. 13A and 13B are message flow diagrams illustrating an embodiment purchase method for immediately (or near immediately) purchasing a resource.
Figure 13B:
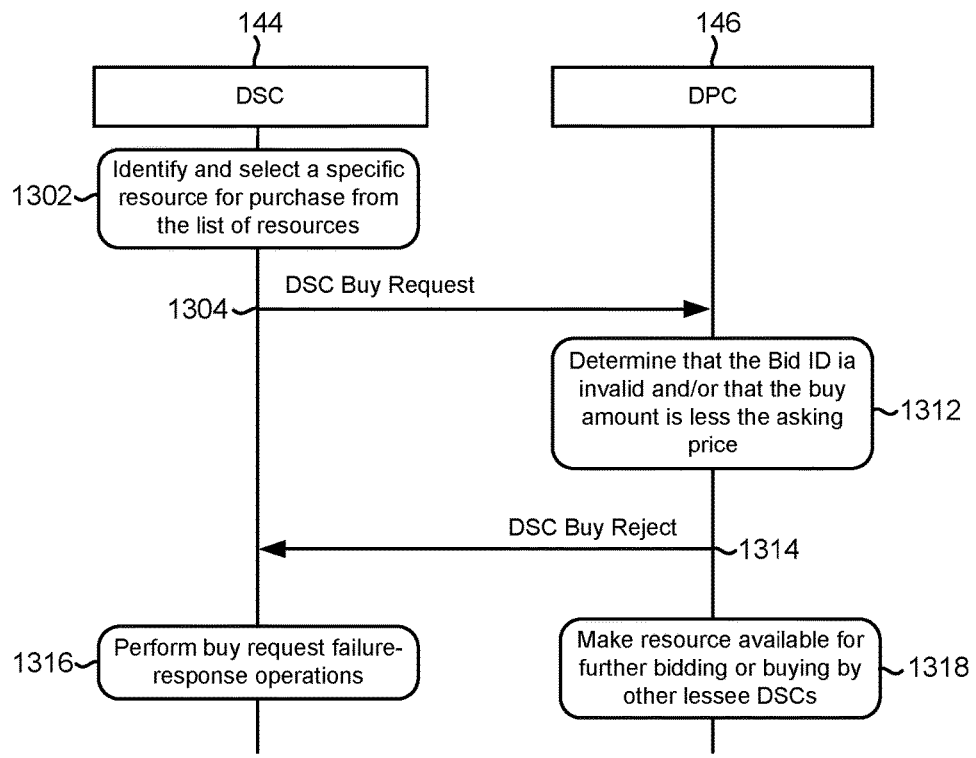

FIGS. 13A and 13B illustrate a DSAAP purchase method 1300 of allowing a lessee network to make an immediate (or near immediate) purchase and/or claim of use for a resource that is made available for allocation by a lessor network. In the examples illustrated in FIGS. 13A and 13B, the DSAAP purchasing method 1300 is performed by processing cores in a DPC 146 component and a DSC 144 component, each of which may include all or portions of a DSAAP module/component. In an embodiment, the DSC 144 and DPC 146 may be configured to perform DSAAP method 1300 after the DSC 144 retrieves/receives a list of resources that are available for purchase (e.g., after performing DSAAP method 1000 discussed above with reference to FIG. 10).

In operation block 1302 illustrated in FIGS. 13A and 13B, the lessee DSC 144 may identify and select a specific resource for immediate purchase from the list of resources (e.g., list of resources obtained from performing DSAAP method 1000 discussed above). In various the embodiments, the lessee DSC 144 may select a resource that is scheduled for bidding, that is currently being auctioned, that is only made available for immediate purchase, etc. In operation 1304, the DSC 144 may generate and send DSC BUY REQUEST message to the DPC 146 to request to buy the identified/selected resources from a lessor network.

In various embodiments, the DSC 144 may generate the DSC BUY REQUEST message to include any or all of a message type information element (IE), a message ID IE, a DSC identity IE, a DSC type IE, a bid ID IE, a buy amount IE, and a PLMN ID IE. The PLMN ID IE may include information suitable for use in identifying the PLMN ID of the network associated with the bid, which may identified via the bid ID IE. The buy amount IE may include the amount (e.g., in USD) of the bid (i.e., bid value) submitted by the lessee DSC 144.

In an embodiment, the DSC 144 may be configured to generate the DSC BUY REQUEST message to include a buy amount value that is equal to an amount identified via a buy amount IE in a listing for the bid ID included in a received AVAILABLE BIDS RESPONSE message (which is discussed above with reference to FIG. 10).

In operation block 1306 illustrated in FIG. 13A, the DPC 146 may use the information included in the received DSC BUY REQUEST message to identify the requested resource, the network associated with the request resource, whether the requested resource is currently being auctioned, whether the requested resource has been made available for immediate purchase, a minimum purchase amount requested for the immediate purchase of that resource, and/or whether the buy amount included in the received DSC BUY REQUEST message is equal to (or greater than) the requested purchase amount. In the example illustrated in FIG. 13A, as part of operation block 1306, the DPC 146 determines that the buy amount included in the received DSC BUY REQUEST message is greater than or equal to the requested purchase amount.

In operation 1308, the DPC 146 may generate and send a DSC BUY ACCEPT message to the DSC 144 to inform the lessee DSC 144 that it has successfully purchased/leased the resource for use. In various embodiments, the DPC 146 may generate the DSC BUY ACCEPT message to include any or all of a message type information element (IE), a message ID IE, and a bid ID IE. In operation block 1310, the DPC 146 may terminate, stop, or close an active auction for that resource and/or perform similar operations so that the resource is no longer available for bidding or buying by other lessee DSCs.

With reference to FIG. 13B, in operation block 1312, the DPC 146 may use the information included in the received DSC BUY REQUEST message (e.g., as part of operation 1304) to determine that the bid (buy request) is to be rejected. For example, the DPC 146 may determine that the buy amount specific in buy amount IE in the received DSC BUY REQUEST message is less than the requested purchase amount. As another example, the DPC 146 may determine that the bid ID value included in the bid ID IE is invalid, or that the resource/bid is no longer available for bidding (due to expiry, end of auction, bid withdrawn, invalid bid ID, etc.).

In operation 1314, the DPC 146 may generate and send a DSC BUY REJECT message to the DSC 144. In various embodiments, the DPC 146 may generate the DSC BUY REJECT message to include any or all of a message type information element (IE), a message ID IE, a bid ID IE and a cause IE. The value of the bid ID IE may be the same as the bid identifier included in the DSC BUY REQUEST message received as part of operation 1304. The cause IE may include a reason code for the rejection of the buy request (e.g., requested purchase price not met, bid not found, etc.). In operation block 1316, the DSC 1316 may perform various failure-response operations, such as determining whether to submit a new purchase request with a higher bid amount. In operation block 1318, the DPC 146 perform various operations so to make that resource available for bidding or buying by other lessee DSCs.

Figure 14A:
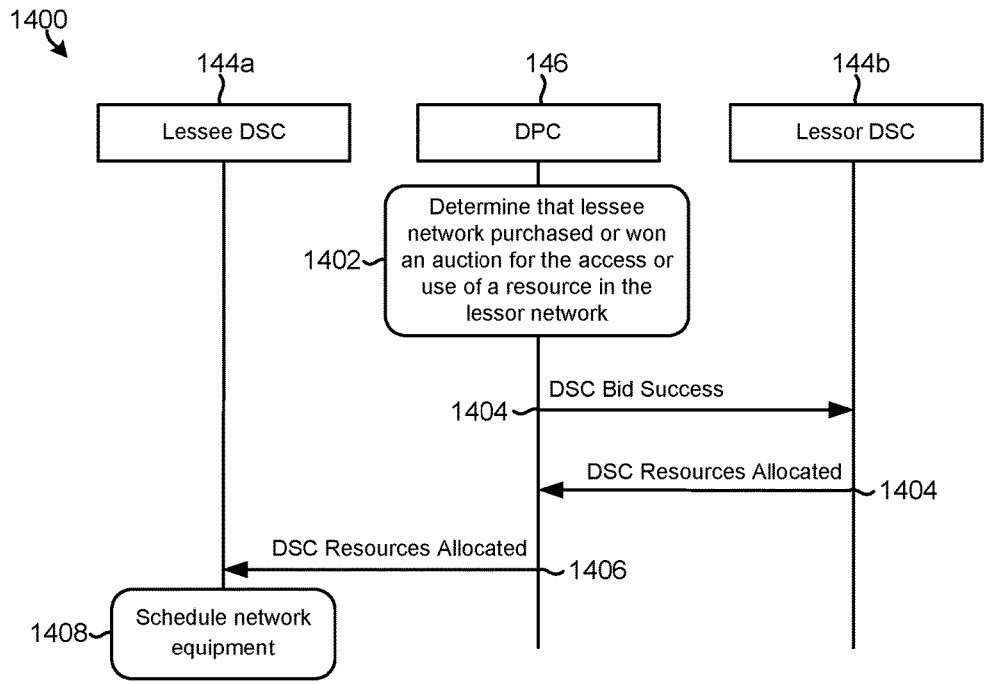
FIGS. 14A and 14B are message flow diagrams illustrating an embodiment allocation method for allocating resources in a lessor network for access and use by components in a lessee network.
Figure 14B:
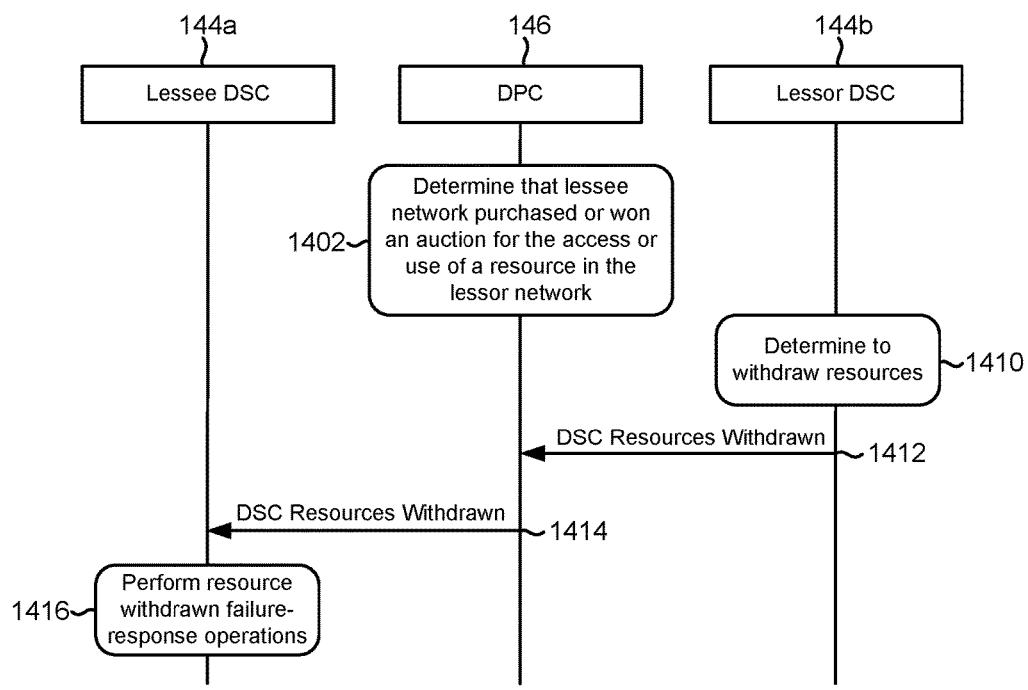

FIGS. 14A and 14B illustrate a DSAAP resource allocation method 1400 of allocating resources in a lessor network for access and use by components in a lessee network. In the examples illustrated in FIGS. 14A and 14B, the DSAAP resource allocation method 1400 is performed by processing cores in a DPC 146 component, a lessee DSC 144a component, and a lessor DSC 144b component, each of which may include all or portions of a DSAAP module/component.

In operation block 1402 illustrated in FIGS. 14A and 14B, the DPC 146 may determine that the lessee DSC 144a has successfully purchased or won an auction for a resource in a lessor network represented by the lessor DSC 144b. In operation 1404 illustrated in FIG. 14A, the DPC 146 may generate and send a DSC BID SUCCESS message to the lessor DSC 144b to inform the lessor network that one or more of its allocated resources/bids has been won by the lessee DSC 144a.

In various embodiments, the DPC 146 may generate the DSC BID SUCCESS message to include any or all of a message type information element (IE), a message ID IE, a cause IE, and a criticality diagnostics IE. In a further embodiment, the DPC 146 may be configured to generate the DSC BID SUCCESS message to also include any or all of a bid ID IE, a DSC ID IE, and a bid value IE. These additional information elements may be used to communicate information regarding the winning bid. For example, the bid ID IE may include a bid ID that corresponds to the bid that successfully participated in and won the auction for the resources. The DSC ID IE may include the DSC ID of the auction winner (i.e., the lessee DSC 144a). The bid value IE may include the winning bid amount and/or the purchase price of the resources.

In operation 1404, the lessor DSC 144b may generate and send DSC RESOURCES ALLOCATED message to the DPC 146 to allocate/commit the resources for access and use by components in the lessee network. The lessor DSC 144b may be configured to generate DSC RESOURCES ALLOCATED message to include any or all of a message type information element (IE), a message ID IE, a bid iD, a PLMN-ID Grid ID Cell ID list IE, a PLMN ID IE, a grid ID IE, list of cell IDs IE, and various auction/resource details (e.g., bandwidth, MBPS, duration, etc.). In an embodiment, the PLMN ID IE, a grid ID IE, and list of cell IDs IE may be included in the PLMN-ID Grid ID Cell ID list IE. The PLMN ID IE may include the PLMN ID of the lessor network allocating the resources, which may be the same PLMN ID/network identified in the winning bid. The grid ID IE and list of cell IDs IE may include information suitable for identifying the grid/cells associated with the resources. These values may be the same as the grid/cell values included in the winning bid.

In operation 1406, the DPC 146 may forward the received DSC RESOURCES ALLOCATED message to the winning lessee DSC 144a to enable the lessee DSC 144a to start using the allocated resources of lessor network resources. In operation block 1408, the lessee DSC 144a may schedule its network equipment to start using lessor network resources from the time of day specified as part of the bid and/or included in the received DSC RESOURCES ALLOCATED message.

With reference to FIG. 14B, in operation block 1410, the lessor DSC 144b may determine that the resources submitted for auction should be withdrawn and/or to forego allocating the submitted resources to a winner of the auction. The lessor DSC 144b may determine to withdraw the resources after the DPC 146 determines that lessee network purchased or won an auction for those resources and/or for any of a variety of reasons (e.g., unforeseen or administrative reasons, etc.).

In operation 1412, the lessor DSC 144b may generate and send a DSC RESOURCES WITHDRAWN message to the DPC 146 to withdraw the resources. The lessor DSC 144b may generate the DSC RESOURCES WITHDRAWN message to include any or all of a message type information element (IE), a message ID IE, a bid ID IE, a cause IE, and a PLMN-ID Grid ID Cell ID list IE. The bid ID IE may include information that is suitable for use in identifying the bid. The cause IE may include a reason code that describes the reason for withdrawal of resource allocations (e.g., resources not available, resources withdrawn, administrative, etc.).

In operation 1414, the DPC 146 may forward the received DSC RESOURCES WITHDRAWN message to the lessee DSC 144a, which may have submitted a winning bid for the withdrawn resources. In operation block 1416, the lessee DSC 144a may perform various failure-response operations, such as determining whether to participate in another auction, whether to bid on a different resource, determining whether to drop calls to free up resources, etc.

Figure 15A:
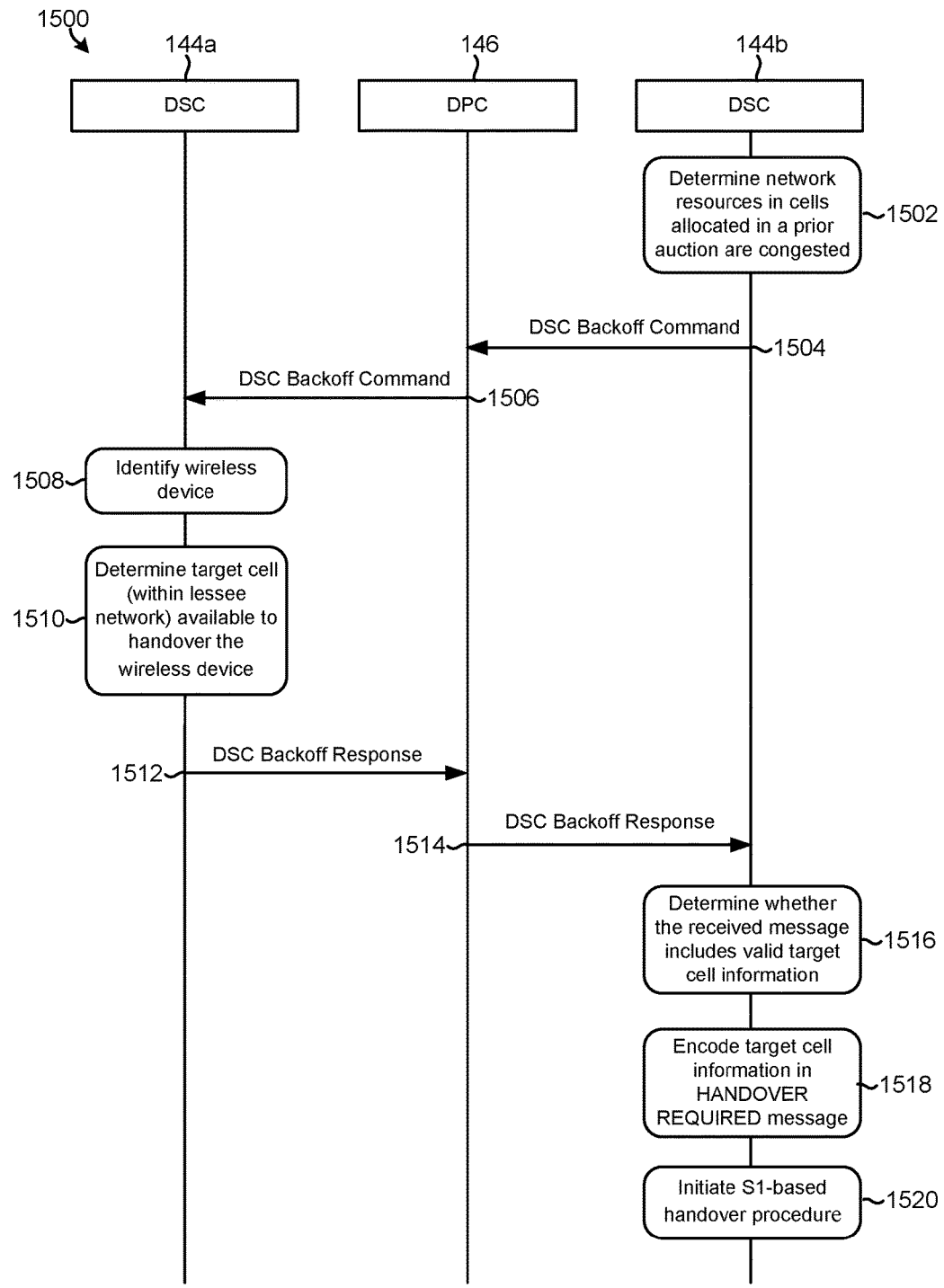
FIGS. 15A and 15B are message flow diagrams illustrating an embodiment backoff method of selectively handing over a wireless device from a lessor network back to the lessee's network (i.e. its home PLMN).
Figure 15B:
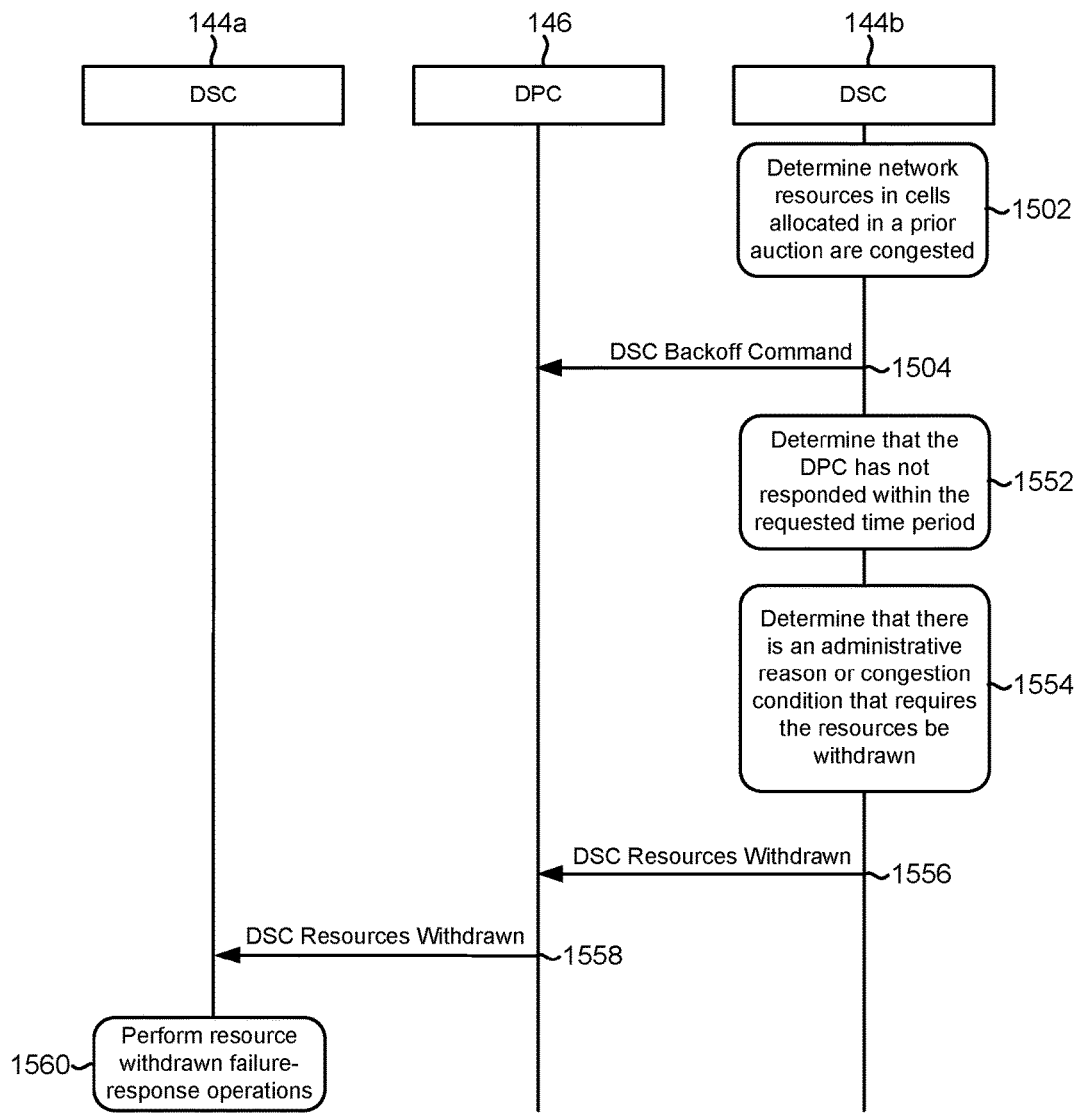

FIGS. 15A and 15B illustrate an embodiment DSAAP backoff method 1500 of selectively handing over a wireless device from a lessor network back to the lessee's network to which the wireless device subscribes (i.e. its home PLMN). In the examples illustrated in FIGS. 15A and 15B, the DSAAP backoff method 1500 is performed by processing cores in a DPC 146 component, a lessee DSC 144a component, and a lessor DSC 144b component, each of which may include all or portions of a DSAAP module/component.

In operation block 1502 illustrated in FIGS. 15A and 15B, the lessor DSC 144b may determine that its network resources from the cells that are part of a prior auction are in congestion. That is, the lessor DSC 144b may determine that it requires access or use of its allocated resources. In operation 1504, the lessor DSC 144b may generate and send a DSC BACKOFF COMMAND message to the DPC 146 to selectively handover wireless device(s) that are using the allocated resources of the lessor network back to the lessee network (i.e. its home PLMN).

The lessor DSC 144b may be configured to generate the DSC BACKOFF COMMAND message to include any or all of a message type information element (IE), a message ID IE, a bid ID IE, a UE identity IE, a measurement report IE, handoff cell information IE, a cause IE, and a DSC backoff response timer IE.

The UE identity IE may include information suitable for use in determining identity related information for the wireless device (or UE), such as the international mobile subscriber identity (IMSI) of the wireless device or its network.

The measurement report IE may include the latest, last, or most recent measurement report E-UTRAN RRC message received by the lessor network for the identified wireless device (i.e., the wireless devices that are requested to backoff to lessee network).

The bid ID IE may include a bid ID value corresponding to the bid that successfully participated in and completed/won the auction. The bid ID may be used to identify the auction/contract associated with the backoff operations (i.e., the auction/contract for which the resources were allocated).

In an embodiment, the lessor DSC 144b may be configured to determine whether there are multiple bid IDs that correspond to a congested cell. In an embodiment, the lessor DSC 144b may be configured to select the bid ID value from a plurality of bid IDs in response to determining that there are multiple bid IDs that correspond to a congested cell. In various embodiments, the lessor DSC 144b may be configured to select the bid ID value based on an operator policy provisioned at the lessor DSC 144b, based on a previous agreement, based on a policy/rule previously negotiated by lessor and lessee network operators, etc.

In operation 1506, the DPC 146 may forward the received DSC BACKOFF COMMAND message to the lessee DSC 144a. In operation block 1508, the lessee DSC 144a may use the information in the UE identity IE of the received DSC BACKOFF COMMAND message identify wireless device(s) that are to be subjected to the backoff operations (i.e., the wireless devices that are to be handed back).

In operation block 1510, the lessee DSC 144a may use the information included in the measurement report IE of the received DSC BACKOFF COMMAND message to determine, identify, and/or select a target cell (within lessee network) to which the identified wireless device(s) are to be handed over (the lessor network may have previously enabled measurement reporting from the wireless devices, such as when they attached, or were handed over, to the lessor network.)

In operation 1512, the lessee DSC 144a may generate and send a DSC BACKOFF RESPONSE message to the DPC 146. The lessee DSC 144a may be configured to generate the DSC BACKOFF RESPONSE message to include any or all of a message type information element (IE), a message ID IE, a bid ID IE, a UE identity IE, a handoff cell information IE, and a cause IE. In an embodiment, the lessee DSC 144a may be configured to generate the DSC BACKOFF RESPONSE message to include the cause IE (or a value for the cause IE) in response to determining that a suitable target cell (within lessee network) could not be identified or selected for the handed over. The value of the cause IE may identify a cause of the failure, such as network overload, no appropriate target cell found, or unknown wireless device/UE. In an embodiment, the lessee DSC 144a may be configured to generate the DSC BACKOFF RESPONSE message to include a value (e.g., target cell information) for the handoff cell information IE in response to successfully identifying a target cell (within lessee network) to which the wireless device may be handed over.

In operation 1514, the DPC 146 may identify the lessor DSC 144a based on the bid id IE included in the received DSC BACKOFF RESPONSE message, and forward the received DSC BACKOFF RESPONSE message to the lessor DSC 144b. In operation block 1516, the lessor DSC 144b may determine whether the received DSC BACKOFF RESPONSE message includes a handoff cell information IE (or a valid value for the handoff cell information IE). In response to determining that the received DSC BACKOFF RESPONSE message includes a handoff cell information IE (or a valid value for the handoff cell information IE), in operation block 1518, the lessor DSC 144b may use the target cell information included in the handoff cell information IE to encode a HANDOVER REQUIRED message. In operation block 1520, the lessor DSC 144b may and initiate S1 based handover procedure to handover the wireless device from lessor network to lessee network.

With reference to FIG. 15B, in operation block 1552, the lessor DSC 144b may determine that the DPC 146 has not responded to the DSC BACKOFF COMMAND message (sent as part of operation 1504) within a time period identified in the DSC backoff response timer IE included in the DSC BACKOFF COMMAND message. Alternatively or additionally, in operation block 1554, the lessor DSC 144b may determine that there is significant or severe network congestion or administrative reasons that require withdraw of the allocation of all remaining network resources pertaining to the resources/bid id included or identified in the DSC BACKOFF COMMAND message.

In operation 1556, the lessor DSC 144b may generate and send a DSC RESOURCES WITHDRAWN message to the DPC 146. In operation 1558, the DPC 146 may forward the received DSC RESOURCES WITHDRAWN message to the lessee DSC 144a to withdraw the allocation of the remaining network resources. In operation block 1560, the lessee DSC 144a may perform various resource withdrawn failure-response operations, such as dropping calls, determining whether to bid for new resources, etc.

Figure 16A:
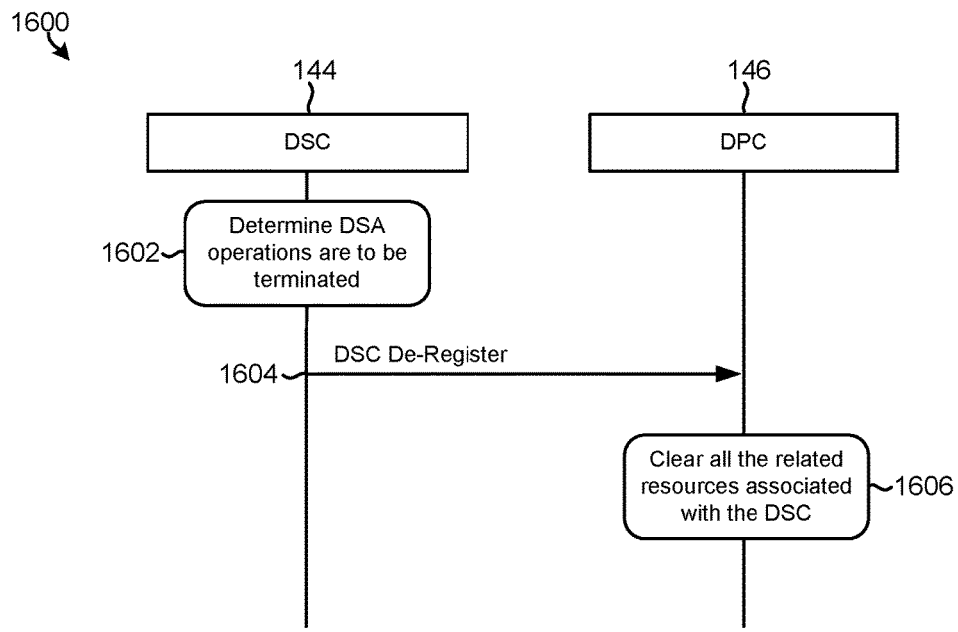
FIG. 16A is a message flow diagram illustrating an embodiment DSC initiated de-registration method for terminating DSA operations.

FIG. 16A illustrates an embodiment DSC initiated DSAAP de-registration method 1600 for terminating operations. In the example illustrated in FIG. 16A, the DSC initiated DSAAP de-registration method 1600 is performed by processing cores in a DPC 146 component and a DSC 144 component, each of which may include all or portions of a DSAAP module/component.

In operation block 1602, the DSC 144 may determine that it needs to terminate DSA operations. In operation 1604, the DSC 144 may generate and send a DSC DE-REGISTER message to the DPC 146. The DSC 144 may be configured to generate the DSC DE-REGISTER message to include any or all of a message type information element (IE), a message ID IE, a backoff timer IE, and a cause IE that identifies a cause for the termination of operations. In operation block 1606, the DPC 146 may clear all the related resources associated with the DSC 144 and/or perform other similar operations to de-register the DSC 144 in response to receiving the DSC DE-REGISTER message.

Figure 16B:
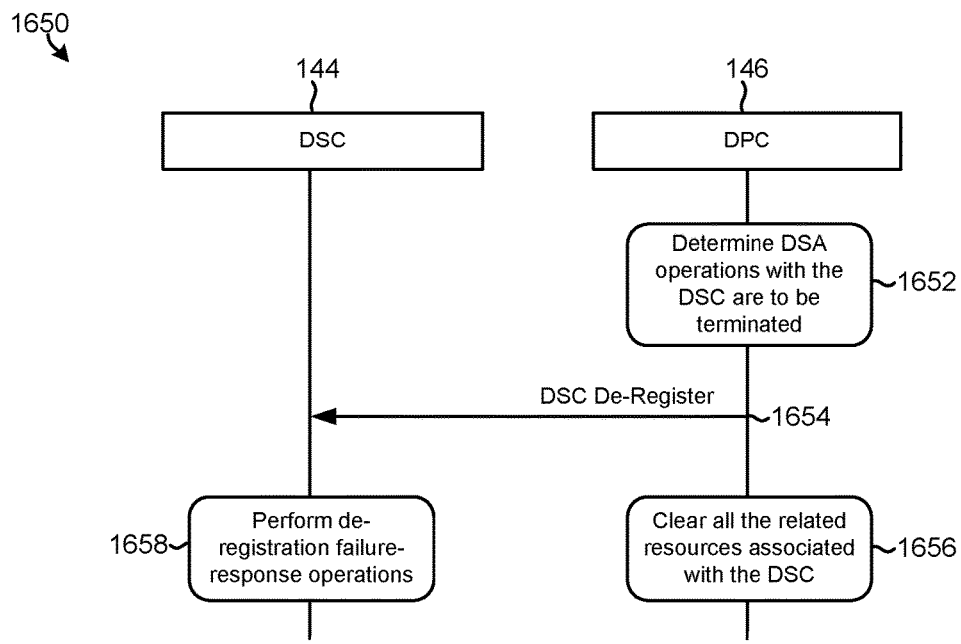
FIG. 16B is a message flow diagram illustrating an embodiment DPC initiated de-registration method for terminating DSA operations.

FIG. 16B illustrates an embodiment DPC initiated DSAAP de-registration method 1650 for terminating operations. In the example illustrated in FIG. 16B, the DPC initiated DSAAP de-registration method 1650 is performed by processing cores in a DPC 146 component and a DSC 144 component, each of which may include all or portions of a DSAAP module/component.

In operation block 1652, the DPC 146 may determine that it needs to terminate DSA operations with the DSC 144. In operation 1654, the DPC 146 may generate and send a DSC DE-REGISTER message to the DSC 144. The DPC 146 may be configured to generate the DSC DE-REGISTER message to include any or all of a message type information element (IE), a message ID IE, a backoff timer IE, and a cause IE that identifies a cause for the termination of operations (e.g., overload, unspecified, etc.). In operation block 1656, the DPC 146 may clear all the related resources associated with the DSC 144 and/or perform other similar operations to de-register the DSC 144.

In operation block 1658, the DSC 144 may perform various de-registration failure response operations based on the information included in the received DSC DE-REGISTER message. For example, the DSC 144 may be configured to not retry registration to the same DPC 146 for at least the duration indicated in the backoff timer IE included in the received DSC DE-REGISTER message when the value of the cause IE in the DSC DE-REGISTER message is set to "overload."

Figure 17A:
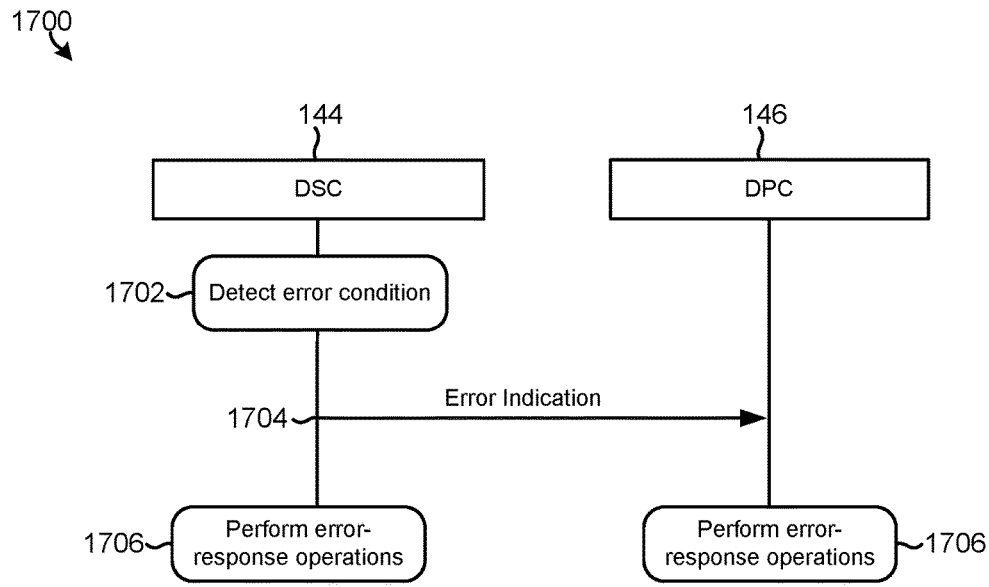
FIG. 17A is a message flow diagram illustrating a DSC initiated error indication method for reporting errors.

FIG. 17A illustrates a DSC initiated DSAAP error indication method 1700 for reporting errors in accordance with an embodiment. In the example illustrated in FIG. 17A, method 1700 is performed by processing cores in a DPC 146 component and a DSC 144 component, each of which may include all or portions of a DSAAP module/component.

In operation block 1702, the DSC 144 may detect an error or error condition (e.g., a protocol error, etc.). In operation 1704, the DSC 144 may generate and send an ERROR INDICATION message to the DPC 146. The DSC 144 may be configured to generate the ERROR INDICATION message to include any or all of a message type information element (IE), a message ID IE, cause IE, and a criticality diagnostics IE. The cause IE may include information suitable for use in identifying a cause or type of the error (e.g., transfer syntax error, abstract syntax error, logical error, etc.). The criticality diagnostics IE may include a procedure code IE, a triggering message IE, and a procedure criticality IE. In operation block 1706, the DSC 144 and/or DPC 146 may perform various error-response operations based on the detected error or information included in the received ERROR INDICATION message. The error detection and response operations are discussed in detail further below.

Figure 17B:
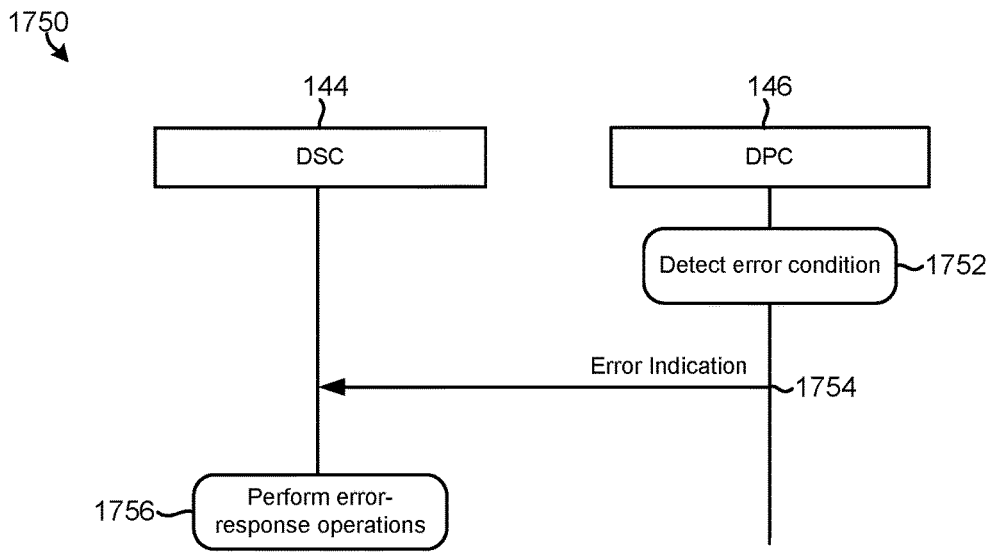
FIG. 17B is a message flow diagram illustrating a DPC initiated error indication method for reporting errors.

FIG. 17B illustrates an embodiment DPC initiated DSAAP error indication method 1750 for reporting errors in accordance with another embodiment. In the example illustrated in FIG. 17B, method 1750 is performed by processing cores in a DPC 146 component and a DSC 144 component, each of which may include all or portions of a DSAAP module/component.

In operation block 1752, the DPC 146 may detect an error condition. In operation 1754, the DPC 146 may generate and send an ERROR INDICATION message to the DSC 144. The DPC 146 may be configured to generate the ERROR INDICATION message to include a cause information element (IE) that identifies a cause for the error. In operation block 1756, the DSC 144 and/or DPC 146 may perform various error-response operations based on the information included in the received ERROR INDICATION message.

As mentioned above, the DSC 144 and DPC 146 may be configured perform various error-response or failure response operations in response to detecting an error or failure condition. As part of these operations, the DSC 144 and/or DPC 146 may identify the type or cause of the error/failure condition, and tailor their responses based on the identified type or cause. For example, the DSC 144 and/or DPC 146 may be configured to determine whether a detected error is a protocol error, and tailor their responses accordingly.

Protocol errors include transfer syntax errors, abstract syntax errors, and logical errors. A transfer syntax error may occur when the receiving functional DSAAP entity (e.g., DSC, DPC, etc.) is not able to decode the received physical message. For example, transfer syntax errors may be detected while decoding ASN. 1 information in a received message. In an embodiment, the DSC 144 and DPC 146 components may be configured to retransmit or re-request a DSAAP message in response to determining that a detected error is a transfer syntax error (e.g., as part of the error-response operations).

An abstract syntax error may occur when the receiving functional DSAAP entity (e.g., DSC, DPC, etc.) receives information elements (IEs) or IE groups that cannot be comprehended or understood (i.e., an unknown IE id). An abstract syntax error may also occur when the entity receives an information element (IE) for which a logical range (e.g., allowed number of copies) is violated. The DSC 144 and DPC 146 components may be configured to detect or identify these types of abstract syntax errors (i.e., cannot comprehend abstract syntax error), and in response, perform error-response operations based on criticality information included in the corresponding DSAAP message. Additional details regarding these operations and the criticality information are provided further below.

An abstract syntax error may also occur when the receiving functional DSAAP entity does not receive IEs or IE groups, but according to the specified presence of the object, the IEs or IE groups should have been present in the received message. The DSC 144 and DPC 146 components may be configured to detect or identify these particular types of abstract syntax errors (i.e., missing IE or IE group), and in response, perform error-response operations based on criticality information and presence information for the missing IE/IE group. Additional details regarding these operations, criticality information, and presence information are provided further below.

An abstract syntax error may also occur when the receiving entity receives IEs or IE groups that are defined to be part of that message in wrong order or with too many occurrences of the same IE or IE group. In addition, an abstract syntax error may also occur when the receiving entity receives IEs or IE groups, but according to the conditional presence of the concerning object and the specified condition, the IEs or IE groups should not have been present in the received message. The DSC 144 and DPC 146 components may be configured to detect or identify such abstract syntax errors (i.e., wrong order, too many occurrences, erroneously present, etc.), and in response, reject or terminate a procedure or method associated with the error (e.g., the method that caused the error). The DSC 144 and DPC 146 components may reject or terminate the procedure/method as part of the error-response operations.

In the various embodiments, the DSC 144 and DPC 146 components may be configured to continue to decode, read, or process a DSAAP message after detecting, identifying, or determining that an abstract syntax error occurred for that message. For example, the DSC 144 and DPC 146 components may skip a portion of the message that includes an error, and continue processing the other portions of the message. As part of this continued processing, the DSC 144 and DPC 146 components may detect or identify additional abstract syntax errors.

In an embodiment, the DSC 144 and DPC 146 components may be configured to perform error-response operations for each detected abstract syntax error and/or based on the criticality information and presence information for the IE/IE group associated with the abstract syntax error.

As mentioned above, each DSAAP message may include, or may be associated with, criticality information, presence information, range information, and assigned criticality information. In the various embodiments, a receiving functional DSAAP entity (e.g., DSC, DPC, etc.) may be configured to use any or all of such information (e.g., criticality information, presence information, etc.) when detecting an error, identifying the type of the error, or the specific error-response that are to be performed. That is, the entity may perform different operations depending on the values of the criticality information, presence information, range information, and/or assigned criticality information.

In an embodiment, the receiving functional DSAAP entity (e.g., DSC, DPC, etc.) may be configured to use the presence information included in a DSAAP message when identifying the type of error and the specific error-response operations that are to be performed for the identified error type. For example, the entity may use the presence information to determine whether the presence of an information element (IE) is optional, conditional, or mandatory (e.g., with respect to RNS application) for that message or communication. The entity may determine that an abstract syntax error has occurred when a received message is missing one or more information elements that are determined to be mandatory (or conditional when the condition is true).

In an embodiment, the receiving functional DSAAP entity (e.g., DSC, DPC, etc.) may be configured use the criticality information when identifying the specific error-response operations that are to be performed. That is, each DSAAP message may include criticality information for each individual information element (IE) or IE group included in that message. The values of criticality information for each IE or IE group may include "Reject IE," "Ignore IE and Notify Sender," and "Ignore IE." The receiving entity (e.g., DSC, DPC, etc.) may use this criticality information to determine that an IE, an IE group, or an EP is incomprehensible, identify the condition as an abstract syntax error (i.e., a cannot comprehend abstract syntax error), and/or to identify the error-response operations that are to be performed (e.g., reject, ignore, notify, etc.).

In an embodiment, the receiving entity (e.g., DSC, DPC, etc.) may be configured to reject a method/procedure and initiate a DSAAP error indication method (discussed above with reference to FIGS. 17A-B) in response to determining that an information element (IE) included in a message received during the performance of that method/procedure is incomprehensible, and that value of the criticality information for that IE is set to "Reject IE."

For example, when a message that initiates a method/procedure (e.g., a DSC REGISTER REQUEST message, etc.) is received, determined to include one or more IEs/IE groups that are incomprehensible and marked as "Reject IE," the receiving entity may the reject the method/procedure by not executing any of the functional requests included in that message. The receiving entity may also report the rejection of one or more IEs/IE groups using the message normally used to report unsuccessful outcome of the procedure. When the information in the received initiating message is insufficient and cannot be used to determine a value for all IEs that are required to be present in the message used to report the unsuccessful outcome of the procedure, the receiving entity may terminate the procedure and initiate a DSAAP error indication method/procedure.

As a further example, when a message initiating a method/procedure that does not have a message to report unsuccessful outcome is received, and that message includes one or more IEs/IE groups marked with "Reject IE" which the receiving entity does not comprehend, the receiving entity may terminate the method/procedure and initiate a DSAAP error indication method/procedure.

As yet another example, when a response message (e.g., a DSC REGISTER RESPONSE message, etc.) is received that includes one or more IEs marked with "Reject IE" which the receiving entity does not comprehend, the receiving entity may consider the method/procedure as being unsuccessfully terminated, and initiate a local error handling method.

In an embodiment, the receiving entity (e.g., DSC, DPC, etc.) may be configured to ignore or skip a method/procedure and initiate an DSAAP error indication method (discussed above with reference to FIGS. 17A-B) in response to determining that an information element (IE) included in a message received during the performance of that method/procedure is incomprehensible, and that value of the criticality information for that IE is set to "Ignore IE and Notify Sender."

As an example, when a message initiating a method/procedure is received containing one or more IEs/IE groups marked with "Ignore IE and Notify Sender" which the receiving entity does not comprehend, the receiving entity may ignore the content of the incomprehensible IEs/IE groups, continue with the method/procedure as if the incomprehensible IEs/IE groups were not received (except for the reporting) using the comprehended IEs/IE groups, and report in the response message of the method/procedure that one or more IEs/IE groups have been ignored. When the information received in the initiating message is insufficient to determine a value for all IEs that are required to be present in the response message, the receiving entity may terminate the method/procedure and initiate a DSAAP error indication method/procedure.

As a further example, when a message initiating a method/procedure that does not have a message to report the outcome of the method/procedure is received containing one or more IEs/IE groups marked with "Ignore IE and Notify Sender" which the receiving entity does not comprehend, the receiving entity may ignore the content of the not comprehended IEs/IE groups, continue with the method/procedure as if the not comprehended IEs/IE groups were not received (except for the reporting) using the understood IEs/IE groups, and initiate a DSAAP error indication method/procedure to report that one or more IEs/IE groups have been ignored.

As yet another example, when a response message is received containing one or more IEs/IE groups marked with "Ignore IE and Notify Sender" which the receiving entity does not comprehend, the receiving entity may ignore the content of the not comprehended IE/IE groups, continue with the method/procedure as if the not comprehended IEs/IE groups were not received (except for the reporting) using the understood IEs/IE groups and initiate a DSAAP error indication method/procedure.

In an embodiment, the receiving entity (e.g., DSC, DPC, etc.) may be configured to ignore or skip a method/procedure in response to determining that an information element (IE) included in a message received during the performance of that method/procedure is incomprehensible, and that value of the criticality information for that IE is set to "Ignore IE."

As an example, when a message initiating a method/procedure is received containing one or more IEs/IE groups marked with "Ignore IE" which the receiving entity does not comprehend, the receiving entity may ignore the content of the not comprehended IEs/IE groups and continue with the method/procedure as if the not comprehended IEs/IE groups were not received using only the understood IEs/IE groups.

As a further example, when a response message is received that includes one or more IEs/IE groups marked with "Ignore IE" which the receiving entity does not comprehend, the receiving entity may ignore the content of the not comprehended IEs/IE groups and continue with the method/procedure as if the not comprehended IEs/IE groups were not received using the understood IEs/IE groups.

When reporting not comprehended IEs/IE groups marked with "Reject IE" or "Ignore IE and Notify Sender" using a response message defined for the method/procedure, the Information Element Criticality Diagnostics IE may be included in the Criticality Diagnostics IE for each reported IE/IE group.

In an embodiment, the receiving entity (e.g., DSC, DPC, etc.) may be configured to initiate a DSAAP error indication method (discussed above with reference to FIGS. 17A-B) in response to determining that it cannot decode a type of message IE in a received message. In an embodiment, the entity may be configured to only consider the IEs specified in the specification version used by the component when determining the correct order for the IE included in a message.

In an embodiment, the receiving entity (e.g., DSC, DPC, etc.) may be configured to treat the missing IE/IE group according to the criticality information for the missing IE/IE group in the received message specified in the version of the present document used by the receiver.

As an example, the receiving entity (e.g., DSC, DPC, etc.) may be configured to not execute any of the functional requests of a received initiating message in response to determining that the received message is missing one or more IEs/IE groups with specified criticality "Reject IE." The receiving entity may reject the method/procedure and report the missing IEs/IE groups using the message normally used to report unsuccessful outcome of the method/procedure. When it is determined that the information received in the initiating message was insufficient to determine a value for all IEs that are required to be present in the message used to report the unsuccessful outcome of the method/procedure, the receiving entity may terminate the method/procedure and initiate a DSAAP error indication method/procedure.

As a further example, when a received message initiating a method/procedure that does not have a message to report unsuccessful outcome is missing one or more IEs/IE groups with specified criticality "Reject IE", the receiving entity may terminate the method/procedure and initiate a DSAAP error indication method/procedure.

As yet another example, when a received response message is missing one or more IEs/IE groups with specified criticality "Reject IE", the receiving entity may consider the method/procedure as unsuccessfully terminated and initiate a local error handling method/procedure.

As another example, when a received message initiating a method/procedure is missing one or more IEs/IE groups with specified criticality "Ignore IE and Notify Sender", the receiving entity may ignore that those IEs are missing and continue with the method/procedure based on the other IEs/IE groups present in the message and report in the response message of the method/procedure that one or more IEs/IE groups were missing. When the information received in the initiating message is insufficient to determine a value for all IEs that are required to be present in the response message, the receiving entity may terminate the method/procedure and initiate a DSAAP error indication method/procedure.

As another example, when a received message initiating a method/procedure that does not have a message to report the outcome of the method/procedure is missing one or more IEs/IE groups with specified criticality "Ignore IE and Notify Sender", the receiving entity may ignore that those IEs are missing and continue with the method/procedure based on the other IEs/IE groups present in the message and initiate a DSAAP error indication method/procedure to report that one or more IEs/IE groups were missing.

As another example, when a received message a received response message is missing one or more IEs/IE groups with specified criticality "Ignore IE and Notify Sender", the receiving entity may ignore that those IEs are missing and continue with the method/procedure based on the other IEs/IE groups present in the message and initiate a DSAAP error indication method/procedure to report that one or more IEs/IE groups were missing.

As another example, when a received message initiating a method/procedure is missing one or more IEs/IE groups with specified criticality "Ignore IE", the receiving entity may ignore that those IEs are missing and continue with the method/procedure based on the other IEs/IE groups present in the message.

As another example, when a received response message is missing one or more IEs/IE groups with specified criticality "Ignore IE", the receiving entity may ignore that those IEs/IE groups are missing and continue with the method/procedure based on the other IEs/IE groups present in the message.

The receiving entity (e.g., DSC, DPC, etc.) may be configured to respond to messages that include IEs or IE groups that received in wrong order, include too many occurrences, or are erroneously present (i.e., are included and marked as "conditional" when the condition is not met) in various ways. For example, the receiving entity (e.g., DSC, DPC, etc.) may be configured to not execute any of the functional requests of a received initiating message in response to determining that the received message includes IEs or IE groups in wrong order, includes too many occurrences of an IE, or includes erroneously present IEs. The receiving entity may reject the method/procedure and report the cause value "Abstract Syntax Error (Falsely Constructed Message)" using the message normally used to report unsuccessful outcome of the method/procedure. When the information received in the initiating message is insufficient to determine a value for all IEs that are required to be present in the message used to report the unsuccessful outcome of the method/procedure, the receiving entity may terminate the method/procedure and initiate a DSAAP error indication method/procedure.

As another example, when a message initiating a method/procedure that does not have a message to report unsuccessful outcome is received containing IEs or IE groups in wrong order or with too many occurrences or erroneously present, the receiving entity may terminate the method/procedure, and initiate a DSAAP error indication method/procedure using the cause value "Abstract Syntax Error (Falsely Constructed Message)".

As another example, when a response message is received containing IEs or IE groups in wrong order or with too many occurrences or erroneously present, the receiving entity may consider the method/procedure as unsuccessfully terminated and initiate local error handling.

As mentioned above, protocol errors include transfer syntax errors, abstract syntax errors, and logical errors. A logical error occurs when a message is comprehended correctly, but the information contained within the message is not valid (i.e. semantic error), or describes a method/procedure which is not compatible with the state of the receiving entity.

In an embodiment, a receiving entity (e.g., DSC, DPC, etc.) may be configured to perform error response operations based on the class of the method/procedure and irrespective of the criticality information of the IE's/IE groups containing the erroneous values in response to determining/detecting an logical error.

For example, when a logical error is detected in a request message of a class 1 method/procedure, and the method/procedure has a message to report this unsuccessful outcome, this message may be sent with an appropriate cause value (i.e., in the clause IE), such as "semantic error" or "message not compatible with receiver state." When a logical error is detected in a request message of a class 1 method/procedure, and the method/procedure does not have a message to report this unsuccessful outcome, the method/procedure may be terminated and a DSAAP error indication method/procedure may be initiated with an appropriate cause value. Where the logical error exists in a response message of a class 1 procedure, the procedure may be considered as unsuccessfully terminated and local error handling may be initiated.

When a logical error is detected in a message of a class 2 procedure, the procedure may be terminated and a DSAAP error indication procedure may be initiated with an appropriate cause value.

In the various embodiments, the receiving entity (e.g., DSC, DPC, etc.) may be configured to perform a local error handling method/procedure (as opposed to a DSAAP error indication method/procedure) when a protocol error is detected in the ERROR INDICATION message. In case a response message or error indication message needs to be returned, but the information necessary to determine the receiver of that message is missing, the procedure may be considered as unsuccessfully terminated and local error handling may be initiated. When an error that terminates a procedure occurs, the returned cause value may reflect the error that caused the termination of the procedure even if one or more abstract syntax errors with criticality "ignore and notify" have earlier occurred within the same procedure.

As discussed above, in the various embodiments, the dynamic spectrum arbitrage application part (DSAAP) protocol or component may be configured to allow, facilitate, support smaller cell architectures, such as the femtocell architectures. In an embodiment, all or portions of the DSAAP protocol/component may be included in a HeNB 117 and/or a HGW 145.

Figure 18:
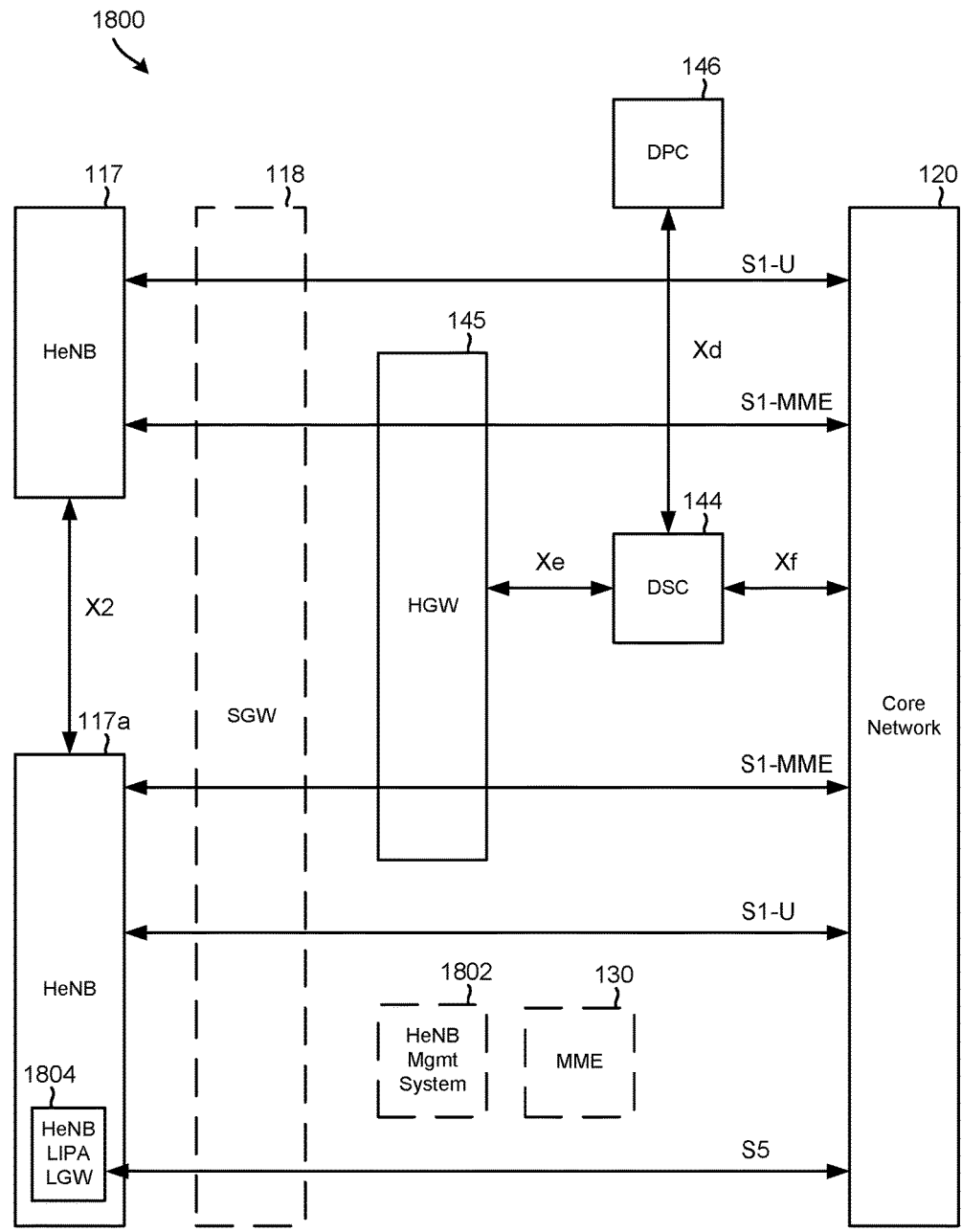
FIG. 18 is a component block diagram illustrating various communication links in an embodiment DSA system that includes femtocells.

FIG. 18 illustrates various communication links in an embodiment DSA system 1800 that includes femtocells. In the example illustrated in FIG. 18, the DSA system 1800 includes HeNBs 117, a HGW 145, a DSC 144, and a DPC 146. The DSA system 1800 may also optionally include a SGW 118, MME 130, a HeNB management system 1802.

Each HeNB 117 may be configured to host the same functions as an eNodeB. Further, each HeNB 117 may serve or operate as an eNodeB to a single cell or to a small geographical area. As such, each HeNB 117 may be a femtocell.

The HeNBs 117 may be configured to establish communication links and/or communicate with components in the core network 120 via a set of S1 interfaces, namely the illustrated S1-U and S1-MME interfaces. The S1-U data plane may be established via (or between) the HeNB 117, HGW 145 and the SGW 118. S1-MME based communications between a HeNB 117 and the core network 120 may be established, facilitated, or provided by the HGW 145. In an embodiment, the HGW 145 may be configured to establish connections to components in the core network 120 so that inbound and outbound mobility to cells served by the HGW 145 do not require inter-MME handovers.

In the various embodiments, the HGW 145 may be configured to operate, communicate, and/or appear as an eNodeB 116 to an MME 130, and as an MME 130 to an eNodeB 116. Thus, an eNodeB 116 may communicate with the HGW 145 in the same manner (and using the same communication links/protocols) as it would communicate with the MME 130. Likewise, an MME 130 may communicate with the HGW 145 in the same manner as it would communicate with an eNodeB 116. This allows the system (or a controller) to dynamically add or remove components (e.g., HeNBs, eNodeBs, MMEs, etc.) without negatively impacting the performance or responsiveness of the system 1800. This also allows a large number of additional HeNBs 117 to be deployed into the network or system 1800 without significant preparation or network planning.

The HGW 145 may be configured to operate as a gateway between the HeNB 117 (or tens, hundreds, or thousands of HeNBs 117), the DSC 144, and the core network 120. Further, the HGW 145 may be configured represent many different HeNBs 117 so that they appear as a single eNodeB 116 to the DSC 144. This allows the DSC 144 to interface and communicate with a single HGW 145 that manages or represents a large number of different HeNBs 117 (i.e., rather than the DSC communicating with a large number of individual HeNBs).

In an embodiment, one or more of the HeNBs 117 may be configured to operate in local IP access (LIPA) mode. In the example illustrated in FIG. 18, HeNB 117a includes a LIPA local gateway (HeNB LIPA LGW) 1804 module, which may be configured to allow, facilitate, or support communications between the HeNB 117a and the core network 120 via the S5 interface when operating in LIPA mode. As such, HeNB 117a may support the LIPA function system regardless of the HGW 145 connection.

The HeNB LIPA LGW 1804 module may set up and maintain an S5 connection to the core network 120 so that the HGW 145 is not required or used to establish the S5 interface. The HeNB LIPA LGW 1804 module may reuse an IP address used for S1 interface/connection for the S5 interface/connection. This allows the system to reuse an S1 secure interface. The HeNB LIPA LGW 1804 module may also use another IP address, which may result another secure interface. The S5 LIPA connection may be released at outgoing handover, in which case the HeNB LIPA LGW 1804 may trigger a release over the S5 interface.

In addition, the HeNB LIPA LGW 1804 module may be configured to perform various operations to support various additional functions independent of the presence of a HGW 145 in the system 1800. For example, the HeNB LIPA LGW 1804 module may be configured to transfer collocated LGW IP address of the HeNB 117 over S1-MME to the core network 120 at every idle-active transition, transfer collocated LGW IP address of the HeNB 117 over S1-MME to the core network 120 for an uplink NAS transport procedure, and support basic PGW 128 functions in the collocated LGW function. The HeNB LIPA LGW 1804 module may support a SGi interface corresponding to LIPA, provide additional support for sending first packets, buffer subsequent packets, provide internal direct LGW-to-HeNB user path management, provide in sequence packet delivery to the wireless device 102, etc. Further, the HeNB LIPA LGW 1804 module may be configured to support restricted S5 procedures (e.g., corresponding to the strict support of LIPA function), send notifications to the core network 120 for collocated LGW functions. The HeNB LIPA LGW 1804 module may be configured to uplink TEIDs for the LIPA bearers over S5 interface within the restricted set of procedures to be forwarded over S1-MME, and further used by the HeNB 117 as 'correlation id' for correlation purposes between the collocated L-GW function and the HeNB 117. In case of outgoing handover triggering the LGW function to release the LIPA PDN connection, the HeNB LIPA LGW 1804 module may hand over the non-LIPA E-RABs.

In case of LIPA support, the MME 130 may support the following additional functions: verification of UE authorization to request LIPA activation for the requested APN at this CSG and transfer of the received collocated L-GW IP address; transfer of the 'correlation id' i.e. collocated L-GW uplink TEID to the HeNB 117 within the UE context setup procedure and E-RAB setup procedure; verification of whether the LIPA PDN connection has been released during the handover procedure; deactivation of the LIPA PDN connection of an idle-mode UE if it detects that the UE has moved out of the coverage area of the HeNB 117 collocated with LGW function.

The various embodiments may support direct X2-connectivity between HeNBs 117, independent of whether any of the involved HeNBs 117 is connected to a HGW 145. In an embodiment, the system and/or it components may be configured so that the Tracking Area Code (TAC) and PLMN ID used by a HeNB 117 is also supported by the HGW 145.

As mentioned above, a HeNB 117 may be configured to host the same functions as an eNodeB 116. In addition to these functions, the HeNB 117 may be configured to discover a suitable serving HGW 145. The HeNB 117 may be configured to connect to a single HGW 145 at a time (e.g., no S1 Flex function used at the HeNB). The HeNB 117 may be configured to not simultaneously connect to a second HGW 145 or to an MME 130.

In an embodiment, the system 1800 and/or it components may be configured so that a HeNB 117 may be moved from one geographical area to another. In such systems, the HeNB 117 may be configured to automatically discover and suitable serving HGW 145, establish a communication link to the discovered HGW 145, and terminate the communication link to the previous HGW 145.

In an embodiment, the HGW 145 may be configured to host the selection of a MME 130. Thus, the system 1800 and/or it components may be configured so that the selection of an MME 130 (e.g., when a wireless device 102 attaches) is hosted by a HGW 145 (as opposed to a HeNB).

In an embodiment, the HeNB 117 may be configured to support a fixed broadband access network interworking function to signal tunnel information to the MME 130 via INITIAL UE MESSAGE, PATH SWITCH REQUEST message and HANDOVER NOTIFY message. In an embodiment, the tunnel information may include a HeNB IP address (and the UDP port if NAT/NAPT is detected).

In an embodiment, the HeNB 117 may be configured to receive a Globally Unique Mobility Management Entity Identifier (GUMMEI) from a wireless device 102, and include the received GUMMEI in the INITIAL UE communication message. The HeNB 117 may be further configured to a GUMMEI Type in the INITIAL UE communication message. In an embodiment, the system and/or it components may be configured to support signaling the GUMMEI of a source MME 130 to the HGW 145 in the S1 PATH SWITCH REQUEST message.

In an embodiment, the HGW 145 may be configured to relay S1 application part messages between the MME 130 and HeNB 117 serving a wireless device 102.

In an embodiment, the HGW 145 may be configured to terminate a S1 context release request procedure and release an S1 context in response to receiving a UE CONTEXT RELEASE REQUEST message from a HeNB 117, such as when the message includes an explicit gateway context release indication and/or in response to determining that the wireless device identified by the received message is no longer served by the attached HeNB 117.

In an embodiment, the HGW 145 may be configured to inform a HeNB 117 about a GUMMEI corresponding to a serving MME 130, the MME UE S1AP ID assigned by the MME 130, and the MME UE S1AP ID assigned by the HGW 145 for the wireless device 102 in response to receiving a S1 INITIAL CONTEXT SETUP REQUEST message and S1 HANDOVER REQUEST message.

In an embodiment, the HGW 145 117 may be configured to inform a HeNB 117 about the MME UE S1AP ID assigned by the MME 130 and the MME UE S1AP ID assigned by the HGW 145 for the wireless device in response to receiving a S1 PATH SWITCH REQUEST ACKNOWLEDGE message.

In an embodiment, the HGW 145 may be configured to verify that an indicated cell access mode is valid for a HeNB 117 in response to receiving an S1 INITIAL UE message, S1 PATH SWITCH REQUEST, and/or S1 HANDOVER REQUEST ACKNOWLEDGE message. The HGW 145 may be further configured to verify that a CSG ID is also valid for that HeNB 117 when the access mode is closed (i.e., is a closed access HeNB).

In various embodiments, the system and/or it components may be configured so that a component may terminate non-UE associated S1 application part procedures towards a HeNB 117 and towards an MME 130.

In an embodiment, the HGW 145 may be configured verify that an identity used by the HeNB is valid in response to receiving a S1 SETUP REQUEST message. In an embodiment, the HGW 145 may be configured so that, upon receiving an OVERLOAD message, the HGW 145 may send the OVERLOAD message towards the HeNB(s), including in the message the identities of the affected MME node. In an embodiment, if a HGW 145 is deployed, a non-UE associated procedure may be performed between HeNBs and the HGW 145 and between the HGW 145 and the MME 130.

In various embodiments, the system and/or it components may be configured so that a component may optionally terminate S1-U interface with the HeNB 117 and with the SGW 118. In various embodiments, the system and/or it components may be configured to support TAC and PLMN ID used by the HeNB 117. In various embodiments, the system and/or it components may be configured so that the X2 interfaces are not be established between the HGW 145 and other nodes.

In various embodiments, the system and/or it components may be configured to route the S1 PATH SWITCH REQUEST message towards the MME 130 based on the GUMMEI received from the HeNB 117. In an embodiment, a list of CSG IDs may be included in the PAGING message, and the HGW 145 may be configured to use the list of CSG IDs for paging optimization.

In an embodiment, the MME 130 may be configured to provide access control functionality for wireless devices 102 that are members of a closed subscriber group (CSG). In case of handovers to CSG cells, access control may be based on the target CSG ID of the selected target PLMN provided to the MME 130 by the serving network.

In an embodiment, the MME 130 may be configured to provide membership verification for wireless devices that are handed over to hybrid cells. In case of handovers to hybrid cells, the MME 130 may perform membership verification based on a wireless device's selected target PLMN, cell access mode related information, and the CSG ID of the target cell provided by the source network in S1 handover (or by the target network in X2 handover).

In an embodiment, the MME 130 may be configured to provide CSG membership status signaling to the network, such as in case of attachment/handover to hybrid cells and in case of the change of membership status when a wireless device is served by a CSG cell or a hybrid cell. In an embodiment, the MME 130 may be configured to supervise the network operations/actions after the change in the membership status of a wireless device.

In an embodiment, the MME 130 may be configured so that, when a HeNB 117 is directly connected, the MME 130 verifies that the identity used by the HeNB 117 is valid. The MME 130 may verify the identity in response to receiving a S1 SETUP REQUEST message. In addition, the MME 130 may verify that the indicated cell access mode is valid, and when the access mode is closed, that the provided CSG ID is valid when receiving the INITIAL UE MESSAGE message, the PATH SWITCH REQUEST and the HANDOVER REQUEST ACKNOWLEDGE message.

In an embodiment, the MME 130 may be configured to route handover messages, which may be accomplished via MME configuration transfer messages and MME Direct Information Transfer messages towards HGWs 145 based on the TAI contained in these messages. In an embodiment, the MME 130 may be configured to determine whether routing ambiguities are to be avoided. The MME 130 may be configured to not reuse the system TAI used in a HGW 145 in another HGW 145 in response to determining that routing ambiguities are to be avoided.

In various embodiments, the MME 130 and/or HGW 145 may be configured to not include the list of CSG IDs for paging when sending the paging message directly to an un-trusted HeNB 117 or eNodeB 116. In an embodiment, the MME 130 may be configured to support the LIPA function with HeNB 117. In an embodiment, the MME 130 may be configured to fixed broadband access network interworking with HeNB 117.

FIG. 19 illustrates the relationships between a source component and a target component for X2-based handover (HO) support in accordance with an embodiment. Specifically, FIG. 19 illustrates that when the target node is a eNodeB, the source may be any HeNB. The target may be an open access HeNB or a hybrid access HeNB when the source is the eNodeB or any HeNB in the system. The target may be a closed access HeNB when the source is a hybrid access HeNB or a closed access HeNB. This case may be particularly relevant when the wireless device that is to be handed over is a member of a CSG cells and source/target nodes include the same CSG Id and PLMN.

Figure 20A:
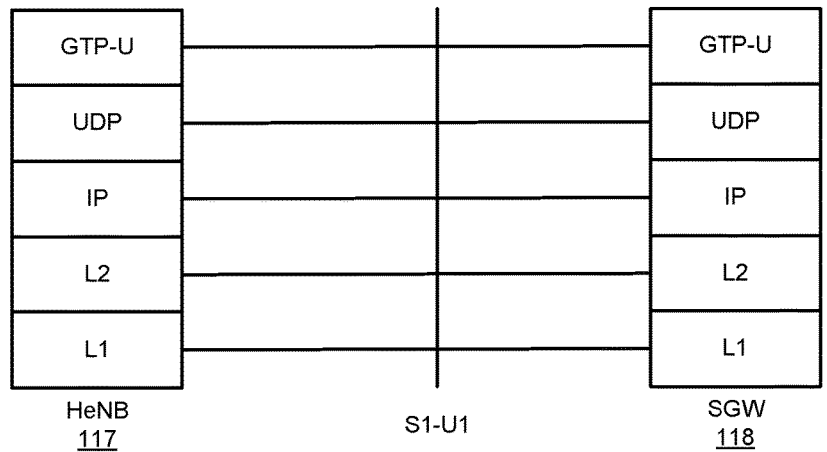
FIGS. 20A through 22 are block diagrams illustrating protocol stacks for user plane and control plane communications between various components in accordance with various embodiments.
Figure 20B:
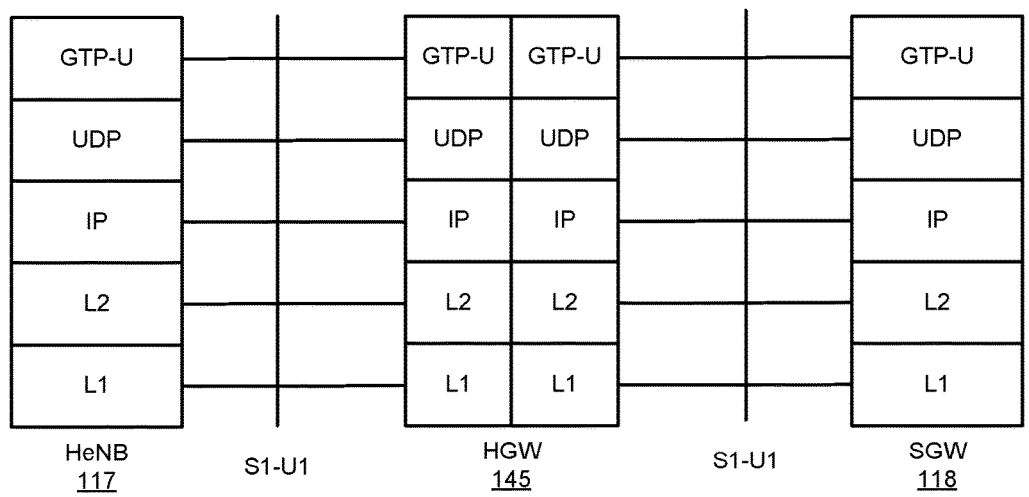

FIG. 20A illustrates a protocol stack for user plane communications via the S1-U interface between a HeNB 117 component and a SGW 118 component. FIG. 20B illustrates a protocol stack for user plane communications for S1-U interface between the HeNB 117 component and the SGW 118 component via an HGW 145 component. These figures illustrate that the HGW 145 may optionally terminate the user plane towards the HeNB 117 and towards the SGW 118, and relay user plane data between the HeNB 117 and the SGW 118.

Figure 21A:
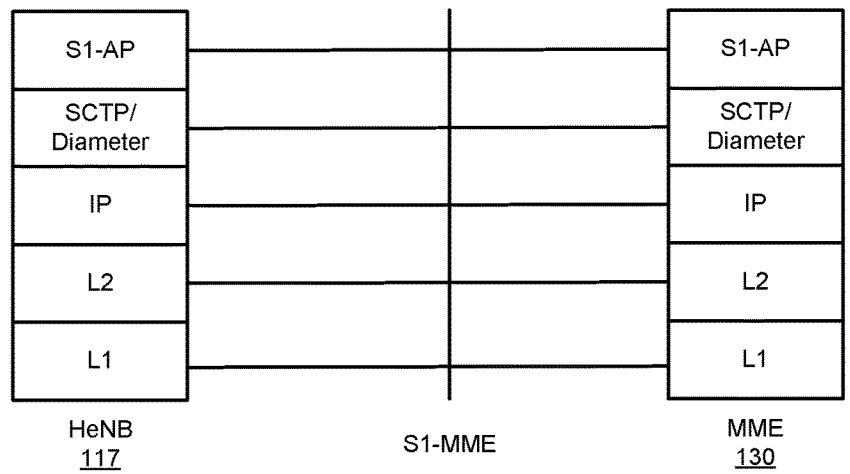
Figure 21B:
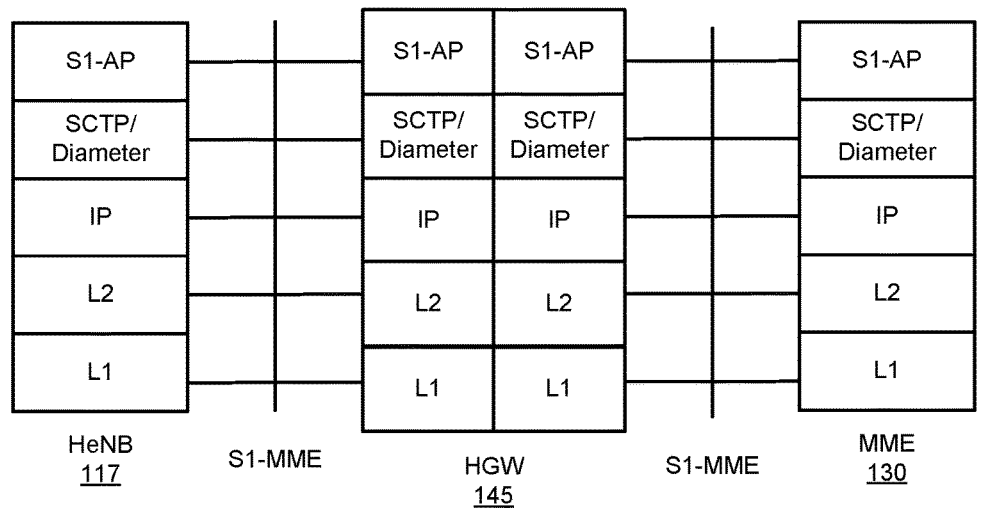

FIG. 21A illustrates a protocol stack for control plane communications via the S1-MME interface between a HeNB 117 component and a MME 130 component. FIG. 21B illustrates a protocol stack for control plane communications via the S1-MME interface between the HeNB 117 component and the MME 130 component via an HGW 145 component. These figures illustrate that when the HGW 145 is not present (e.g., FIG. 21A), all the S1-AP procedures may be terminated at the HeNB 117 and the MME 130. When the HGW 145 is present (FIG. 21B), the HGW 145 may terminate the non-UE-dedicated procedures, both with the HeNB 117, and with the MME 130.

The HGW 145 may relay control plane data between the HeNB 117 and the MME. The scope of any protocol function associated to a non-UE-dedicated procedure may be between HeNB 117 and HGW 145 and/or between HGW 145 and MME 130. Any protocol function associated to an UE-dedicated-procedure may reside within the HeNB 117 and the MME 130.

Figure 22:
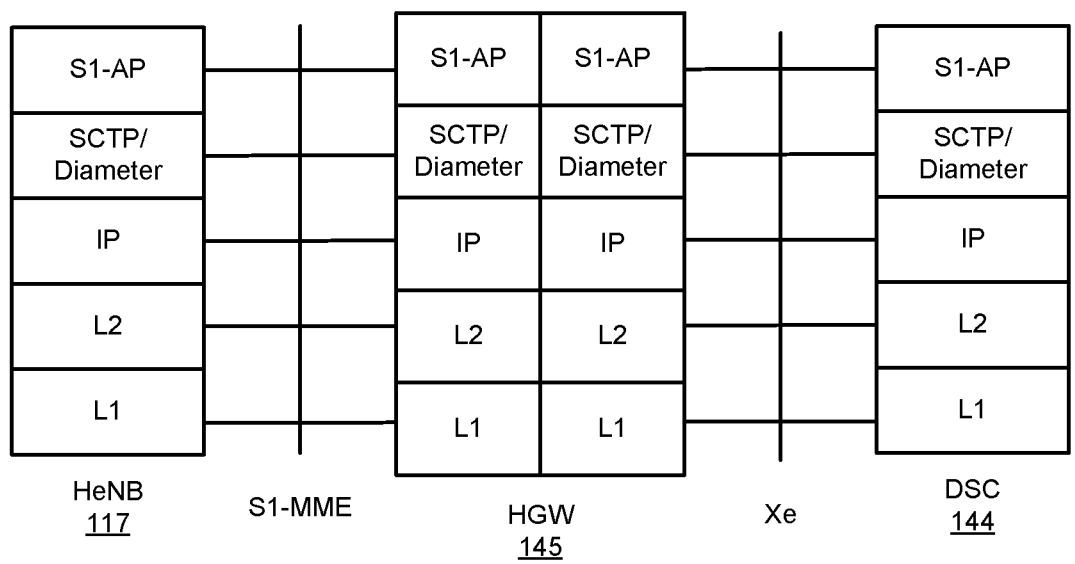

FIG. 22 illustrates a protocol stack for control plane communications via the S1-MME interface between an HeNB 117 and HGW 145, and via the Xe interface between the HGW 145 and DSC 144.

Figure 23:
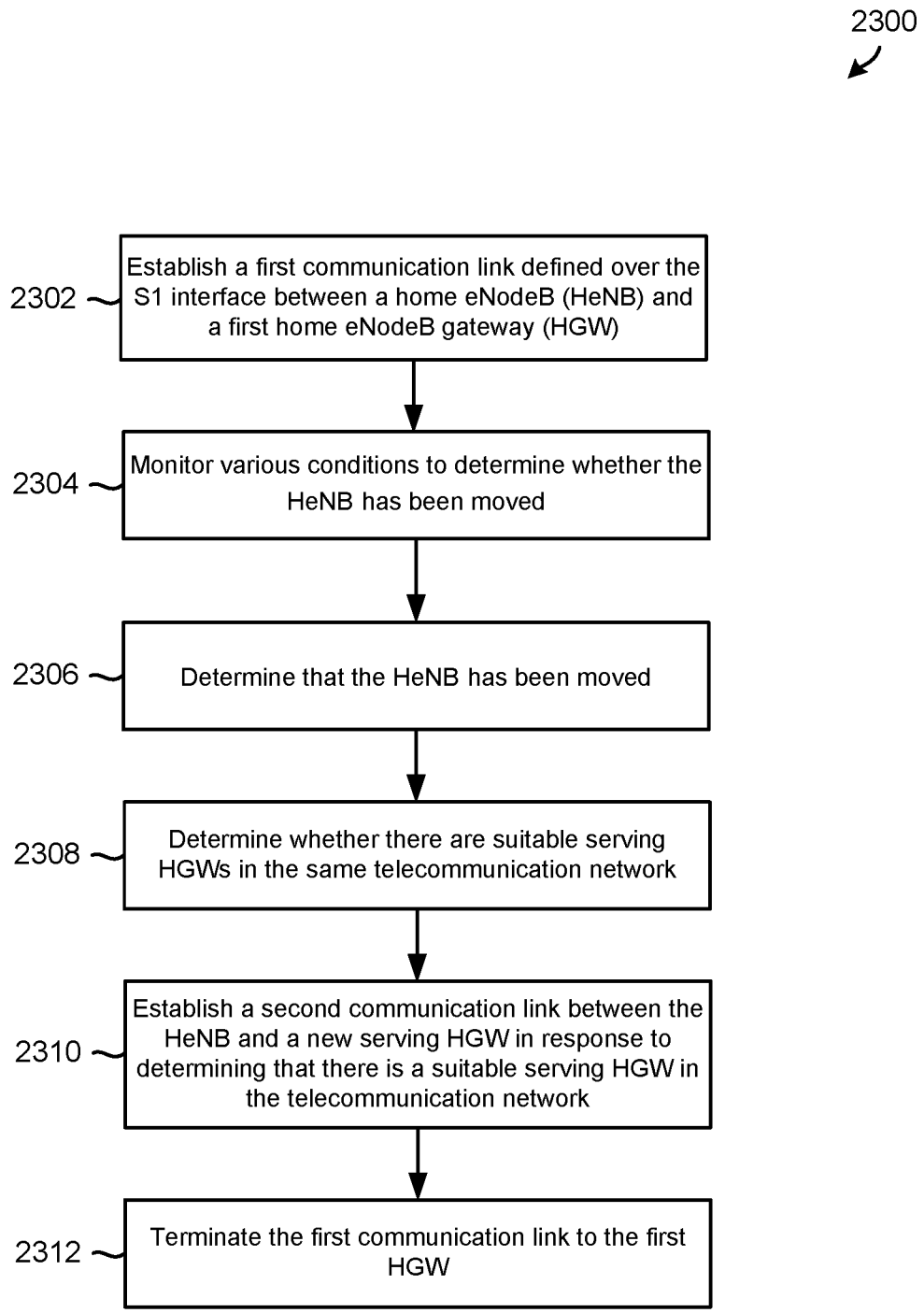
FIG. 23 is a process flow diagram illustrating an embodiment home eNodeB (HeNB) method of dynamically determining a most suitable serving home eNodeB gateway (HGW).

FIG. 23 illustrates embodiment home eNodeB (HeNB) method 2300 of dynamically determining a most suitable serving home eNodeB gateway (HGW) through which to connect to the core network and/or a DSA system. Method 2300 may be performed by a processing core of a femtocell or HeNB.

In block 2302, the processing core may establish a first communication link defined over the S1 interface between a femtocell/HeNB and a first home eNodeB gateway (HGW). In block 2304, the processing core may monitor various conditions (e.g., GPS information, signal strengths, etc.) to determine whether the HeNB has been moved. In block 2306, the processing core may determine that the HeNB has been moved. In block 2308, the processing core may determine whether there are suitable serving HGWs in the same telecommunication network. In block 2310, the processing core may establish a second communication link between the HeNB and a new serving HGW in response to determining that there is a suitable serving HGW in the telecommunication network. In block 2312, the processing core may terminate the first communication link to the first HGW.

Figure 24:
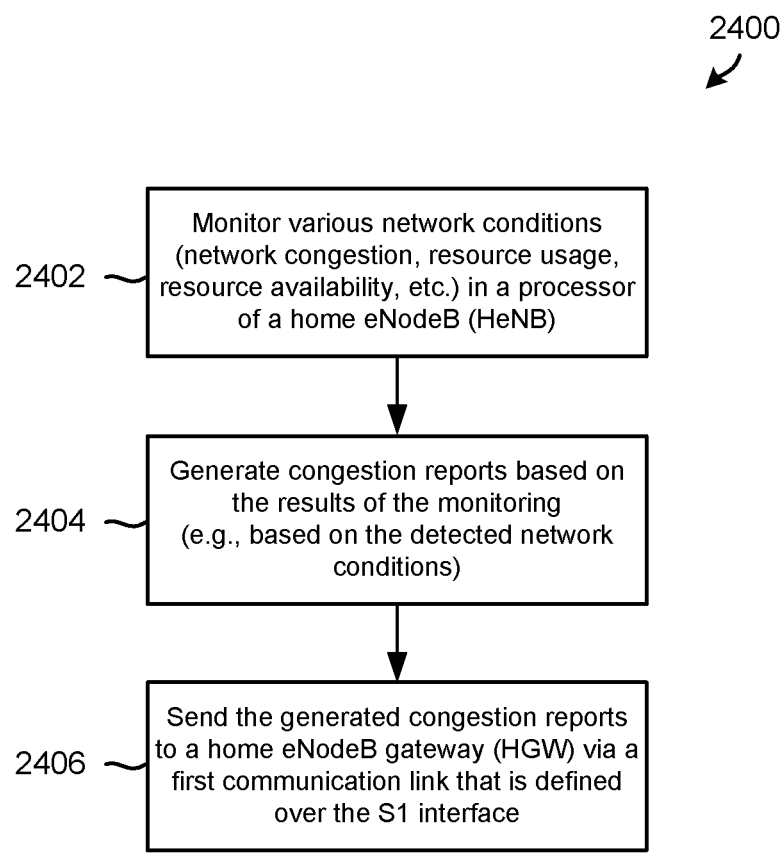
FIG. 24 is a process flow diagram illustrating a home eNodeB (HeNB) method of generating congestion reports in accordance with an embodiment.

FIG. 24 illustrates a home eNodeB (HeNB) method 2400 of generating congestion reports. Method 2400 may be performed in a processing core of a HeNB component. In block 2402, the processing core may monitor various network conditions (network congestion, resource usage, resource availability, etc.). In block 2404, the processing core may generate congestion reports based on the results of the monitoring (e.g., based on the detected network conditions). In block 2406, the processing core may send the generated congestion reports to a home eNodeB gateway (HGW) via a first communication link that is defined over the S1 interface.

Figure 25:
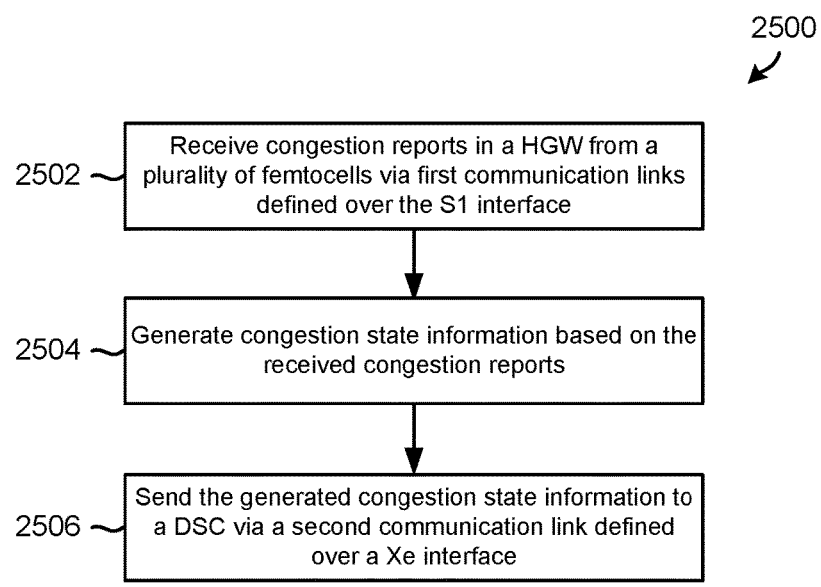
FIG. 25 is a process flow diagram illustrating a home eNodeB gateway (HGW) method of generating congestion state information based on information received from many femtocells and in accordance with an embodiment.

FIG. 25 illustrates a home eNodeB gateway (HGW) method 2500 of generating congestion state information based on information received from many femtocells. Method 2500 may be performed in a processing core of a HGW component. In block 2502, the processing core may receive congestion reports from a plurality of femtocells via first communication links defined over the S1 interface. In block 2504, the processing core may generate congestion state information based on the received congestion reports. In block 2506, the processing core may send the generated congestion state information to a DSC via a second communication link defined over a Xe interface.

Figure 26:
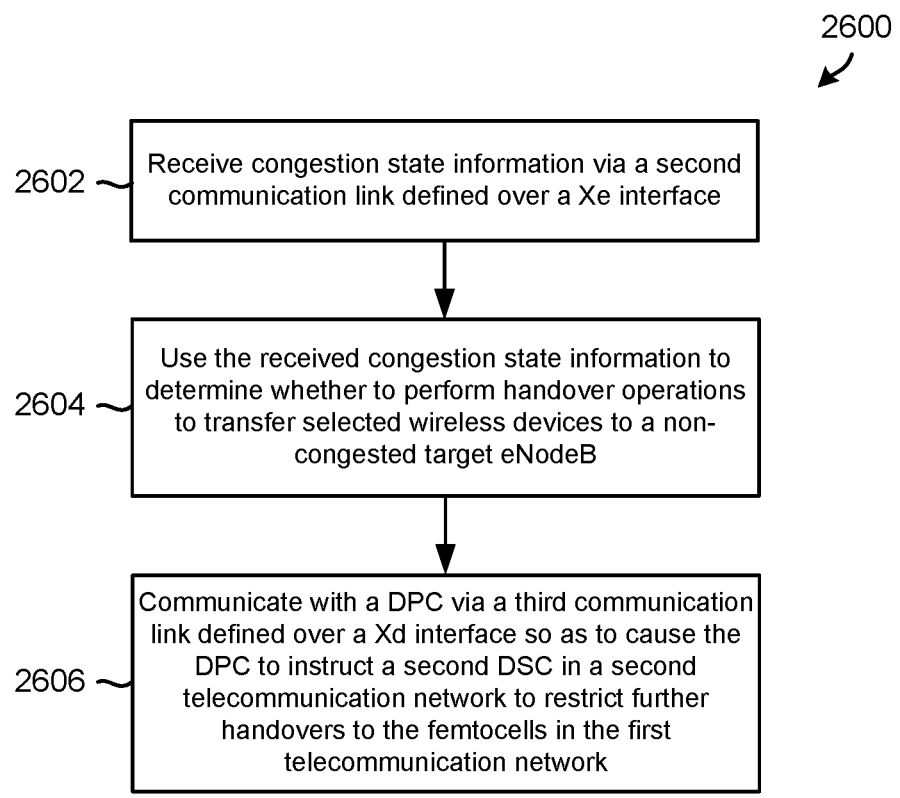
FIG. 26 is a process flow diagram illustrating a dynamic spectrum controller (DSC) method of managing congestion in a telecommunication network in accordance with an embodiment.

FIG. 26 illustrates a DSC method 2600 of managing congestion in a telecommunication network. Method 2600 may be performed in a processing core of a DSC component. In block 2602, the processing core may receive congestion state information via a second communication link defined over a Xe interface. In block 2602, the processing core may use the received congestion state information to determine whether to perform handover operations to transfer selected wireless devices to a non-congested target eNodeB. In block 2602, the processing core may communicate with a DPC component via a third communication link defined over a Xd interface so as to cause the DPC to instruct a second DSC in a second telecommunication network to restrict further handovers to the femtocells in the first telecommunication network.

The various embodiments may include or use a dynamic spectrum arbitrage application part (DSAAP) protocol and/or component that is configured to allow, facilitate, support, or augment communications between two or more DSA components (e.g., DPC, DSC, eNodeB, MME, HSS, etc.) so as to improve the efficiency and speed of the DSA system. A DSA component may be any component discussed in this application and/or any component that participates in any of the DSA operations, communications, or methods discussed in this application. As such, the DSAAP component(s) may be configured to allow, facilitate, support, or augment communications between any of the components discussed in this application, including the communications between a DPC component and a DSC component, between the DSC component and a eNodeB component, between the DSC component and an MME component, between the DSC component and an HSS component, between the MME component and the HSS component, between the eNodeB component and a wireless device, etc.

To facilitate the communications between two or more DSA components, the DSAAP component(s) may publish application programming interfaces (API) and/or include client modules that facilitate communications between the DSA components. In addition, the DSAAP component(s) may be configured to allow the DSA components to communicate specific information, use specific communication messages, and/or perform specific operations that together provide various DSA functions that further improve the efficiency and speed of the DSA system and participating networks.

As an example, the DSAAP component(s) may be configured to allow an eNodeB to communicate with a DSC component (e.g., via the Xe interface), with other eNodeBs (e.g., via an X2 interface), and with various other components (e.g., via the S1 interface). As a further example, the DSAAP component(s) may be configured to allow, facilitate, support, or augment communications between the DSC component and the DPC component so as to allow the DPC and/or DSC components to better pool resources across the different networks, better monitor traffic and resource usage in the various networks, to more efficiently communicate bids and bidding information, to quickly and efficiently register and deregister components, and better perform backoff operations. The DSAAP component(s) may also improve the DSA resource auctioning operations by improving the performance and efficiency of the procedures for bidding, generating invoices, advertizing resources, requesting resources, purchasing resources, validating bid credentials, etc.

In the various embodiments, all or portions of the DSAAP component may be included in one or more DSA components, such as a DPC component, a DSC component, an eNodeB component, an MME component, and an HSS component. The DSAAP component may be implemented in hardware, software, or a combination of hardware and software. In an embodiment, the DSAAP component may be configured to implement a DSAAP protocol, which may be defined over the Xe, Xd, and/or X2 reference points. In various embodiments, the Xe reference point between DSC and eNodeB may use the DSAAP protocol, TR-069 protocol, and/or TR-192 data model extensions to support listing available resources at the eNodeB and notifying the eNodeB of bid/buy confirmations. The Xd reference point between DSC and DPC may use the DSAAP protocol for dynamic spectrum and resource arbitrage operations. The X2 interface/reference point between the eNodeBs may also use the DSAAP protocol to communicate information.

In various embodiments, the DSAAP component(s) may be configured to allow the various DSA components (e.g., DSC, DPC, eNodeB, etc.) to communicate using the DSAAP protocol and/or to perform various DSAAP methods. DSAAP methods may be performed in any of the DSA systems discussed in this application, such as a system that includes a first DSC server in a first telecommunication network (e.g., a lessee network), a second DSC server in second telecommunication network (e.g., a lessor network), and a DPC server that is outside of the first and second telecommunication networks.

Figure 27:
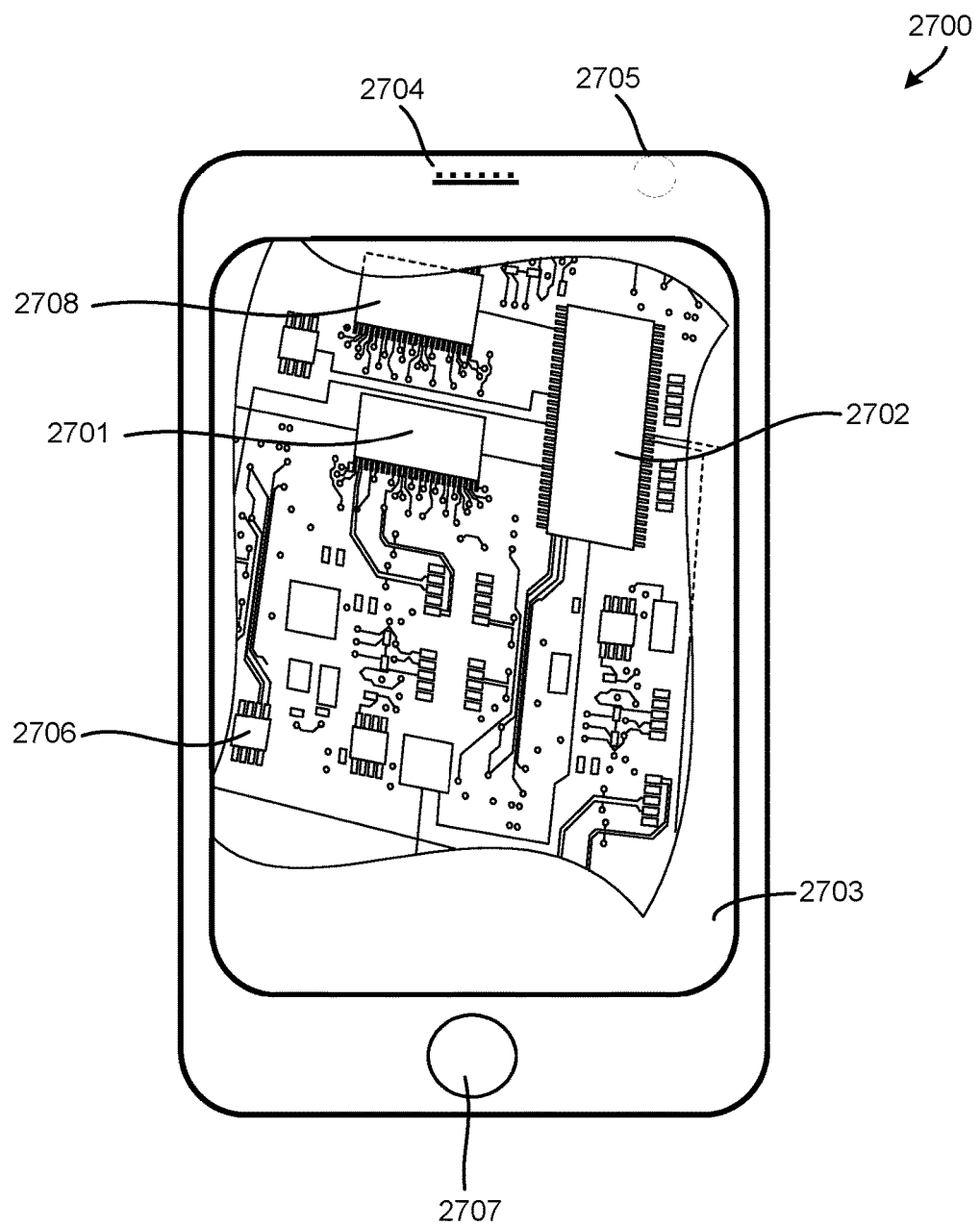
FIG. 27 is a component block diagram of an example wireless device suitable for use with the various embodiments.

The various embodiments may be implemented on a variety of mobile wireless computing devices, an example of which is illustrated in FIG. 27. Specifically, FIG. 27 is a system block diagram of a mobile transceiver device in the form of a smartphone/cell phone 2700 suitable for use with any of the embodiments. The cell phone 2700 may include a processor 2701 coupled to internal memory 2702, a display 2703, and to a speaker 2704. Additionally, the cell phone 2700 may include an antenna 2705 for sending and receiving electromagnetic radiation that may be connected to a wireless data link and/or cellular telephone transceiver 2706 coupled to the processor 2701. Cell phones 2700 typically also include menu selection buttons or rocker switches 2707 for receiving user inputs.

A typical cell phone 2700 also includes a sound encoding/decoding (CODEC) circuit 2708 which digitizes sound received from a microphone into data packets suitable for wireless transmission and decodes received sound data packets to generate analog signals that are provided to the speaker 2704 to generate sound. Also, one or more of the processor 2701, wireless transceiver 2706 and CODEC 2708 may include a digital signal processor (DSP) circuit (not shown separately). The cell phone 2700 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 28:
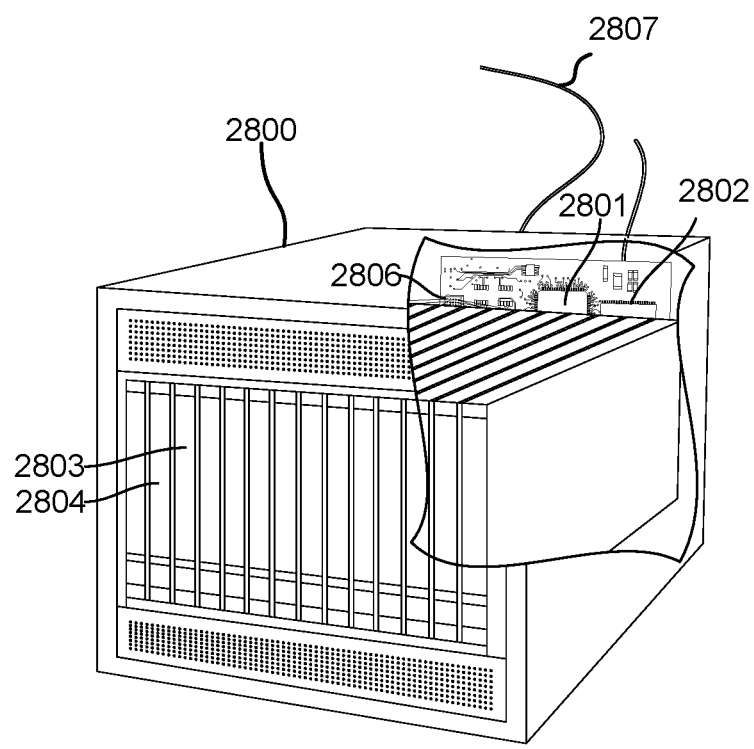
FIG. 28 is a component block diagram of a server suitable for use with an embodiment.

The embodiments described above, including the spectrum arbitrage functions, may be implemented within a broadcast system on any of a variety of commercially available server devices, such as the server 2800 illustrated in FIG. 28. Such a server 2800 typically includes a processor 2801 coupled to volatile memory 2802 and a large capacity nonvolatile memory, such as a disk drive 2803. The server 2800 may also include a floppy disc drive, compact disc (CD) or DVD disc drive 2804 coupled to the processor 2801. The server 2800 may also include network access ports 2806 coupled to the processor 2801 for establishing data connections with a network 2807, such as a local area network coupled to other communication system computers and servers.

The processors 2701, 2801, may be any programmable microprocessor, microcomputer or multiple processor chip or chips that can be configured by software instructions (applications) to perform a variety of functions, including the functions of the various embodiments described below. In some wireless devices, multiple processors 2801 may be provided, such as one processor dedicated to wireless communication functions and one processor dedicated to running other applications. Typically, software applications may be stored in the internal memory 2702, 2802, before they are accessed and loaded into the processor 2701, 2801. The processor 2701, 2801 may include internal memory sufficient to store the application software instructions. In some servers, the processor 2801 may include internal memory sufficient to store the application software instructions. In some receiver devices, the secure memory may be in a separate memory chip coupled to the processor 2701. The internal memory 2702, 2802 may be a volatile or nonvolatile memory, such as flash memory, or a mixture of both. For the purposes of this description, a general reference to memory refers to all memory accessible by the processor 2701, 2801, including internal memory 2702, 2802, removable memory plugged into the device, and memory within the processor 2701, 2801 itself.

A wireless device may be a mobile wireless device or a fixed wireless device. A fixed wireless device may be a fixed infrastructure node (FIN) or fixed infrastructure device (FID), such as a cell tower antenna, an eNodeB, a small cell device, a femtocell or femtocell device, a WiFi access node, or a beacon device, etc.

A waypoint may be an information structure that includes one or more information fields, component vectors, location information, position information, coordinate information, etc. Each waypoint may include coordinate values (e.g., x and y coordinates, latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify the three-dimensional location of a corresponding device (e.g., external or fixed wireless device, etc.). The timestamp may identify the time that the location was determined/captured. The range value may identify a distance between the external device and the wireless device (or any other device that receives or uses the location information). In the various embodiments, a waypoint may be, or may include, a location estimate value, a location fix, a location set, a location position, or any other similar location information suitable for adequately conveying or communicating location information.

In some embodiments, the dynamic spectrum arbitrage (DSA) components, network servers, and/or wireless devices (e.g., fixed or mobile wireless devices) may be configured to compute a precision value that identifies, or which is indicative of, the repeatability factor of the measurements (or location determinations) over multiple measurements. The precision value may be used to determine how often the device reports the same position or location information (i.e., based on evaluating multiple reports indicating that the device has not moved more than X meters, etc.). The number or frequency in which the device reports the same position/location information may be used to determine the precision of its location determination or measurement (e.g., within 1 meter, etc.). The precision value may also be used to determine the likelihood or probability that repeating the computation (e.g., using the same inputs or input sources) will result in substantially the same values. In some embodiments, the precision value may be included as part of a waypoint.

As discussed above, the various embodiments include a DSA system that is configured to dynamically manage the availability, allocation, access, and use of telecommunication resources, such as radio frequency (RF) spectrum and RF spectrum resources. In particular, the DSA system may include various DSA components (e.g., DPC, DSC, eNodeB, etc.) that are configured to allocate or lease-out resources, monitor the usage of the leased resources, and automatically charge accounts for the usage of the leased resources. In some embodiments, the DSA components may manage the allocation, transfer, and/or use of resources based on a geographical area. For example, the DSA components may be configured to perform auction/arbitration operations that result in a successful bidder for a geographical area (which may include two whole networks, a region, cell sites, sectors, sub-sectors, etc.), and allocate resources based on whether a wireless device is located with that geographical area. In addition, the DSA components may be configured account for the mobility of the wireless devices with respect to the available/leased resources in the geographical area, which may be accomplished by dividing a relevant geographical area into subunits, generating a grid-map information structure that identifies these geographical subunits, and using the grid-map data structure to determine whether to allocate, de-allocate, and reallocate resources based on the geographical locations of the wireless devices with respect to the available resources.

As also discussed above (e.g., with reference to FIGS. 18 and 23-26, etc.), an embodiment DSA system may include a plurality of femtocells in a first telecommunication network, an optional home eNodeB gateway (HGW) coupled to each of the plurality of femtocells, a dynamic spectrum controller (DSC) coupled to the HGW if present or to the home eNodeB if HGW is not present, and a dynamic spectrum policy controller (DPC) coupled to the DSC. The plurality of femtocells may include a home eNodeB (HeNB) component that is configured to perform various operations, including operations for determining whether the HeNB has been moved. The HeNB component may monitor network conditions (e.g., network congestion, resource usage, resource availability, etc.), generate and send resource and congestion reports to the home eNodeB gateway (HGW) component, determine whether there is a suitable serving HGW (home eNodeB gateway) in the first telecommunication network, identify all of the serving HGW that are suitable or available for use, establish communication links to one of the identified serving HGWs, and terminate one or more of communication links to the femtocells.

The operations described above may allow the DSA system to better support mobility, better support small cell architectures (femtocell architectures), make better or more informed resource requests, better identify the resources that could be made available for allocation, and better allocate or lease-out the resources to another network, wireless network operator, or mobile virtual network operator (MVNO). As a result, the above-described operations may improve the performance, functioning, efficiency and speed of the DSA system, which in turn, improves the performance, functioning, efficiency and speed of the participating telecommunication network(s).

Further embodiments (e.g., discussed below with reference to FIGS. 29 through 33) may include DSA components that are configured to generate and use highly accurate location information to enable self-realized leases. For example, the various embodiments may include DSA components that are configured to use enhanced location based service (eLBS) techniques to generate precise location based service (LBS) information. The DSA components may then use the LBS information to intelligently and dynamically self-determine whether to participate in a resource auction, resource lease, or other DSA functions/operations. The DSA components may also use the LBS information to intelligently and dynamically allocate or lease-out resources, monitor the usage of the leased resources, and charge the revenant accounts for the usage of the leased resources (e.g., by sending a charging report to an eNode or DSC component for forwarding to a billing system, etc.).

By generating and using highly accurate location based service information that enable the DSA components to self-realize leases (e.g., locally determine whether to allocate or lease-out resources), the embodiments further improve the performance, functioning, efficiency and speed of the DSA system and participating network(s). As an example, a femtocell (a small, low power, and/or portable device that may be configured to provide telecommunication services to wireless devices in relatively small area, etc.) may be configured to determine whether it is included in a lessor network, determine whether it has excess resources (e.g., bandwidth, spectrum, capacity, etc.) to offer for allocation, use eLBS techniques to determine its current location, use eLBS techniques to determine the locations of other wireless devices (fixed or mobile) in a given geographical area and/or within the lessor network, use eLBS techniques to determine the location of a lessee device, determine the terms of the available leases, determine whether a lessee device or network has sufficient credentials, access rights, or credits to access and use its available resources (resources in the lessor network), determine whether the lessee device is in sufficiently close proximity to use its available resources (e.g., excess bandwidth, spectrum, or capacity), determine whether the other wireless devices in the area/network are better funded, better positioned, or better equipped to provide the lessee device with access or use of the same or similar resources, and intelligently determine whether to offer the lessee device access or use of its excess resources. These operations, which may be performed independently and/or by a multitude of individual DSA components, may improve the performance, functioning, efficiency and speed of the DSA system and participating network(s)

It is often important for the DSA system (or its constituent DSA components) to determine the locations of available resources and/or their proximities to the resources or wireless devices. For example, if a DSA component (e.g., DSC or DPC) is not aware of the precise location of a femtocell in a lessor network, it may not be able to offer the telecommunication resources associated with the femtocell for allocation or use by mobile devices that subscribe to a lessee network. Similarly, a DSA component may not be able to instruct a lessee wireless device to commence using an underutilized fixed wireless device in the lessor network unless that DSA component is able determine, with a sufficiently high degree of confidence, that the wireless device is within the effective operating range of the fixed wireless device.

As further examples, the lessor network may not be able to lease out all of its available assets/resources in a geographic region unless it is able to determine the precise locations of all the assets/resources within that geographic region. A lessee network may not be able to adequately utilize the allocated spectrum resources (e.g., resources associated with a fixed wireless device, etc.) of the lessor network if the precise locations of the resources are not known and not readily determinable. It may be difficult or challenging for a DSC component (e.g., DSCs 144*a*, 144*b* discussed above with reference to FIG. 1F) to send information regarding the availability of spectrum resources to a DPC when the precise locations of the fixed wireless devices (e.g., femtocell associated with the available spectrum resources, etc.) are not known and not readily determinable.

Similarly, it may be difficult or challenging for a DPC (e.g., DPC 146 discussed above with reference to FIG. 1F) to allocate, transfer, manage, coordinate, or lease the available resources of a first network (e.g., E-UTRAN 140*a*) for access and use by components in a second network (e.g., E-UTRAN 140*b*) when the precise locations of the fixed wireless devices associated with the available spectrum resources are not known in advance. It may also be difficult or challenging for a DPC to identify and select the most suitable/best available network from which a first network may lease or purchase additional resources if the locations of the resources is not known. It may also be difficult or challenging for a DSC to handover wireless devices 102 from lessee network to lessor network (i.e., perform hand-ins), or to handover wireless devices 102 from lessor network back to lessee network (i.e., perform backoff), when the precise locations of the resources are not known.

Thus, it is important for DSA components to be able to accurately determine and their locations and/or their proximities to other devices. In some embodiments, the DSA components may determine their locations by using a geo-spatial positioning technology, such as GPS. However, there are a number of challenges associated with using geo-spatial positioning technologies, and it may be difficult or inefficient for the DSA components to ascertain the locations of all the resources (e.g., fixed wireless devices, etc.) in the network with a sufficiently high degree of accuracy and precision at all times via existing geo-spatial positioning technologies.

One of the challenges associated with using geo-spatial positioning technologies is that a device's ability to acquire satellite signals and navigation data to calculate its geospatial location (called "performing a fix") may be hindered when the device is indoors, below grade, and/or when the satellites are obstructed (e.g., by tall buildings, etc.). Another challenge associated with using geo-spatial positioning technology on or with a DSA component is that the presence of physical obstacles, such as metal beams or walls, may cause multipath interference and signal degradation of the wireless communication signals when the device/component is indoors or in urban environments that include tall buildings or skyscrapers. Similarly, in rural environments, the device/component may not have sufficient access to satellite communications (e.g., to a global positioning system satellite) to effectively ascertain and broadcast its current location. Yet another challenge associated with using geo-spatial positioning technology on or with a DSA component is that position information (e.g., Lon, Lat and Alt values) generated by existing technologies are often not sufficiently accurate or precise so that they may be used in a public safety network (e.g., a network dedicated to one or more of police, fire, emergency medical service or government agencies) or for emergency services (e.g., emergency location based services, etc.). The various embodiments include improved location determination solutions that overcome the above-described limitations of existing solutions and/or overcome the challenges associated with using geo-spatial positioning technologies.

The various embodiments include DSA components that are configured to overcome the above-described limitations of existing or conventional solutions.

In some embodiments, the DSA components may be configured determine the precise locations of various fixed and mobile wireless devices so that the lessor network may better or more efficiently lease out its available assets/resources, and so that the lessee network may better and more efficiently utilize leased spectrum resources of the lessor network.

In some embodiments, DSA components may be configured to determine the precise locations of the fixed and mobile wireless devices in GPS stressed environments and/or without the relying entirely on the use of geo-spatial positioning technologies.

In some embodiments, the DSA components may be configured to determine the location of a fixed or mobile wireless device at a level of position accuracy and/or with a sufficiently high degree of confidence so that the determined location (or generated location information) may be used in (or used by) public safety networks and/or for emergency services.

In some embodiments, the DSA components may be configured to use eLBS techniques to generate LBS information, and use the LBS information to enable self-realized telecommunication resources leases that improve the performance, functioning, efficiency and speed of the DSA system and telecommunication network.

In some embodiments, the DSA components may be configured to identify, locate and select all the fixed wireless devices (or FINs, FIDs, etc.) within a defined lease area for leasing of resources (e.g., wireless telecom spectrum and capacity associated with the fixed wireless devices, etc.) via the above described DSA operations.

In some embodiments, the DSA components may be configured to determine the precise locations of fixed wireless devices within a geographical area, such as an area defined in a bid area, a lease area, a grid area, or via a grid-map information structure that identifies telecommunication cells and resources in a specific geographical area. The "grid area" and "lease area" may be information structures that define a custom polygon or a partial economic area (e.g., with highly defined latitude and longitude coordinates) marking a two-dimensional geographical area. The grid/lease area may also include an altitude value, making the grid or lease area a three-dimensional area.

In some embodiments, the grid area and/or the lease area may include, may be included in, or may be a grid-map structure. In an embodiment, the DSA components may be configured to generate or update the grid-map structure based on information received from the wireless devices attached to the resources of the lessee or lessor networks. In an embodiment, the DSA components may be configured to generate or update the grid-map structure based on location information received from the fixed wireless devices. In an embodiment, the DSA components may be configured to generate the grid-map structure that includes/stores information suitable for identifying various cells/sectors and their respected coverage zones. For example, the grid-map structure may identify the cells/sectors that are in geographical area purchased or won by a lessee network as part of the DSA operations. The grid-map structure may classify each of the cells/sectors as interior or border cells. The grid-map structure may further classify the interior cells/sectors into layers, zones, or tiers based on their proximity to the border cells.

In some embodiments, the DSA components may be configured to use the locations and movements of the wireless devices with respect to the cells/sectors to determine whether to initiate intra-network and/or inter-network handover operations (i.e. to handover the device from the lessee network to the lessor network, or vice versa). The inter-network handover operations may include handin operations, backoff operations, and move-back operations.

In some embodiments, the DSA components may be configured to implement or use self-organizing network (SON) techniques and technologies. SON is an automation technology designed to improve the planning, configuration, management, optimization and healing of mobile radio access networks. The LTE specifications inherently support various SON features, such as Automatic Neighbor Relation (ANR) detection. As such LTE networks make extensive use of SON features. SON technologies have also been retro-fitted for use with older radio access technologies, such as UMTS. Therefore, the use of SON technologies is not limited to LTE networks, and nothing in the claims should be limited to a specific network technology unless expressly recited as such in the claims. Further, using SON technologies, newly added network components and resources may self-configure themselves (e.g., in line with a "plug-and-play" paradigm). Operational components/resources may regularly self-optimize their parameters, operations and behaviors (e.g., in response to observed network performance, radio conditions, etc.). In addition, the network component may trigger self-healing mechanisms in order to temporarily compensate for a detected equipment outage (e.g., while awaiting a more permanent solution).

In some embodiments, the DSA components may be configured to implement or use eLBS techniques to generate LBS information that may be used to further enable or improve the SON features discussed above and/or to enable or improve any or all of the SON techniques and technologies known in the art. In some embodiments, the DSA components may be configured to use eLBS techniques in conjunction with the available SON features (e.g., of an LTE network participating in the DSA) to automatically self-configure, self-organize, and/or self-optimize their operations, including any or all of the above-described DSA operations for allocating, transferring, managing, coordinating, or leasing the available resources of a first network (e.g., an LTE network, E-UTRAN 140*a*, etc.) for access and use by components in a second network. In some embodiments, the DSA components may be configured to self-configure, self-organize, and/or self-optimize their operations without manual intervention or input.

By using a combination of SON and eLBS techniques to determine the precise locations of the fixed and mobile wireless devices in a given network or in a geographical area, the DSA components may self-configure, self-organize, and/or self-optimize their operations. Further, by self-configuring, self-organizing, and/or self-optimizing their operations, the embodiment DSA components may generate, use, or otherwise accomplish a self-realized lease that improves the operations of allocating, transferring, managing, coordinating, or leasing the available resources of a first network for access and use by components in a second network. These operations improve the performance, functioning, efficiency and speed of the DSA system and telecommunication network The architecture for accomplishing a self-realized lease with eLBS for wireless device could be a centralized architecture, distributed architecture or hybrid architecture.

In the various embodiments, a DSC component may be configured to establish communication links to a plurality of fixed wireless devices (e.g., femtocells and/or other fixed infrastructure devices, etc.). The fixed wireless devices may include communication links to an OAM component. The OAM component may be, or may include, a SON entity, module, or component. The OAM component (or SON entity) may include communication links to one or more DSCs. The OAM component may communicate with the DSC for lease management.

In a centralized network architecture, the OAM may have complete knowledge of the entire network and its components. The DSC may communicate with the OAM to obtain location and lease management information, perform various operations for lease management (e.g., to control the allocation and use of resources in accordance with a resource lease, etc.), generate lease management information, and/or send lease management information to the fixed wireless devices (e.g., femtocells, eNodeBs, etc.) in order to manage or control the allocation and use of resources.

In a distributed architecture and/or a hybrid architecture, each fixed wireless device (e.g., eNodeBs, etc.) could be equipped with an eLBS component or module that is configured to determine the precise location of its corresponding fixed wireless device. As such, each fixed wireless device may be aware of its precise location and position, including its current latitude, longitude, and altitude. The fixed wireless devices could also use their SON features or capabilities to determine their relative locations, and intelligently determine whether they should be included in, or excluded from, a telecommunication resource lease.

With the distributed or hybrid configuration, the self-realized lease information can be provided by the OAM or a combination of both DSC, OAM/SON, or eNodeB to eNodeB. A wireless device or FID equipped with the ability to determine its geographic location within a LTE network can utilize SON functions to determine the active leases in its area. This is useful in scenarios where a fixed wireless device is added to the network.

Additionally, when a fixed wireless device is brought up after its maintenance window, and a lease has been configured during that window, the determination of the FID's involvement or noninvolvement with the lease is critical. This assumes the wireless device will be equipped with a GIS module along with the eLBS module needed to determine its location.

Though the current discussion focuses on eNodeBs and LTE SON architecture, the concept can be extended to other FIDs with similar capabilities and applicable network architectures.

SON using eLBS for FID may be implemented in a network using several configurations. Three of the possible configurations involve a centralized, distributed and hybrid SON using eLBS. In a centralized SON architecture, OAM stores the configuration information of all the leases in the area. As soon as an eNodeB comes up, it downloads this information from OAM or the DSC. Once it determines its eLBS location using its eLBS module and the devices around it with the help of trilateration, it enables the GIS module to cull the applicable leases from the list downloaded from OAM/DSC. All the leases whose geographical area overlaps with the current eNodeB's location information shall be considered applicable. This eNodeB can also have configuration indicating whether it needs to act as lessor or lessee or both and based on this configuration, it can further filter the leases. Once the applicable leases are determined, it either self-configures them as shown in FIG. 29 or reports the filtered leases to OAM/DSC for further decisions or actions by administrators on the eNodeB as shown in FIG. 30.

Figure 29:
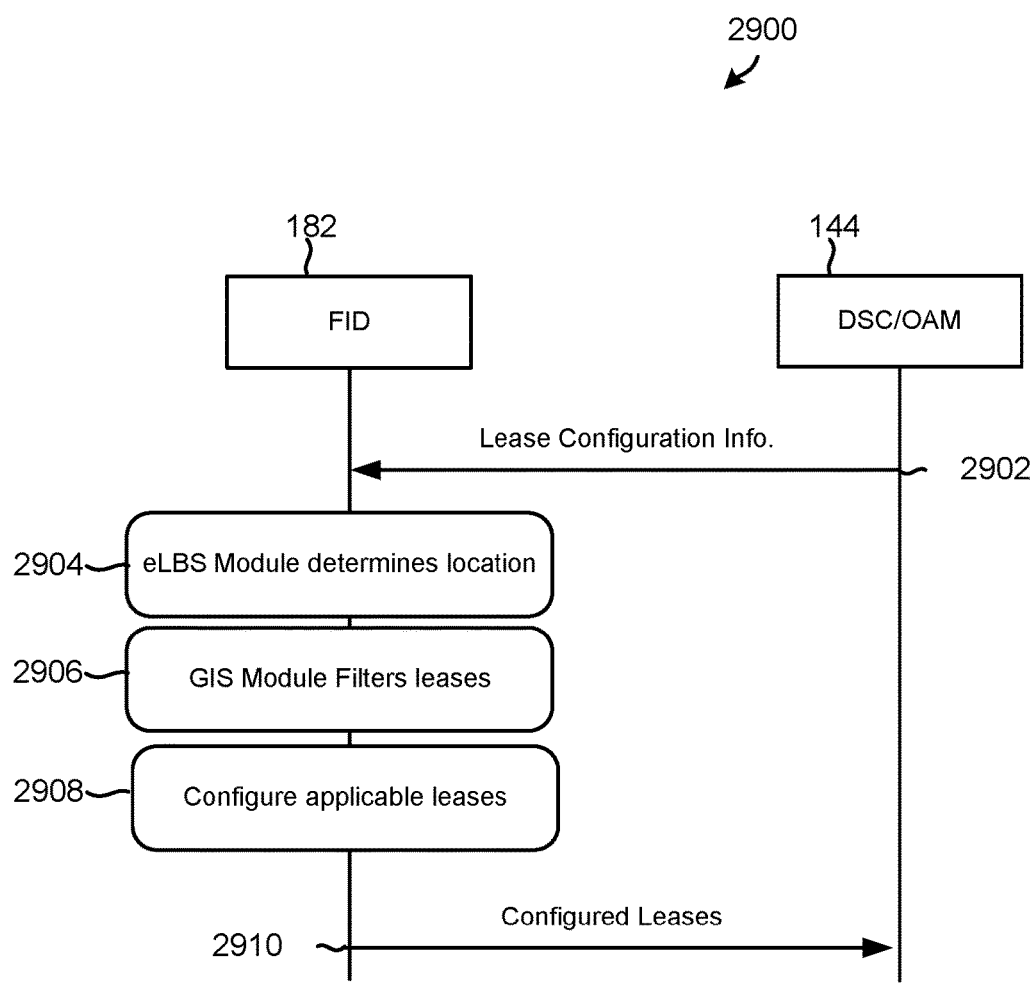
FIGS. 29 through 34 are process flow diagrams illustrating methods for self-realizing or self-participating in a telecommunication resource lease in accordance with the various embodiments.
Figure 30:
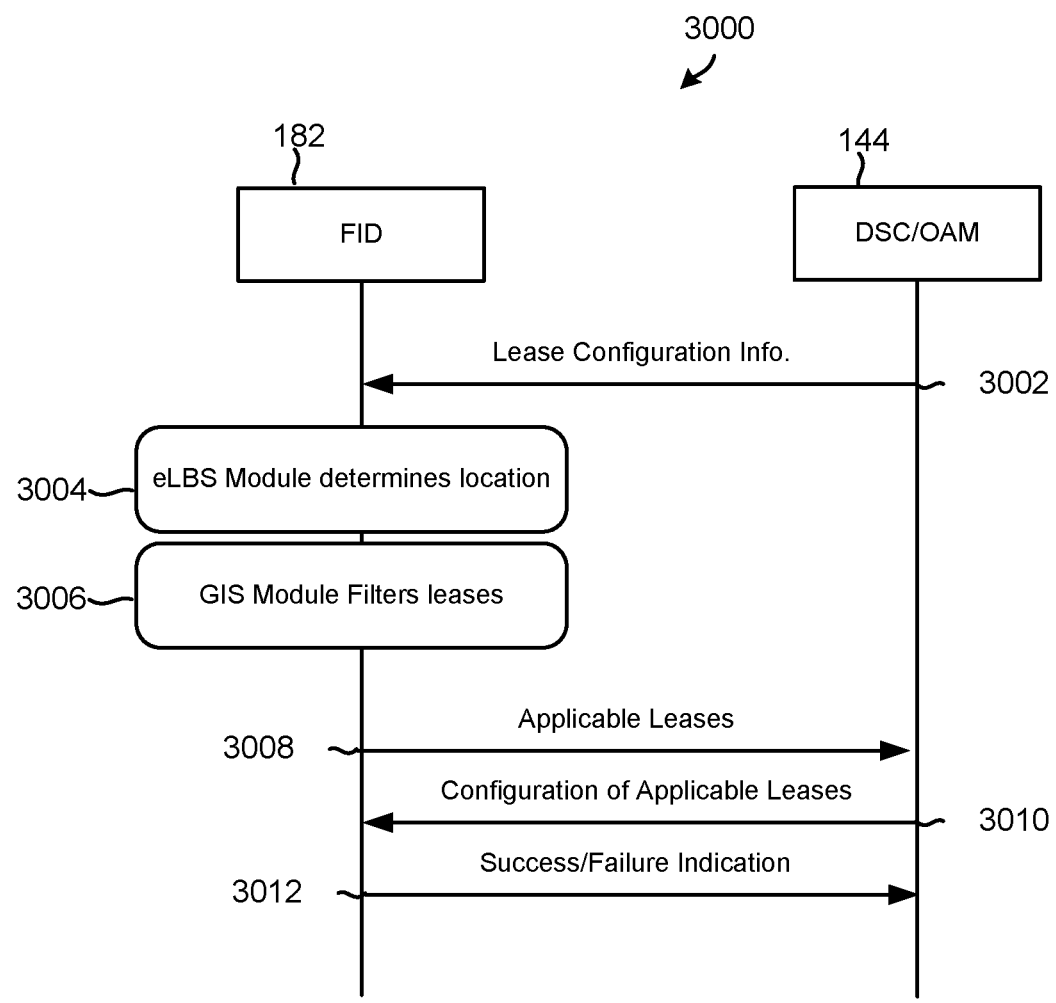

FIG. 29 illustrates a self-configuration method 2900 for configuring a fixed wireless device (e.g., FID 182) with appropriate leases in accordance with an embodiment. In the example illustrated in FIG. 29, method 2900 is performed by processing cores in a DSC/OAM 144 component and/or a FID 182 component.

In operation block 2902, a processor of the DSC/OAM 144 may deliver lease configuration information to the FID 182. In operation block 2904, a processor (and/or an eLBS module) of FID 182 may compute, generate or determine a waypoint or location value for FID 182. The location value may include, for example, latitude, longitude and/or altitude information corresponding to the location of FID 182. In an embodiment, the waypoint or location value may include eLBS information. In an embodiment, the processor may use SON and/or eLBS techniques to determine its precise location within the network or geographical area in block 2904, and generate the location value or waypoint based on this information.

In operation blocks 2906 and 2908, processor in the FID may self-configure one or more DSA leases. In the illustrated example, in operation block 2906, the processor (and/or a GIS module) may filter the received lease configuration information based on the generated location value (e.g., eLBS information generated by the eLBS module, etc.) and identify applicable leases. In operation block 2908, the FID 182 may self-configure the identified lease based on applicable leases identified by the GIS module. In operation block 2910, FID 182 may inform DSC/OAM 144 of the self-configured leases.

FIG. 30 illustrates a FID self-configuration method 3000 for configuring a FID with appropriate leases in accordance with an embodiment. Method 3000 may be performed by processing cores in a DSC/OAM 144 component and/or a FID 182 component.

In operation block 3002, a processor in a DSC/OAM 144 may deliver lease configuration information to FID 182. In operation block 3004, an eLBS module of FID 182 may determine a location for FID 182. Such location includes, for example, latitude, longitude and/or altitude information corresponding to the location of FID 182. In operation block 3006, a GIS module filters, based on the location of FID 182 determined by the eLBS module, the lease configuration information provided by DSC/OAM 144 to identify applicable leases. FID 182, in operation block 3008, informs DSC/OAM 144 of the identified applicable leases. DSC/OAM 144, in operation block 3010, provides configuration information for the identified applicable leases to FID 182. FID 182 self-configures based on the provided configuration information for the identified applicable leases and, in operation block 3012, provides an indication of success and/or failure to DSC/OAM 144.

In a distributed SON architecture, either the newly deployed eNodeB can request other eNodeBs with which it established X2 connections to share their lease information or the existing eNodeBs can proactively share their lease information during X2 setup procedure. Once the eNodeB receives the lease configuration information, it then triggers the GIS module to determine whether the lease(s) are applicable to it based on its eLBS location. The list can be further filtered based on the lessee/lessor configuration, if any available.

Figure 31:
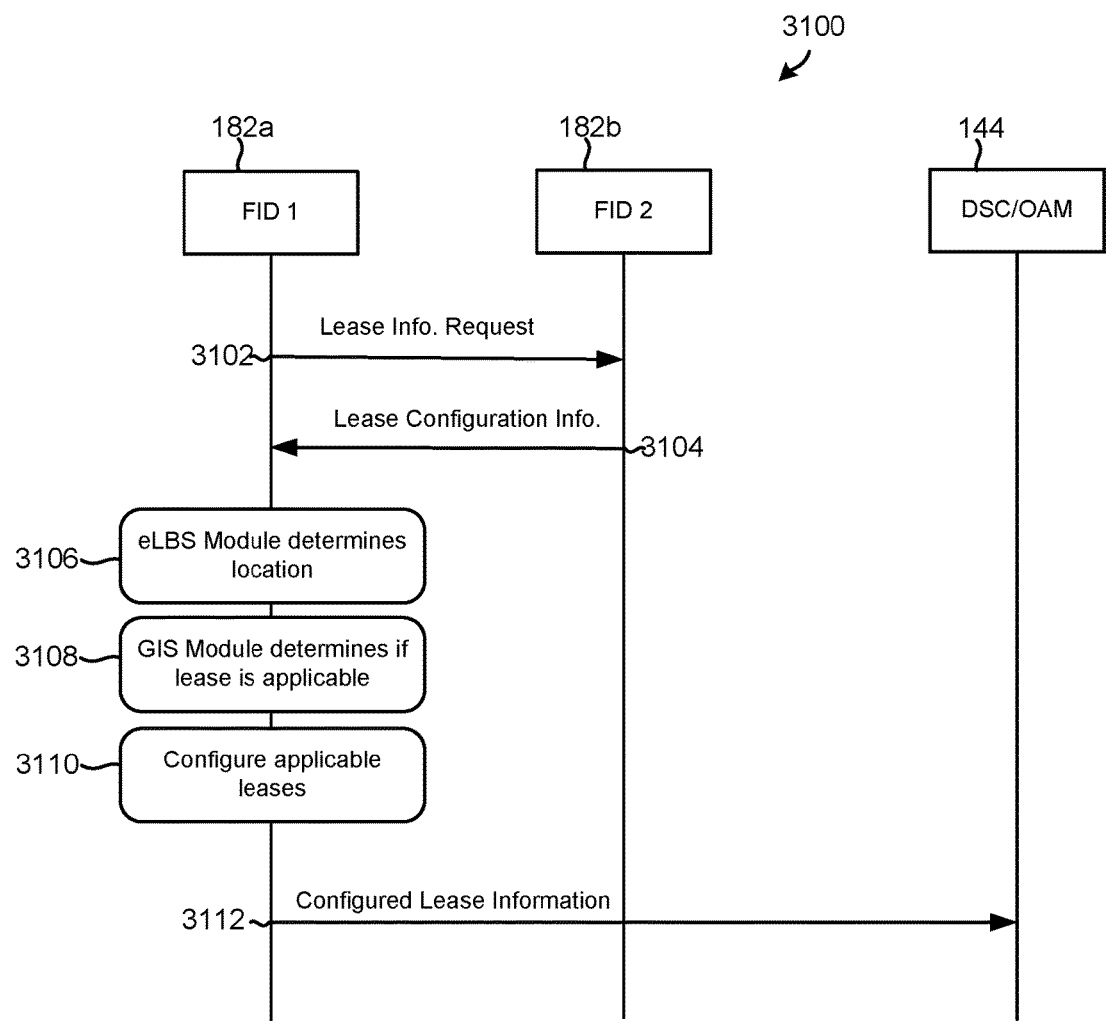

FIG. 31 shows an example of the information flow between a plurality of FIDs once a FID becomes part of the network in a distributed or hybrid architecture. Specifically, in FIG. 31, the FID 2 is already part of the network and is aware of which leases it is involved with. Once FID 1 identifies itself with the network, it can obtain lease information from FID 2. The use of having lease information provided by FID 2 can involve improvements in the FID's location using eLBS for FID and determine which lease it may be included.

More specifically, FIG. 31 illustrates a FID self-configuration method 3100 for configuring a FID with appropriate leases in accordance with an embodiment. In the example illustrated in FIG. 31, method 3100 is performed by processing cores in a DSC/OAM 144 component and FID 182a, 182b components.

In operation block 3102, FID 1 182a requests lease information from a neighboring FID, such as FID 2 182b. In operation block 3104, FID 2 182b delivers lease configuration information to FID 1 182a. In operation block 3106, an eLBS module of FID 1 182a determines a location for FID 1 182a. Such location includes, for example, latitude, longitude and/or altitude information corresponding to the location of FID 1 182a. In operation block 3108, a GIS module filters, based on the location of FID 1 182a determined by the eLBS module, the lease configuration information provided by FID 2 182b to identify application leases. FID 1 182a, in operation block 3110, completes self-configuration based on applicable leases identified by the GIS module. In operation block 3112, FID 1 182a informs DSC/OAM 144 of those applicable leases self-configured by FID 1 182a.

Figure 32:
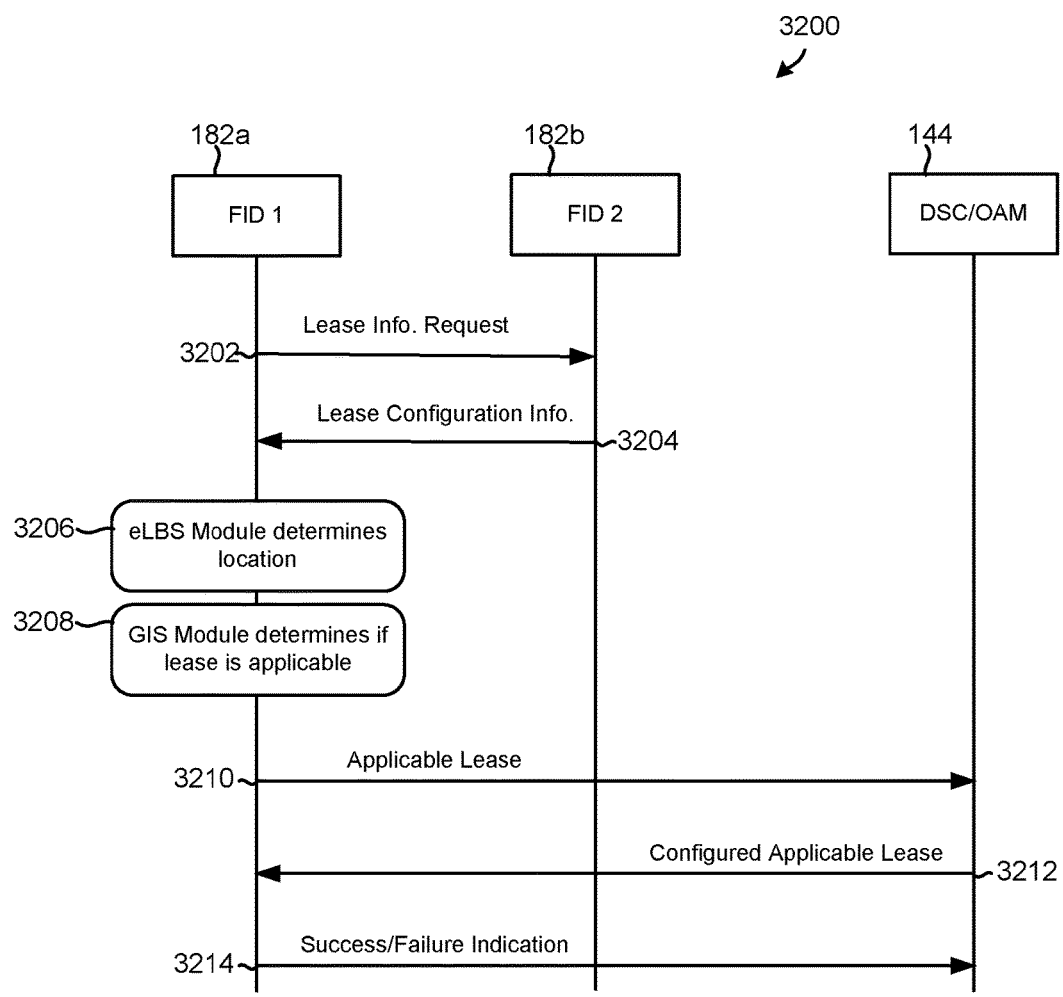

FIG. 32 is an expansion of FIG. 31 where the FID self-configures to be part of lease(s) as shown in FIG. 31 or shares the info with configuring entity as shown in FIG. 32. The use of having lease information provided by FID 2 can involve improvements in the FIDs location using eLBS for FID and determine which lease it may be included with and if it is allowed to begin transmitting if there are spectrum encumbrances like those imposed on CBSD.

FIG. 32 illustrates a FID self-configuration method 3200 for configuring a FID with appropriate leases in accordance with an embodiment. In the example illustrated in FIG. 32, method 3200 is performed by processing cores in a DSC/OAM 144 component and FID 182a, 182b components.

In operation block 3202, FID 1 182a requests lease information from a neighboring FID, such as FID 2 182b. In operation block 3204, FID 2 182b delivers lease configuration information to FID 1 182a. In operation block 3206, an eLBS module of FID 1 182a determines a location for FID 1 182a. Such location includes, for example, latitude, longitude and/or altitude information corresponding to the location of FID 1 182a. In operation block 3208, a GIS module filters, based on the location of FID 1 182a determined by the eLBS module, the lease configuration information provided by FID 2 182b to identify applicable leases. FID 1 182a, in operation block 3210, informs DSC/OAM 144 of the identified applicable leases. DSC/OAM 144, in operation block 3212, provides configuration information for the identified applicable leases to FID 1 182a. FID 1 182a self-configures based on the provided configuration information for the identified applicable leases and, in operation block 3214, provides an indication of success and/or failure to DSC/OAM 144.

In a hybrid SON architecture, each eNodeB or FID can follow either a centralized SON approach, as described above in relation to FIGS. 29-30, or a distributed SON approach, as described above in relation to FIGS. 31-32. In LTE, the eNodeB can download configuration information from a DSC/OAM or request the configuration information from other eNodeBs with which it established X2 connections. The eNodeB can then come up with the leases that are applicable to it based on its eLBS location. Once applicable leases are determined, it can either self-configure or report the leases to the configuring entity in the network as shown above.

DSA in many instances has a LTE network leasing some of its capacity or spectrum to another wireless network operator or mobile virtual network operator (MVNO). DSA may also be used for leasing spectrum or providing a more robust command and control scheme than reliance on a database that is self-policed.

Further embodiments may include methods, and computing devices configured to implement the methods, for determining a more precise location of a wireless device and providing an enhanced location based service (eLBS). A processor in a wireless device may be configured to determine an approximate location of the wireless device, receive location information from a wireless device, and determine a more precise location of the wireless device based on the approximate location and the location information received from the wireless device.

Figure 33:
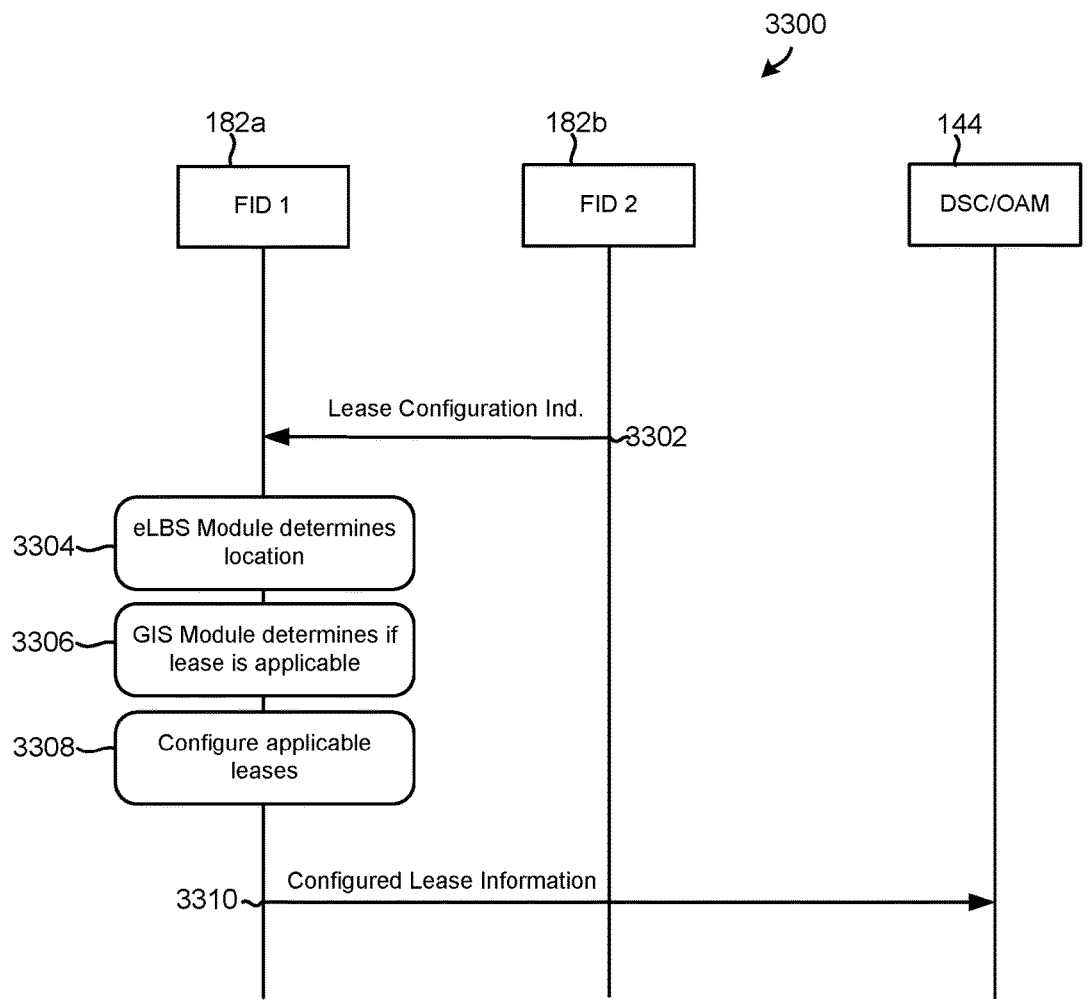

FIG. 33 shows an example of the information flow between a plurality of FIDs once a FID becomes part of the network in a distributed or hybrid architecture. Specifically, in FIG. 33, the FID 2 is already part of the network and is aware of which leases it is involved with. Once FID 1 identifies itself with the network, FID2 can share the lease information with FID 1. The use of having lease information provided by FID 2 can involve improvements in the FID's location using eLBS for FID and determine which lease it may be included.

More specifically, FIG. 33 illustrates a FID self-configuration method 3300 for configuring a FID with appropriate leases in accordance with an embodiment. In the example illustrated in FIG. 33, method 3300 is performed by processing cores in a DSC/OAM 144 component and FID 182a, 182b components.

In operation block 3302, FID 2 182b indicates the lease information to FID 1 182a. In operation block 3304, an eLBS module of FID 1 182a determines a location for FID 1 182a. Such location includes, for example, latitude, longitude and/or altitude information corresponding to the location of FID 1 182a. In operation block 3306, a GIS module filters, based on the location of FID 1 182a determined by the eLBS module, the lease configuration information provided by FID 2 182b to identify application leases. FID 1 182a, in operation block 3308, completes self-configuration based on applicable leases identified by the GIS module. In operation block 3310, FID 1 182a informs DSC/OAM 144 of those applicable leases self-configured by FID 1 182a.

Figure 34:
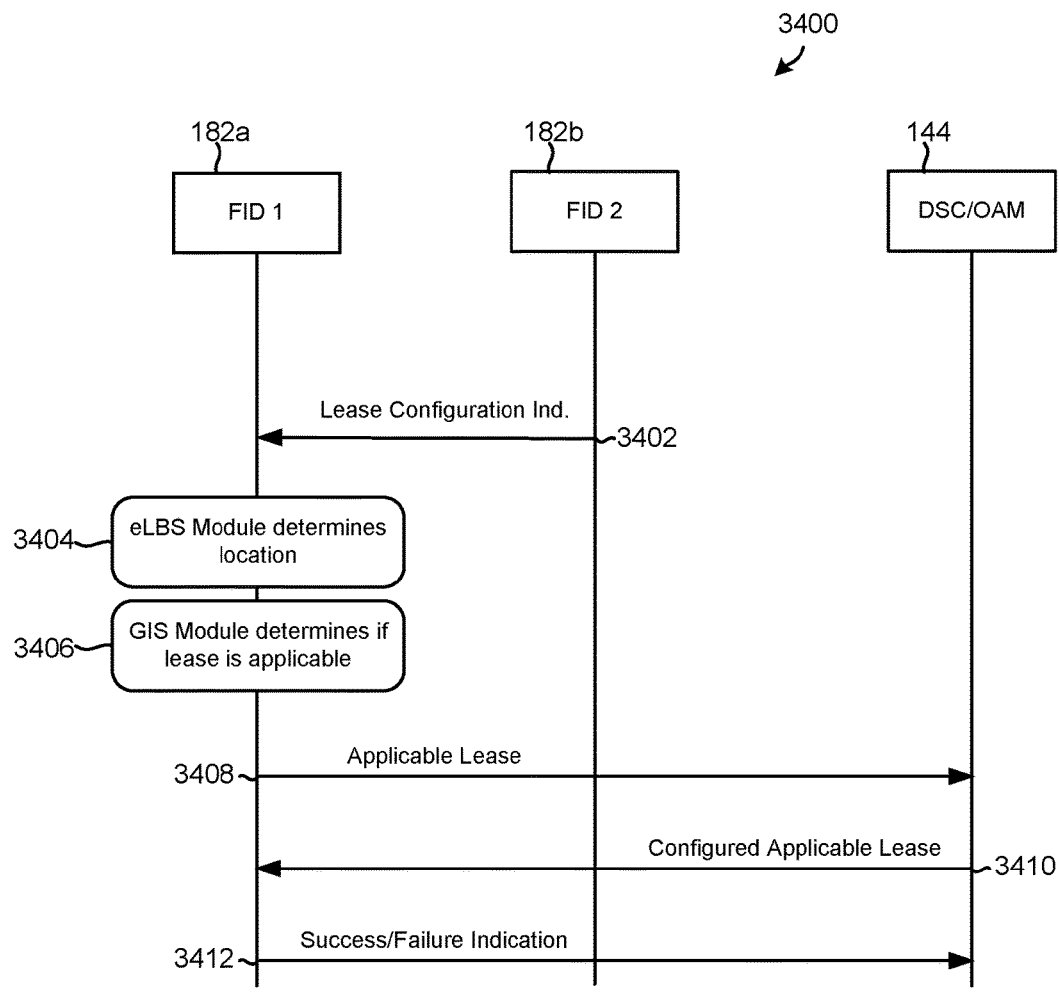

FIG. 34 is an expansion of FIG. 33 where the FID self-configures to be part of lease(s) as shown in FIG. 33 or shares the info with configuring entity as shown in FIG. 34. The use of having lease information provided by FID 2 can involve improvements in the FIDs location using eLBS for FID and determine which lease it may be included with and if it is allowed to begin transmitting if there are spectrum encumbrances like those imposed on CBSD.

FIG. 34 illustrates a FID self-configuration method 3400 for configuring a FID with appropriate leases in accordance with an embodiment. In the example illustrated in FIG. 34, method 3400 is performed by processing cores in a DSC/OAM 144 component and FID 182a, 182b components.

In operation block 3402, FID 2 182b indicates the lease information to FID 1 182a. In operation block 3404, an eLBS module of FID 1 182a determines a location for FID 1 182a. Such location includes, for example, latitude, longitude and/or altitude information corresponding to the location of FID 1 182a. In operation block 3406, a GIS module filters, based on the location of FID 1 182a determined by the eLBS module, the lease configuration information provided by FID 2 182b to identify applicable leases. FID 1 182a, in operation block 3408, informs DSC/OAM 144 of the identified applicable leases. DSC/OAM 144, in operation block 3410, provides configuration information for the identified applicable leases to FID 1 182a. FID 1 182a self-configures based on the provided configuration information for the identified applicable leases and, in operation block 3412, provides an indication of success and/or failure to DSC/OAM 144.

Figure 35:
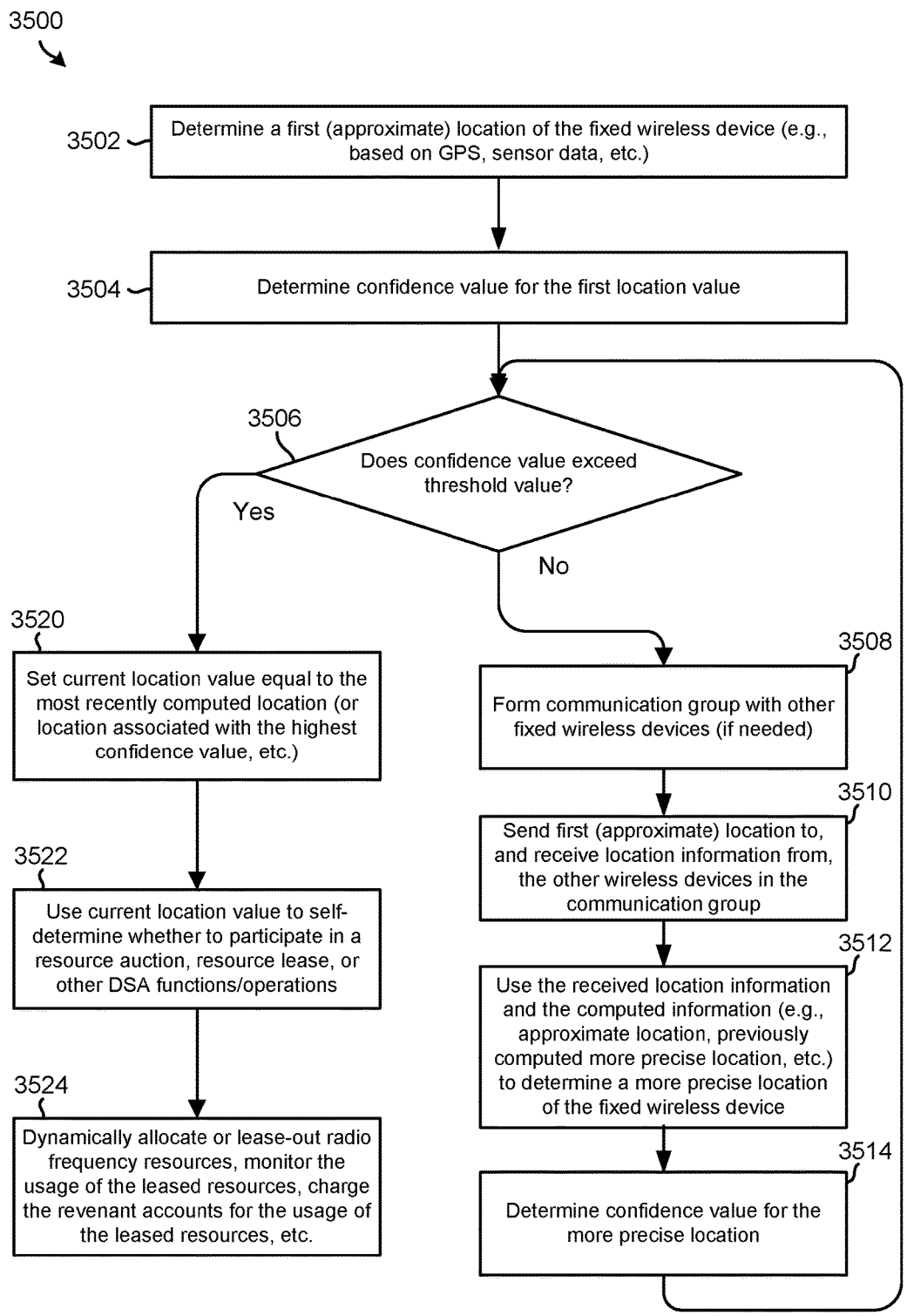
FIG. 35 is a process flow diagram illustrating a method of determining a more precise location of a wireless device and providing an eLBS in accordance with an embodiment.

FIG. 35 illustrates a method 3500 of using eLBS information to enable self-realizing of a lease in accordance with an embodiment. In block 3502, a processor in a fixed wireless device may determine a first (approximate) location of the fixed wireless device (e.g., based on GPS, sensor data, etc.). In block 3504, the processor may determine a confidence value for the first (approximate) location value. In determination block 3506, the processor may determine whether the generated or determined confidence value exceeds a threshold value (e.g., an accuracy threshold, a confidence threshold, etc.).

In response to determining that the confidence value does not exceed the threshold value (i.e., determination block 3506="No"), in block 3508, the processor may form communication group with other wireless devices (if needed). In block 3510, the processor may send first (approximate) location to, and receive location information from, the other wireless devices in the communication group. In block 3512, the processor may use the received location information and the computed information (e.g., approximate location, previously computed more precise location, etc.) to determine a more precise location of the fixed wireless device. In block 3514, the processor may determine a new or updated confidence value for the more precise location. The processor may perform the operations in blocks 3506 through 3514 continuously or repeatedly until the desired level of accuracy is reached or until confidence value exceeds the threshold value.

In response to determining that the confidence value exceeds the threshold value (i.e., determination block 3506="Yes"), in block 3520, the processor may set current location value equal to the most recently computed location (or location associated with the highest confidence value, etc.). In block 3522, the processor may use current location value to self-determine whether to participate in a resource auction, resource lease, or other DSA functions/operations. In block 3524, the processor may dynamically allocate or lease-out radio frequency resources, monitor the usage of the leased resources, charge the revenant accounts for the usage of the leased resources, and perform other similar DSA operations to self-realize of telecommunication resource lease negotiated by the DSA system.

In an embodiment, using eLBS techniques (or the eLBS operations) may include a processor in the fixed wireless device collecting or receiving location information in the form of waypoints from a plurality of other devices. For example, the wireless device may receive a first waypoint from a first external device, a second waypoint from a second external device, a third waypoint from a third external device, and a fourth waypoint from a forth external device. The wireless device may use any combination of these received waypoints (e.g., first through fourth waypoints) in conjunction with stored and historical information (e.g., previously computed waypoints, movement information, etc.) to determine or compute its approximate and/or more precise location with a high degree of accuracy. In some embodiments, the wireless device may be configured to apply the received waypoints to Kalman filter (e.g., for processing via a Kalman filter component, etc.) in order to generate more accurate location information (e.g., a final location waypoint).

In some embodiments, the fixed wireless device may be coupled to a sensor hub, context hub, or a sensor network. The wireless device may be configured to perform advanced sensor fusion operations to generate location information (e.g., a location estimate set/value, waypoint, etc.), use a differential $RMS^2$ method (or any other method known in the art) compute confidence values, and compare the computed confidence values to one or more threshold values to determine whether there is a sufficiently high degree of confidence in the accuracy of the generated location information (e.g., location estimate set/value, final location waypoint, etc.). In some embodiments, the wireless device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the fixed wireless device may be configured to perform normalization operations to normalize/synchronize the timing of the received location information (the "location information timing"). In some embodiments, this may be accomplished via a timing component or mechanism (a timer, system clock, processor cycles, etc.) in the device. The wireless device may use a common time value (or common timer, reference clock, etc.) to synchronize and/or coordinate the information included in the received waypoints. The wireless device may generate normalized waypoints that include normalized values and/or which are normalized, synchronized and/or updated to account for various delays and inconsistencies, including the propagation delay between the wireless device and the corresponding external device, the time difference between when the waypoint was captured in external device and when the waypoint received in the wireless device, the relative movements of the devices, communication pathway time delays, delays associated with processing the requests, etc.

In some embodiments, the fixed wireless device may be configured to associate or assign a time value to each normalized waypoint (e.g., by storing the waypoint relative to the time value in a map or table, etc.), and determine whether each normalized waypoint is valid. For example, wireless device may determine whether the time value associated is within a valid duration or whether the waypoint includes sufficiently accurate information (e.g., by determining whether a precision or confidence value associated with the waypoint exceeds a threshold value, etc.). In response to determining that a waypoint is valid, the wireless device may determine or compute one or more rankings for that waypoint, and associate and/or assign the rankings to the waypoint (by storing it as a field. In some embodiments, the wireless device may determine and assign an overall rank and a device-specific rank to each valid waypoint, and store the waypoints in memory (e.g., in a location database, etc.).

In some embodiments, the fixed wireless device may be configured to determine the number of stored waypoints that are suitable for use in determining the device's current location. For example, the wireless device may determine whether the memory stores four or more valid waypoints, whether the stored waypoints are associated with sufficiently high rankings, whether the stored waypoints identify four or more independent locations, whether the stored waypoints identify the locations of four or more external devices relative to the current location of the wireless device with a sufficiently high level of accuracy, etc. In response to determining that there are four or more suitable waypoints stored in memory, the wireless device may intelligently select the four most suitable waypoints (e.g., waypoints having the highest overall rank and/or device-specific rank, etc.), apply the selected waypoints as inputs to a kalman filter, and use the output of the kalman filter to generate location information that identifies the wireless device's current location with a high level of accuracy (e.g., within one meter in all directions, etc.).

Further embodiments may include a fixed wireless device (e.g., a femtocell device, a beacon device, etc.) that is configured to receive or obtain information from an internal or external geospatial system (e.g., an internal GPS receiver, etc.), and determine whether the information obtained via the geospatial system is sufficiently accurate (or whether it is able to determine its current location with a sufficiently high degree of precision, accuracy, or confidence based on the geospatial information).

In some embodiments, in response to determining that it is not able to establish a location fix (i.e., determine its current location with a sufficiently high degree of precision, accuracy, or confidence), the fixed wireless device may establish a communication group with other devices that are within proximity of the FWD (e.g., within 1 meter, 10 meters, 100 meters, or 1 KM of the device, etc.).

In some embodiments, in response to establishing the communication group and determining that it is unable to adequately establish a location fix based on the obtained geospatial information, the fixed wireless device (FWD) may begin collecting location information from the other devices in its communication group. For example, the FWD may request and receive GPS timing information from a mobile wireless device (MWD) or a second FWD (e.g., a cell tower antenna, an eNodeB, a small cell device, a femto cell device, a WiFi access node, or a beacon device, etc.) that is within 100 meters of the FWD.

The FWD may use any combination of the received, generated or collected location information (e.g., location fix, current location waypoint, GPS timing information, etc.) to compute a new three-dimensional location value. In some embodiments, computing the new three-dimensional location value may include generating a waypoint that includes a latitude value, a longitude value, and an altitude value. The FWD may use the computed three-dimensional location value to provide a location based service (e.g., emergency location service), to better or more accurately allocate telecommunication resources (e.g., as part of the dynamic spectrum allocation operations discussed above with reference to FIGS. 1F, 2A, 2B, 3, 4, 5, 6, 7, 18 and 24-26), to participate in the DSA operations, or to self-actuate, self-execute, self-engage, or self-participate in telecommunication resource lease.

Further embodiments may include methods of performing trilaterion operations for fixed wireless device using enhanced location based positions (location information such as the computed more precise location, final location waypoint, etc.) with wireless devices. A further embodiment may include the fixed wireless device determining the latitude, longitude and altitude of a eNodeB, micro cell, pico cell, small cell, beacon, access point or another wireless device in a GPS stressed environment.

Further embodiments may include components (e.g., DSA network components, fixed wireless devices, mobile devices, etc.) that are configured to use location determination solutions and techniques, such as an enhanced location based service (eLBS) solution, to accurately and efficiently identify and locate telecommunication resources in GPS stressed environments (e.g., as part of the DSA operations). The components may be further configured to use the location information to self-actuate, self-execute, self-engage, and/or self-participate in the DSA operations or telecommunication resource leases, even when then are located in a GPS stressed environment or otherwise unable to acquire satellite signals or navigation data.

In some embodiments, the fixed wireless device may be a DSA component that is included in a telecommunication network (e.g., lessor network, lessee network, etc.) that is participating in a resource auction or dynamic spectrum arbitrage. The fixed wireless device may be a fixed infrastructure device (FID), such as a femtocell, cell tower antenna, an eNodeB, a small cell device, a WiFi access node, a beacon device, citizen band service device (CBSD), etc. The approximate location may be a first waypoint having first precision value, and the more precise location may be a second waypoint having a second precision value that is greater than the first precision value.

In some embodiments, a self-realized lease may be an information structure or information unit that may be used to by a wireless device to determine its availability for inclusion in a lease (e.g., telecommunication resource lease, resource allocation agreement, etc.). For example, a self-realized lease may include location information (e.g., latitude, longitude and altitude) that allows a femtocell to determine that it should offer its functionality or resources (e.g., excess bandwidth, spectrum, etc.) for use by mobile devices that are in close proximity (e.g., for use as part of a DSA leasing agreement). A self-realized lease may also include information that allows the mobile device to determine that the resources of the femtocell are able for use (via a leasing agreement). A self-realized lease may also include information that allows a DSC (or an OAM that is receiving information from the DSC) to intelligently determine whether it should be included in, or excluded from, one or more leases.

In some embodiments, wireless device may be configured to communicate with a server computing device. For example, the wireless device may be configured to send received location information, sensor information (e.g., information collected from an accelerometer, a gyroscope, a magnetometer, a pressure sensor, a barometer, etc.), and information relating to a more precise location (e.g., more precise latitude, longitude, and altitude values, final location waypoint, etc.) to a server computing device. In response, the wireless device may receive updated location information from the server. The wireless device may re-compute the more precise location (or generate an updated final location waypoint) based on the updated location information received from the server.

In some embodiments, the wireless device may be configured to compute the more precise location information (or final location waypoint) by using horizontal data to determine a position relative to the Earth's surface, using vertical data to determine a height of the position relative to sea level, and generating three-dimensional location and position information based on the determined position and determined height. The wireless device may use the computed more precise location information or generated location and position information (e.g., in conjunction with the location information collected from the plurality of wireless devices) to determine or compute the more precise location information (or final location waypoint), and to provide a location based service (e.g., emergency location services, commercial location services, internal location services, lawful intercept location services, etc.) based on the more precise location information.

In some embodiments, the wireless device may be configured to determine whether the wireless device is able to acquire satellite signals and navigation data from a geospatial system. The wireless device may be configured to collect location information (e.g., by receiving a latitude coordinate, a longitude coordinate, and an altitude coordinate) from a plurality of wireless devices in its communication group in response to determining that it is not able to acquire satellite signals and/or navigation data from the geospatial system. The wireless device may compute the more precise location information (e.g., a final location waypoint that includes three-dimensional location and position information) for the wireless device based on the location information collected from the plurality of wireless devices.

In some embodiments, the wireless device may be configured to determine whether information obtained via a geospatial system of the wireless device is accurate. The wireless device may be configured to collect location information from a plurality of wireless devices in its communication group in response to determining that the information obtained via the geospatial system of the wireless device is not accurate. The wireless device may compute the more precise location information (or final location waypoint) based on the location information collected from the plurality of wireless devices, and use the computed more precise location information generated to provide the location based service.

In some embodiments, the wireless device may be configured to establish a first connection to a data network (in which the first connection is not a cellular data uplink transmission path), obtain location information for a current location of the wireless device (or initial location waypoint) via the first connection, determine a variance between the received location information and a wireless device determined location, determine whether the variance exceeds a threshold value, collect location information from a plurality of transceivers in the communication group in response to determining that the variance exceeds the threshold value, compute more precise location information (or final location waypoint) for the wireless device based on the location information collected from the plurality of transceivers, and use the more precise location information to provide the location based service.

In some embodiments, the wireless device may be configured to determine an initial position (or an initial location waypoint), generate at least one set of local position information (or a local location waypoint) based on locally determined location information, receive location information from one or more external location tracking systems, generate at least one set of external position information (or an external location waypoint) based on the location information received from the one or more external location tracking systems, receive distance information from multiple wireless devices in a communication group, generate at least one set of proximity position information (or a proximity waypoint) based on the distance information received from the multiple wireless devices in the communication group, generate a final location estimation set (or final location waypoint), and use the final location estimation set to provide a location based service. In some embodiments, the wireless device may be configured to generate the final location estimation set (or final location waypoint) to include a position value, a velocity value and an acceleration value. In some embodiments, the wireless device may generate the final location estimation set (or final location waypoint) based on at least one set of local position information (or local location waypoint), at least one set of external position information (or external location waypoint), at least one set of proximity position information (or proximity waypoint), and the initial position (or initial location waypoint).

In some embodiments, the wireless device may be configured to determine whether the wireless device is currently connected to a communications network, establish connections to a plurality of wireless devices to form a communication group in response to determining that the wireless device is not currently connected to the communications network, receive distance information from the plurality of wireless devices in the communication group, generate a location estimation set (or a local waypoint) based on the received distance information, and transmit the generated location estimate set to one or more of the plurality of wireless devices in the communication group for relaying to a network resource. In some embodiments, generating the location estimation set (or local waypoint) may include the wireless device calculating a current coordinate position of the wireless device based on a distance of the wireless device from each of the plurality of wireless devices in the communication group.

In some embodiments, the wireless device may be configured to determine or compute an initial position value (or an initial location waypoint), generate local position information (or a local location waypoint), generate external position information (or an external location waypoint) based on location information received from an external location tracking system, and generate proximity position information (or a proximity waypoint) based on distance information received from a second wireless device. The wireless device may generate the final location information (or final location waypoint) based on the determined initial position, the generated local position information, the generated external position information, and the generated proximity position information. The wireless device may use the generated final location information to provide a location based service.

In some embodiments, the wireless device may be configured to determine an initial location value (or an initial location waypoint) that identifies the current location of the wireless device, compute an initial location accuracy value for the determined initial location value, establish a communications group with a plurality of transceivers in response to determining that the computed initial location accuracy value exceeds a threshold value, receive (e.g., in response to establishing the communications group) location information from each of the plurality of transceivers in the communications group, determine a trilateration position value (or a trilateration waypoint) based on the location information received from each of the plurality of transceivers in the communications group, and compute a trilateration variance value based on the determined trilateration position value. The wireless device may determine a final location value (or final location waypoint) based on the determined initial location value, the computed initial location accuracy value, the determined trilateration position value, and the computed trilateration variance value. The wireless device may then use the final location value to provide the enhanced location based service.

In some embodiments, the wireless device may be configured to receive (e.g., in a processor of the wireless device via an antenna of the wireless device) a first set of externally determined location information (or a first external location waypoint) and a second set of externally determined location information (or a second external location waypoint) from one or more external location tracking systems. The wireless device may generate a best stride length estimate based on the first set of externally determined location information, the second set of externally determined location information, and the output of an accelerometer of the wireless device. The wireless device may generate a best altitude estimate based on output of a barometer of the wireless device and at least one of the first set of externally determined location information and the second set of externally determined location information. The wireless device may generate a best compass heading estimate based on output of a magnetometer of the wireless device, output of the accelerometer of the wireless device, and at least one of the first set of externally determined location information and the second set of externally determined location information. The wireless device may generate dead reckoning location information based on the best stride length estimate, the best altitude estimate, and the best compass heading estimate. The wireless device may calculate a best location estimate (or final location waypoint) based on the dead reckoning location information and a set of externally determined location information. The wireless device may use the best location estimate to provide a location based service in the wireless device.

In some embodiments, the wireless device may be configured to receive externally determined location information (or an external location waypoint), and generate a best stride length estimate based on the externally determined location information and accelerometer information. In some embodiments, the wireless device may generate the best altitude estimate based on the externally determined location information and barometer information. In some embodiments, the wireless device may generate the best compass heading estimate based on the externally determined location information and magnetometer information. In some embodiments, the wireless device may generate dead reckoning location information based on the best stride length estimate, the best altitude estimate, and the best compass heading estimate.

In some embodiments, the wireless device may be configured to determine its location via enhanced location based trilateration. For example, the wireless device may be configured to receive location information from one or more external devices. The received location information may include a waypoint from each of the one or more external devices. Each waypoint may include a coordinate value, an altitude value and a range value. The range value may include information identifying a distance from an external device to the wireless device. The wireless device may determine the validity of each of the received waypoints, perform normalization operations to normalize the received valid waypoints, assign an overall ranking to each of the normalized waypoints, assign a device-specific ranking to each of the normalized waypoints, and store the normalized waypoints in memory. The wireless device may select four waypoints from memory based on a combination of the overall ranking and the device-specific ranking associated with each waypoint. The wireless device may apply the four selected waypoints to a kalman filter to generate a final location waypoint (or final location information, final location estimation set, final location value, best location estimate, etc.). The wireless device may use the generated final location waypoint to provide a location based service.

In some embodiments, as part of determining the approximate location, the wireless device may estimate its position and/or generate a position estimate. In some embodiments, the position estimates may include latitude, longitude and elevation information that is accurate to within one (1) meter (and many times within one meter accuracy).

In some embodiments, the wireless device may be equipped with a "sensor fusion" system/component. The sensor fusion component may be configured to collect and use information from sensors in the wireless device to further improve the location position determinations. As such, the sensor fusion component may allow the device to better determine its approximate location and/or to generate a better position estimate (e.g., a more precise value, more accurate coordinates, etc.).

In some embodiments, the wireless device may be configured to perform advanced location based operations (e.g., advanced sensor fusion operations, etc.) to generate location information (e.g., a location estimate set/value), use a differential $RMS^2$ method (or any other method known in the art) compute confidence values, and compare the computed confidence values to one or more threshold values to determine whether there is a sufficiently high degree of confidence in the accuracy of the generated location information (e.g., location estimate set/value). In some embodiments, the wireless device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the wireless device may be configured to compute a precision value that identifies, or which is indicative of, the repeatability factor of the computation/measurements over multiple measurements. The wireless device may use the precision value to determine how often a reporting device reports the same position/location (i.e., based on evaluating multiple reports indicating that the device has not moved more than X meters, etc.). This may in turn be used to determine the precision of the measurement (e.g., within 1 meter, etc.). The precision value may also be used to determine the likelihood that repeating the computation (e.g., using the same inputs or input sources) will result in substantially the same values.

In some embodiments, the wireless device may be configured to perform normalization operations to normalize/synchronize the timing of the received location information (the "location information timing"). In some embodiments, this may be accomplished via a timing component or mechanism (a timer, system clock, processor cycles, etc.) in the wireless device. The wireless device may use a common time value (or common timer, reference clock, etc.) to synchronize and/or coordinate the information included in the received waypoints. The wireless device may generate normalized waypoints that include normalized values and/or which are normalized, synchronized and/or updated to account for various delays and inconsistencies, including the propagation delay between the wireless device and the corresponding external device, the time difference between when the waypoint was captured in external device and when the waypoint received in the wireless device, the relative movements of the devices, communication pathway time delays, delays associated with processing the requests, etc.

In some embodiments, the wireless device may be configured to associate or assign a time value to each normalized waypoint (e.g., by storing the waypoint relative to the time value in a map or table, etc.), and determine whether each normalized waypoint is valid. For example, wireless device may determine whether the time value associated is within a valid duration or whether the waypoint includes sufficiently accurate information (e.g., by determining whether a precision or confidence value associated with the waypoint exceeds a threshold value, etc.). In response to determining that a waypoint is valid, the wireless device may determine or compute one or more rankings for that waypoint, and associate and/or assign the rankings to the waypoint (by storing it as a field. In some embodiments, the wireless device may determine and assign an overall rank and a device-specific rank to each valid waypoint, and store the waypoints in memory (e.g., in a location database, etc.).

In some embodiments, the wireless device may be configured to determine the number of stored waypoints that are suitable for use in determining the device's current location. For example, the wireless device may determine whether the memory stores four or more valid waypoints, whether the stored waypoints are associated with sufficiently high rankings, whether the stored waypoints identify four or more independent locations, whether the stored waypoints identify the locations of four or more external devices relative to the current location of the wireless device with a sufficiently high level of accuracy, etc. In response to determining that there are four or more suitable waypoints stored in memory, the wireless device may intelligently select the four most suitable waypoints (e.g., waypoints having the highest overall rank and/or device-specific rank, etc.), apply the selected waypoints as inputs to a kalman filter, and use the output of the kalman filter to generate location information that identifies the wireless device's current location with a high level of accuracy (e.g., within one meter in all directions, etc.).

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as 'thereafter,' 'then,' 'next,' etc. are not intended to limit the order of the steps; these words are simply used to guide the reader through the description of the methods. Further, any reference to claim elements in the singular, for example, using the articles 'a,' 'an' or 'the' is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A dynamic spectrum arbitrage (DSA) system, comprising:
   a plurality of fixed wireless devices in a first telecommunication network;
   a dynamic spectrum controller (DSC) comprising DSC processor; and
   a dynamic spectrum policy controller (DPC) comprising a DPC processor,
   wherein at least one fixed wireless device of the plurality fixed wireless devices includes a processor that is configured with processor-executable instructions to perform operations comprising:
   monitoring network conditions;
   generating congestion reports based on a result of the monitoring;
   sending the generated congestion reports to a home eNodeB gateway (HGW) coupled to each of the plurality of fixed wireless devices via first communication links;
   using an enhanced location based service (eLBS) to dynamically determine a location for the fixed wireless device, the location including latitude, longitude and altitude of the fixed wireless device; and
   using the location to dynamically determine whether the fixed wireless device should participate in a telecommunication resource lease.

2. The DSA system of claim 1, wherein the DPC processor is configured with processor executable instructions to perform operations comprising:
   receiving a notification message that identifies a successful bidder for a geographical area;
   generating a grid-map structure that includes a primary grid structure that identifies telecommunication cells in the geographical area;
   monitoring locations of wireless devices; and
   determining whether to initiate inter-network handover operations based on the locations of the wireless devices with respect to the telecommunication cells of the primary grid structure.

3. The DSA system of claim 1, wherein the fixed wireless device is one of a small cell, a femto cell, a WiFi access node, or a beacon.

4. The DSA system of claim 1, wherein the telecommunication resource lease is associated with the allocation or use of telecommunication resources, the telecommunication resources including radio frequency.

5. The DSA system of claim 1, further comprising:
   determining that the fixed wireless device is in a global positioning system (GPS) stressed environment; and
   using the eLBS to dynamically determine the location of the fixed wireless device in response to determining that the fixed wireless device is in a GPS stressed environment.

6. The DSA system of claim 1, further comprising using eLBS to enable a self-organizing network (SON) so as to allow the telecommunication resource lease to configure, organize and optimize itself without manual intervention.

7. The DSA system of claim 1, wherein the plurality of fixed wireless devices include a home eNodeB (HeNB) comprising a HeNB processor that is configured with processor-executable instructions to:
   monitor the network conditions;
   generate the congestion reports based on a result of the monitoring; and
   send the generated congestion reports to the HGW.

8. The DSA system of claim 7, wherein the HeNB processor is configured with processor-executable instructions to perform operations such that monitoring the network conditions comprises monitoring one of a network congestion, a resource usage, and a resource availability.

9. The DSA system of claim 7, wherein the HeNB processor is configured with processor-executable instructions to:
   determine that the HeNB has been moved;
   determine whether there is one or more suitable serving HGWs in the first telecommunication network;
   establish a communication link to one of the one or more suitable serving HGWs; and
   terminate the one first communication link from the HeNB to the HGW.

10. The DSA system of claim 1, wherein the DPC processor is configured with processor executable instructions to perform operations comprising:
    dynamically allocating a portion of available radio frequency (RF) spectrum resources of a first communication network for access and use by a second communication network;
    informing the second communication network that use of allocated RF spectrum resources may begin;
    recording a transaction in a transaction database identifying an amount of RF spectrum resources allocated for use by the second communication network;
    determining whether at least some of the allocated RF spectrum resources are required by one or more devices that subscribe to the first communication network;
    informing the second communication network that use of allocated RF spectrum resources should be terminated in response to determining that at least some of the allocated RF spectrum resources are required by the one or more devices that subscribe to the first network; and updating the transaction database to include information identifying a time when use of the allocated RF spectrum resources was terminated by the second communication network.

11. A computing device, comprising:
a processor configured with processor-executable instructions to perform operations comprising:
monitoring network conditions of a telecommunications network;
generating congestion reports based on a result of the monitoring;
sending the generated congestion reports to a home eNodeB gateway (HGW) via a first communication link;
using an enhanced location based service (eLBS) to dynamically determine a location for the computing device, the location including latitude, longitude and altitude of the computing device; and
using the location to dynamically determine whether the computing device should participate in a telecommunication resource lease negotiated by a dynamic spectrum arbitrage (DSA) system.

12. The computing device of claim 11, wherein the processor is configured with processor-executable instructions to perform operations such that using eLBS to dynamically determine the location for the computing device comprises using eLBS to dynamically determine the location of a small cell, a femto cell, a WiFi access node, or a beacon.

13. The computing device of claim 11, wherein:
the processor is configured with processor-executable instructions to perform operations further comprising determining whether the computing device is in a global positioning system (GPS) stressed environment; and
the processor is configured with processor-executable instructions to perform operations such that using eLBS to dynamically determine the location of the computing device comprises using eLBS to dynamically determine the location of the computing device in response to determining that the computing device is in a GPS stressed environment.

14. The computing device of claim 11, wherein the processor is configured with processor-executable instructions to perform operations that include at least one of:
determining whether the computing device is included in a lessee network;
determining whether the computing device is included in a lessor network;
determining whether the computing device has excess resources to offer for allocation;
determining a current location of the computing device;
determining locations of other wireless devices in a geographical area;
determining locations of other wireless devices within a network;
determining a location of a lessee device;
determining terms of the telecommunication resource lease;
determining the terms of other available leases;
determining whether the lessee device has sufficient credentials, access rights, or credits to access or use resources in the lessor network;
determining whether the lessee device is in sufficiently close proximity to use available resources; or
determining whether to offer the lessee device access or use of the excess resources of the computing device.

15. The computing device of claim 11, wherein the processor is configured with processor-executable instructions to perform operations further comprising:
determining whether the computing device has been moved;
determining whether there is one or more suitable serving HGWs in the telecommunication network;
establishing a second communication link to one of the one or more suitable serving HGWs; and
terminating the first communication link to the HGW.

16. The computing device of claim 11, wherein the processor is configured with processor-executable instructions to perform operations further comprising communicating with a dynamic spectrum policy controller (DPC) via a dynamic spectrum controller (DSC) to cause the DPC to perform operations comprising:
dynamically allocating a portion of available radio frequency (RF) spectrum resources of a first communication network for access and use by a second communication network;
informing the second communication network that use of allocated RF spectrum resources may begin;
recording a transaction in a transaction database identifying an amount of RF spectrum resources allocated for use by the second communication network;
determining whether at least some of the allocated RF spectrum resources are required by one or more devices that subscribe to the first communication network;
informing the second communication network that use of allocated RF spectrum resources should be terminated in response to determining that at least some of the allocated RF spectrum resources are required by the one or more devices that subscribe to the first network; and
updating the transaction database to include information identifying a time when use of the allocated RF spectrum resources was terminated by the second communication network.

17. A method, comprising:
monitoring network conditions of a telecommunications network;
generating congestion reports based on a result of the monitoring;
sending the generated congestion reports to a home eNodeB gateway (HGW) via a first communication link;
using, by a processor of a fixed wireless device, an enhanced location based service (eLBS) to dynamically determine a location for the fixed wireless device, the location including latitude, longitude and altitude of the fixed wireless device; and
using the location to dynamically determine whether the computing device should participate in a telecommunication resource lease negotiated by a dynamic spectrum arbitrage (DSA) system, wherein:
the fixed wireless device is one of a plurality of fixed wireless devices in a first telecommunication network.

18. The method of claim 17, further comprising:
receiving, in a dynamic spectrum policy controller (DPC) that includes a DPC processor, a notification message that identifies a successful bidder for a geographical area;
generating a grid-map structure that includes a primary grid structure that identifies telecommunication cells in the geographical area;

monitoring locations of wireless devices; and determining whether to initiate inter-network handover operations based on the locations of the wireless devices with respect to the telecommunication cells of the primary grid structure.

19. The method of claim 17, further comprising:

determining, by the processor of the fixed wireless device, that the fixed wireless device is in a global positioning system (GPS) stressed environment, wherein using the eLBS to dynamically determine the location for the fixed wireless device comprises using the eLBS to dynamically determine the location of the fixed wireless device in response to determining that the fixed wireless device is in a GPS stressed environment.

20. The method of claim 17 record further comprising:

determining whether the fixed wireless device is included in a lessee network;

determining whether the fixed wireless device is included in a lessor network;

determining whether the fixed wireless device has excess resources to offer for allocation; determining a current location of the fixed wireless device;

determining locations of other wireless devices in a geographical area; determining locations of other wireless devices within a network;

determining a location of a lessee device; determining terms of the telecommunication resource lease; determining the terms of other available leases;

determining whether the lessee device has sufficient credentials, access rights, or credits to access or use resources in the lessor network;

determining whether the lessee device is in sufficiently close proximity to use available resources; or determining whether to offer the lessee device access or use of the excess resources of the fixed wireless device.

21. The method of claim 17, further comprising:

determining that the fixed wireless device has been moved;

determining whether there is one or more suitable serving HGWs in the telecommunication network;

establishing a second communication link to one of the one or more suitable serving HGWs; and terminating the first communication link to the HGW.

22. The method of claim 17, further comprising:

dynamically allocating a portion of available radio frequency (RF) spectrum resources of a first communication network for access and use by a second communication network;

informing the second communication network that use of allocated RF spectrum resources may begin;

recording a transaction in a transaction database identifying an amount of RF spectrum resources allocated for use by the second communication network;

determining whether at least some of the allocated RF spectrum resources are required by one or more devices that subscribe to the first communication network;

informing the second communication network that use of allocated RF spectrum resources should be terminated in response to determining that at least some of the allocated RF spectrum resources are required by the one or more devices that subscribe to the first network; and updating the transaction database to include information identifying a time when use of the allocated RF spectrum resources was terminated by the second communication network.

23. A non-transitory processor-readable storage medium having stored thereon processor-executable software instructions configured to cause a processor of a computing device to perform operations comprising:

monitoring network conditions of a telecommunications network;

generating congestion reports based on a result of the monitoring;

sending the generated congestion reports to a home eNodeB gateway (HGW) via a first communication link;

using an enhanced location based service (eLBS) to dynamically determine a location for the computing device, the location including latitude, longitude and altitude of the computing device; and using the location to dynamically determine whether the computing device should participate in a telecommunication resource lease negotiated by a dynamic spectrum arbitrage (DSA) system.

24. The non-transitory processor-readable storage medium of claim 23, wherein the processor-executable instructions further cause the processor to perform further operations comprising:

determining that the computing device is in a global positioning system (GPS) stressed environment; and using the eLBS to dynamically determine the location of the computing device in response to determining that the computing device is in a GPS stressed environment.

25. The non-transitory processor-readable storage medium of claim 23, wherein the processor-executable instructions further cause the processor to perform further operations comprising:

determining that the computing device has been moved;

determining whether there is one or more suitable serving HGWs in the telecommunication network;

establishing a second communication link to one of the one or more suitable serving HGWs; and terminating the first communication link to the HGW.

* * * * *